US012580311B2

(12) United States Patent
Lin et al.

(10) Patent No.: US 12,580,311 B2
(45) **Date of Patent: *Mar. 17, 2026**

(54) WIRELESS SIGNAL TRANSCEIVER DEVICE WITH AN ANTENNA WITH AT LEAST TWO FEED ZONES

(71) Applicant: RichWave Technology Corp., Taipei City (TW)

(72) Inventors: Shih-Kai Lin, Taipei City (TW); Tse-Peng Chen, Taipei City (TW)

(73) Assignee: RichWave Technology Corp., Taipei City (TW)

( * ) Notice: Subject to any disclaimer, the term of this patent is extended or adjusted under 35 U.S.C. 154(b) by 299 days.

This patent is subject to a terminal disclaimer.

(21) Appl. No.: 18/241,254

(22) Filed: Sep. 1, 2023

(65) Prior Publication Data

US 2023/0411850 A1 Dec. 21, 2023

Related U.S. Application Data

(63) Continuation-in-part of application No. 17/566,399, filed on Dec. 30, 2021, now Pat. No. 11,784,672,
(Continued)

(30) Foreign Application Priority Data

Feb. 14, 2018 (TW) ................................ 107105524

(51) Int. Cl.
*H04B 1/38* (2015.01)
*H01Q 5/50* (2015.01)
*H01Q 9/04* (2006.01)

(52) U.S. Cl.
CPC ............... *H01Q 5/50* (2015.01); *H01Q 9/045* (2013.01)

(58) Field of Classification Search
CPC .......... H01Q 5/50; H01Q 9/045; H01Q 1/525; H01Q 21/24; H01Q 9/0457; H04B 1/38;
(Continued)

(56) References Cited

U.S. PATENT DOCUMENTS 5,966,102 A 10/1999 Runyon
6,229,484 B1 5/2001 Sagisaka
(Continued)

FOREIGN PATENT DOCUMENTS

CN 1476654 A 2/2004
CN 1636299 A 7/2005
(Continued)

OTHER PUBLICATIONS

Notice of Allowance mailed on Feb. 18, 2022 for the Taiwan application No. 110130419, filing date Nov. 25, 2020, pp. 1~4.
(Continued)

*Primary Examiner* — Andrew Wendell
(74) *Attorney, Agent, or Firm* — Winston Hsu

(57) ABSTRACT

A transceiver includes an antenna configured to transmit a first wireless signal based on a transmission signal and receive a second wireless signal, the second wireless signal including a reflected first wireless signal from an object and the antenna transmitting the first wireless signal and receiving the second wireless signal at the same time. A transmission circuit is configured to generate the transmission signal and output the transmission signal to a first side of the antenna. A reception circuit is configured to receive a reception signal from a second side of the antenna, the antenna outputting the reception signal based on the second wireless signal. The first side is different from the second side.

20 Claims, 42 Drawing Sheets

Related U.S. Application Data which is a continuation-in-part of application No. 17/037,657, filed on Sep. 29, 2020, now Pat. No. 11,367,968, which is a continuation-in-part of application No. 16/698,867, filed on Nov. 27, 2019, now Pat. No. 10,833,745, which is a continuation-in-part of application No. 16/157,106, filed on Oct. 11, 2018, now Pat. No. 10,530,413.

(60) Provisional application No. 63/006,064, filed on Apr. 6, 2020, provisional application No. 62/607,922, filed on Dec. 20, 2017.

(58) Field of Classification Search
CPC ... H04B 1/40; H04B 1/48; H04B 1/44; H04B 1/54
See application file for complete search history.

(56) References Cited

U.S. PATENT DOCUMENTS

| | | | | |
|---|---|---|---|---|
| 8,664,955 | B1 | 3/2014 | Halpern | |
| 9,595,764 | B2 | 3/2017 | Loftus | |
| 10,530,413 | B2 * | 1/2020 | Chen | H01Q 9/045 |
| 10,833,745 | B2 * | 11/2020 | Chen | H01Q 19/10 |
| 11,367,968 | B2 * | 6/2022 | Lin | H01Q 9/0457 |
| 11,784,672 | B2 * | 10/2023 | Lin | H01Q 21/061 455/552.1 |
| 2005/0099330 | A1 | 5/2005 | Hausner | |
| 2005/0206568 | A1 | 9/2005 | Phillips | |
| 2007/0146225 | A1 | 6/2007 | Boss | |
| 2010/0302123 | A1 | 12/2010 | Knudsen | |
| 2010/0321238 | A1 | 12/2010 | Shen | |
| 2013/0044035 | A1 | 2/2013 | Zhuang | |
| 2015/0194730 | A1 | 7/2015 | Sudo | |
| 2017/0134154 | A1 | 5/2017 | Pratt | |
| 2017/0168134 | A1 | 6/2017 | Jenwatanavet | |
| 2017/0222306 | A1 | 8/2017 | Biscontini | |
| 2017/0264014 | A1 | 9/2017 | Le-Ngoc | |
| 2018/0069575 | A1 | 3/2018 | Kong | |
| 2018/0269576 | A1 | 9/2018 | Scarborough | |
| 2019/0081649 | A1 | 3/2019 | Khlat | |
| 2019/0190562 | A1 | 6/2019 | Chen | |
| 2019/0302250 | A1 | 10/2019 | Sahin | |
| 2020/0044362 | A1 | 2/2020 | Song | |

FOREIGN PATENT DOCUMENTS

| | | | |
|---|---|---|---|
| CN | 1898837 | A | 1/2007 |
| CN | 101647211 | A | 2/2010 |
| CN | 102043146 | A | 5/2011 |
| CN | 102570015 | A | 7/2012 |
| CN | 102598413 | A | 7/2012 |
| CN | 107403120 | A | 11/2017 |
| CN | 109951205 | A | 6/2019 |
| CN | 114122745 | A | 3/2022 |
| EP | 2688143 | A1 | 1/2014 |
| EP | 2 688 143 | B1 | 11/2017 |
| TW | 201236267 | A1 | 9/2012 |
| TW | 1648911 | B | 1/2019 |
| TW | 202145729 | A | 12/2021 |

OTHER PUBLICATIONS

Office action mailed on Jun. 27, 2024 for the Taiwan application No. 112146319, filing date Nov. 29, 2023, pp. 1-25.

* cited by examiner

WIRELESS SIGNAL TRANSCEIVER DEVICE WITH AN ANTENNA WITH AT LEAST TWO FEED ZONES

CROSS REFERENCE TO RELATED APPLICATION

This application is a continuation-in-part of U.S. application Ser. No. 17/566,399, filed on Dec. 30, 2021. The content of the application is incorporated herein by reference. U.S. application Ser. No. 17/566,399 is a continuation-in-part of U.S. application Ser. No. 17/037,657, filed Sep. 29, 2020, issued as U.S. Pat. No. 11,367,968, claiming the benefit of U.S. Provisional Application No. 63/006,064 filed on Apr. 6, 2020, and being a continuation-in-part of U.S. application Ser. No. 16/698,867, filed Nov. 27, 2019, issued as U.S. Pat. No. 10,833,745, and being a continuation-in-part of U.S. application Ser. No. 16/157,106, filed Oct. 11, 2018, issued as U.S. Pat. No. 10,530,413, and claiming the priority to Taiwan Application No. 107105524 filed on Feb. 14, 2018, and the benefit of U.S. Provisional Application No. 62/607,922 filed on Dec. 20, 2017. The entire contents of all the above applications are hereby incorporated by reference.

TECHNICAL FIELD

The invention is related to a wireless signal transceiver device, and more particularly, a wireless signal transceiver device including an antenna with at least two feed zones.

BACKGROUND

In the field of wireless communications, dual-polarized antennas are used to perform both wireless signal reception and transmission. To perform transmitting and receiving functions of a dual-polarized antenna, a wireless communication device system may receive an external wireless signal using a reception antenna and transmit a wireless signal to an external environment using a transmission antenna. Although the wireless communication device can transmit and receive the wireless signals using the transmission and reception antennas, respectively, the two antennas require more space in the wireless communication device and may increase the overall size.

SUMMARY

An embodiment provides a transceiver comprising an antenna, a transmission circuit and a processing unit. The antenna is configured to transmit a first wireless signal based on a transmission signal, and receive a second wireless signal, where the second wireless signal comprises a reflected first wireless signal from an object. The antenna transmits the first wireless signal and receives the second wireless signal at the same time. The transmission circuit is configured to generate the transmission signal. The processing unit is configured to receive a reception signal from the antenna. The antenna outputs the reception signal based on the second wireless signal and the transmission signal. The processing unit is configured to generate a spatial information of the object based on the reception signal.

Another embodiment provides a transceiver comprising an antenna, a transmission circuit, a sensing circuit and a processing unit. The antenna is configured to transmit a first wireless signal based on a transmission signal, and receive a second wireless signal, the second wireless signal comprising a reflected first wireless signal from an object. The antenna transmits the first wireless signal and receives the second wireless signal at the same time. The transmission circuit is configured to generate the transmission signal. The sensing circuit is configured to receive the transmission signal and a reception signal from the antenna. The sensing circuit comprises a reception circuit configured to receive the reception signal. The antenna outputs the reception signal based on the second wireless signal. The processing unit is configured to generate spatial information of the object based on a processing signal from the sensing circuit.

DETAILED DESCRIPTION

Figure 1:
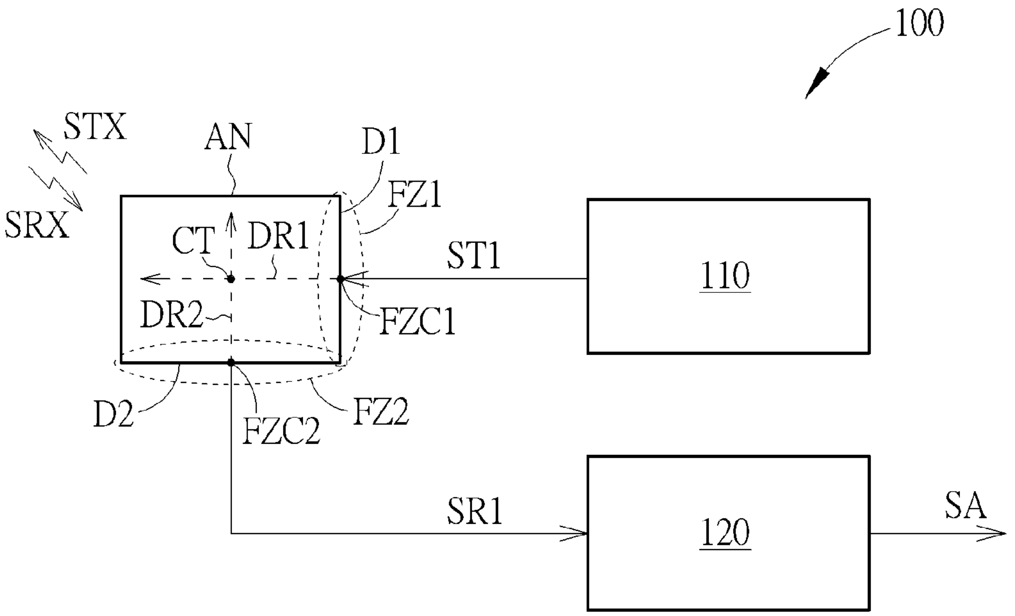
FIG. 1 illustrates a wireless signal transceiver device according to an embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The dual-polarized antenna may have a rectangular, square, circular or oval shape. The mentioned oval shape in the text may be an elliptical shape of an accurate mathematic definition, an oval shape similar to an elliptical shape, a round shape or an oblong shape. In practice, related engineering simulations and device fine-tuning may be used to optimize the effect of transceiving signals. FIG. 1 illustrates a wireless signal transceiver device 100 according to an embodiment. The wireless signal transceiver device 100 may include a dual-polarized antenna AN, a transmission circuit 110 and a reception circuit 120. The dual-polarized antenna AN may be used to transmit a first wireless signal STX and receive a second wireless signal SRX substantially at the same time. The first wireless signal STX may be reflected by an object to generate the second wireless signal SRX. In an embodiment, the first wireless signal STX and the second wireless signal SRX may be radio frequency (RF) signals. During a time interval, since the first wireless signal STX is constantly reflected by an object, the second wireless signal SRX may be constantly received by the dual-polarized antenna AN, so the dual-polarized antenna AN may constantly transmit the first wireless signal STX and also receive the second wireless signal SRX substantially at the same time. In an embodiment, the waveform of the first wireless signal STX may be fixed or varied by time.

The dual-polarized antenna AN may include a feed zone FZ1 and a feed zone FZ2. The dual-polarized antenna AN may have an antenna shape centroid CT. The feed zone FZ1 may have a zone shape centroid FZC1, and the feed zone FZ2 may have a zone shape centroid FZC2. A direction DR1 may be defined from the zone shape centroid FZC1 to the antenna shape centroid CT. A direction DR2 may be defined from the zone shape centroid FZC2 to the antenna shape centroid CT. The direction DR1 may be substantially orthogonal to the direction DR2.

Figure 11:
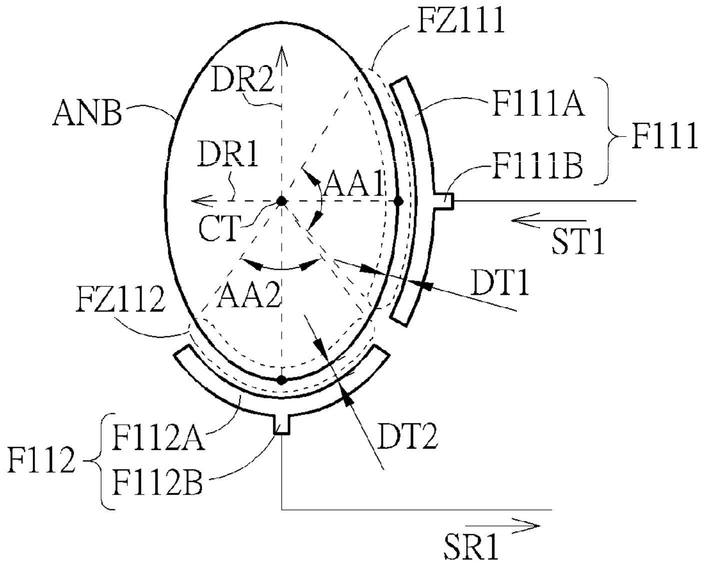
FIG. 11 illustrates a portion of a wireless signal transceiver device according to an embodiment.
Figure 12:
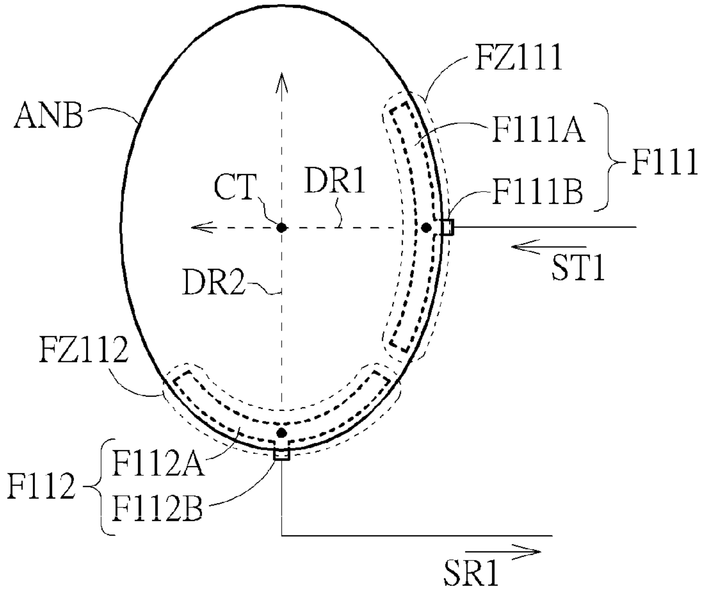
FIG. 12 illustrates a portion of a wireless signal transceiver device according to an embodiment.

According to embodiments of FIG. 1 to FIG. 10 and FIG. 13, the dual-polarized antenna AN, AN1, AN2 may have a rectangular shape as an example. Hence, the feed zone FZ1 of the dual-polarized antenna AN may include a first side D1 of the rectangle. The feed zone FZ2 of the dual-polarized antenna AN may include a second side D2 of the rectangle. The first side D1 may be substantially orthogonal to the second side D2. The zone shape centroids FZC1 and FZC2 may be respectively at the middle points of the first side D1 and the second side D2. According to the embodiment, the dual-polarized antenna AN may comprise a first antenna surface and a second antenna surface opposite to one another, the first antenna surface and the second antenna surface are separated by a thickness, the first antenna surface or the second antenna surface is coplanar with a reference plane. That is, the dual-polarized antenna AN may be a rectangular antenna with a thickness. However, as described above, the dual-polarized antenna AN may be not limited to a rectangular shape. In FIG. 11 and FIG. 12, embodiments of dual-polarized antennas ANB with another shape are described.

In FIG. 1, the first side D1 is used to receive a first transmission signal ST1, and the first wireless signal STX may relate to the first transmission signal ST1. The first side D1 and the second side D2 may be orthogonal to one another. According to embodiments, the first side D1 and the second side D2 may be adjacent to one another and have substantially the same length. The dual-polarized antenna AN may have a square shape.

According to the embodiment, a polarity of a wireless signal transmitted or received by the dual-polarized antenna AN may be orthogonal to a direction of an induced current. Hence, the first wireless signal STX and the second wireless signal SRX may hardly interfere with one another on the dual-polarized antenna AN. The length of each of the first side D1 and the second side D2 may be approximately half a wavelength of the first wireless signal STX or the second wireless signal SRX.

The second side D2 may be used to transmit the first reception signal SR1 related to the second wireless signal SRX. The transmission circuit 110 and the reception circuit 120 may be coupled to the dual-polarized antenna AN or substantially insulated from the dual-polarized antenna AN. In an embodiment, the transmission circuit 110 and the reception circuit 120 may be coupled to the dual-polarized antenna AN, the transmission circuit 110 is coupled to the first side D1 and used to generate the first transmission signal ST1, and the reception circuit 120 is coupled to the second side D2 and used to generate a processing signal SA related to the first reception signal SR1. According to the embodiment, the first wireless signal STX may be generated according to at least the first transmission signal ST1, and the first reception signal SR1 may be generated according to the second wireless signal SRX.

Figure 2:
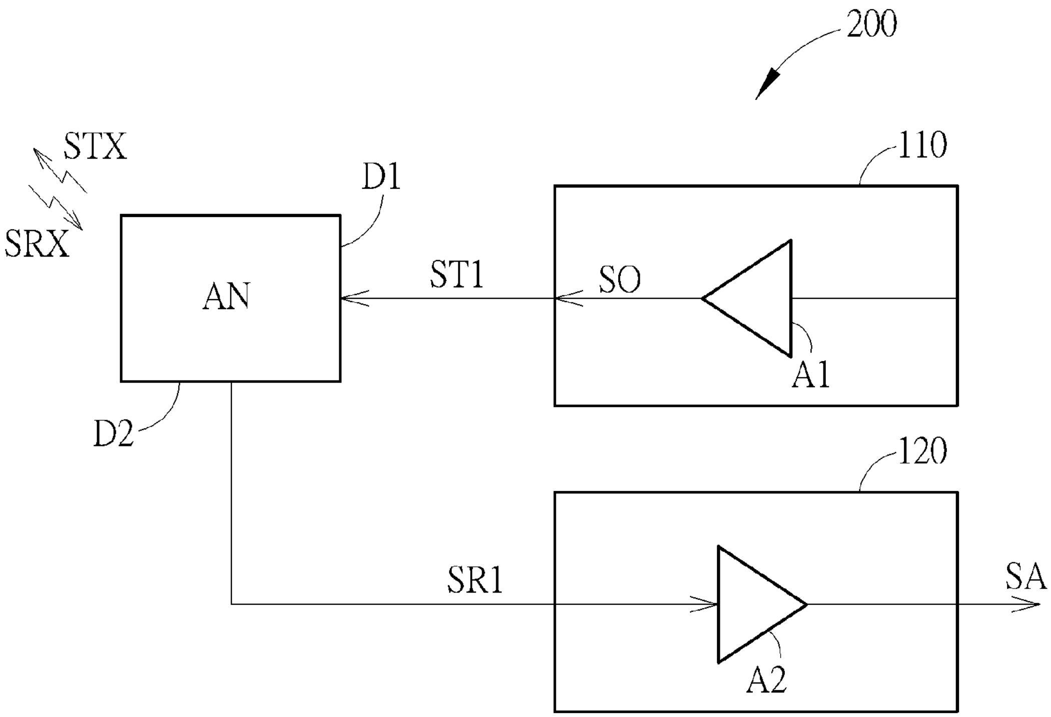
FIG. 2 illustrates a wireless signal transceiver device according to another embodiment.

FIG. 2 illustrates a wireless signal transceiver device 200 according to another embodiment. The wireless signal transceiver device 200 may be an embodiment of the wireless signal transceiver device 100. As shown in FIG. 2, the transmission circuit 110 may include a first amplifier A1. The first transmission signal ST1 may be corresponding to an output signal SO outputted by the first amplifier A1. The reception circuit 120 may include a second amplifier A2, and the second amplifier A2 may be used to amplify the first reception signal SR1 and output the processing signal SA. According to the embodiment, the output signal SO may include a single signal or a pair of signals having a specific phase difference. The first amplifier A1 may be a power amplifier, and the second amplifier A2 may be a low noise amplifier (LNA).

Figure 3:
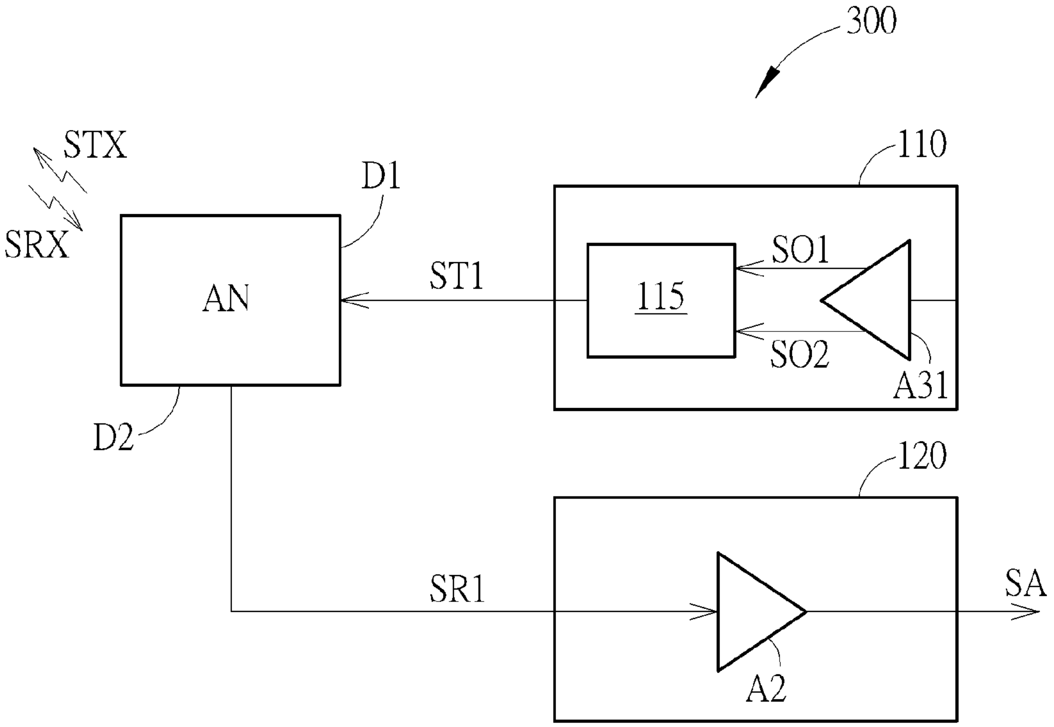
FIG. 3 illustrates a wireless signal transceiver device according to another embodiment.

FIG. 3 illustrates a wireless signal transceiver device 300 according to another embodiment. The wireless signal transceiver device 300 may be an embodiment of the wireless signal transceiver device 100. As shown in FIG. 3, the transmission circuit 110 may include a combining node 115 and a first amplifier A31. The combining node 115 may be coupled between the first side D1 of the dual-polarized antenna AN and the first amplifier A31, and used to receive a first output signal SO1 and a second output signal SO2 outputted from the first amplifier A31, generate the first transmission signal ST1 by combining the first output signal SO1 and the second output signal SO2, and output the first transmission signal ST1 to the first side D1. In FIG. 3, the first amplifier A31 may have two output terminals for outputting the first output signal SO1 and the second output signal SO2 which may form a pair of differential signals.

Figure 4:
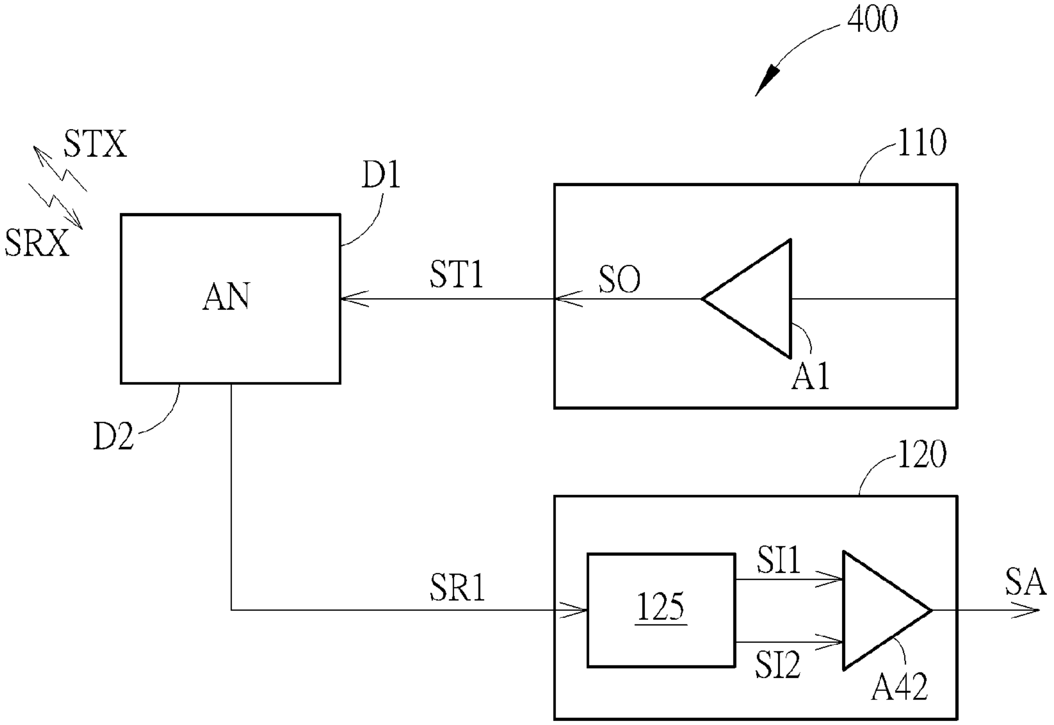
FIG. 4 illustrates a wireless signal transceiver device according to another embodiment.

FIG. 4 illustrates a wireless signal transceiver device 400 according to another embodiment. The wireless signal transceiver device 400 may be an embodiment of the wireless signal transceiver device 100. As shown in FIG. 4, the reception circuit 120 may include a coupler 125 and a second amplifier A42. The coupler 125 may be coupled between the second side D2 of the dual-polarized antenna AN and the second amplifier A42, and used to receive the first reception signal SR1, convert the first reception signal SR1 to a first input signal SI1 and a second input signal SI2, and transmit the first input signal SI1 and the second input signal SI2 to the second amplifier A42. As shown in FIG. 4, the second amplifier A42 may be used to generate the processing signal SA according to the first input signal SI1 and the second input signal SI2, and the first input signal SI1 and the second input signal SI2 may form a pair of differential signals.

Figure 5:
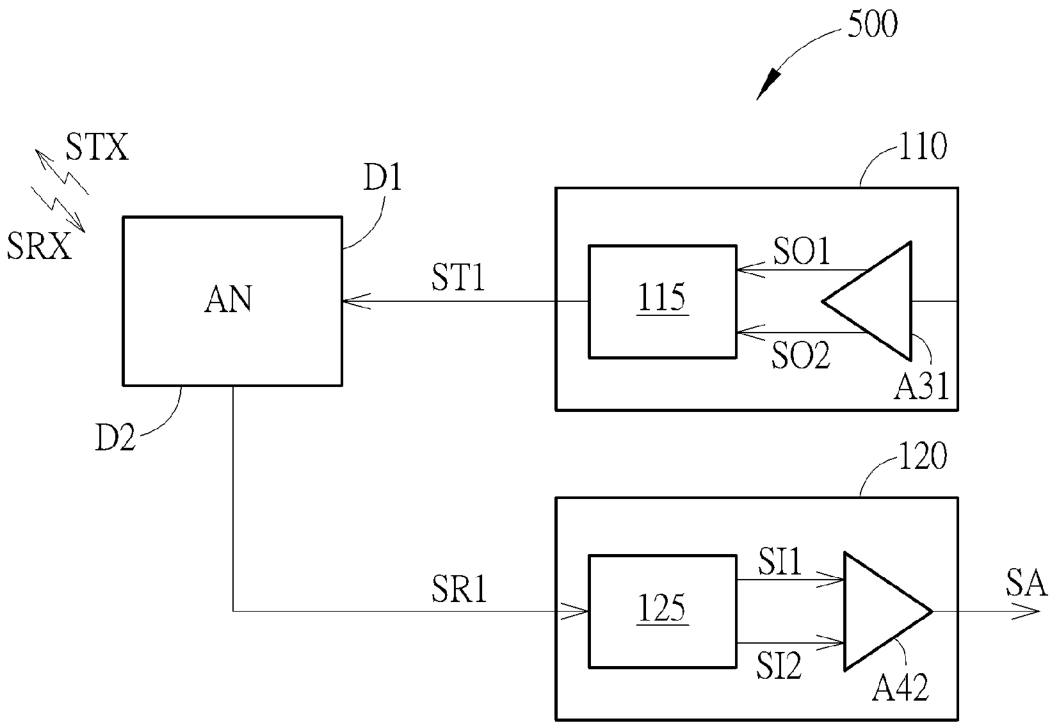
FIG. 5 illustrates a wireless signal transceiver device according to another embodiment.

FIG. 5 illustrates a wireless signal transceiver device 500 according to another embodiment. The wireless signal transceiver device 500 may be an embodiment of the wireless signal transceiver device 100. The transmission circuit 110 in FIG. 5 may include a combining node 115 and a first amplifier A31 as shown in FIG. 3, and the reception circuit 120 of FIG. 5 may include a coupler 125 and a second amplifier A42 as shown in FIG. 4. The related operations are not described repeatedly.

Figure 6:
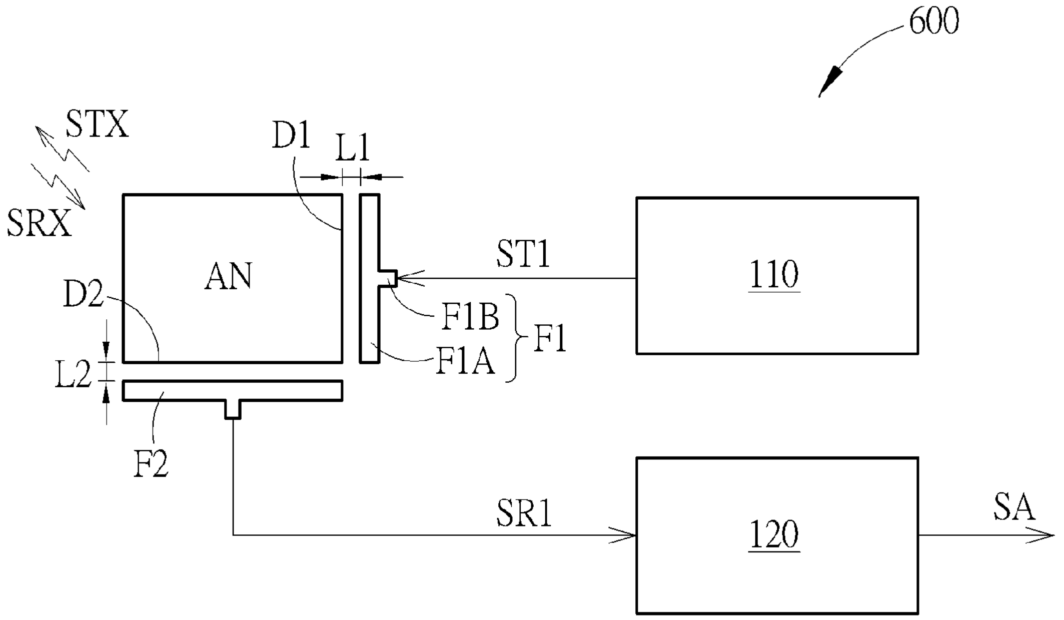
FIG. 6 illustrates a wireless signal transceiver device according to another embodiment.

FIG. 6 illustrates a wireless signal transceiver device 600 according to another embodiment. In this embodiment, the transmission circuit 110 and the reception circuit 120 may be substantially insulated from the dual-polarized antenna AN. As shown in FIG. 6, the wireless signal transceiver device 600 may include feed elements F1 and F2. Each of the feed elements F1 and F2 may have a T shape. For example, the feed element F1 may have a strip conductor F1A and a conductive line FIB. Similarly, the feed element F2 may have the two portions. The feed element F1 may be disposed corresponding to the first side D1 and used to receive the first transmission signal ST1 generated by the transmission circuit 110 and feed the first transmission signal ST1 to the dual-polarized antenna AN through electromagnetic induction. The feed element F1 and the transmission circuit 110 may be substantially insulated from the dual-polarized antenna AN. The feed element F2 may be disposed corresponding to the second side D2, and used to be fed with the first reception signal SR1 from the dual-polarized antenna AN through electromagnetic induction and transmit the first reception signal SR1 to the reception circuit 120. The feed element F2 and reception circuit 120 may be substantially insulated from the dual-polarized antenna AN.

According to embodiments, the feed element F1 may be (but not limited to) a T shape feed element, and the strip conductor F1A is formed as a straight strip disposed along an edge of the dual-polarized antenna AN correspondingly. The strip conductor F1A and the first side D1 of the dual-polarized antenna AN may be in parallel and be separated by a first distance L1. The strip conductor F1A may have a length 0.5 to 1 times a length of the first side D1. The first distance L1 may be related to impedance corresponding to the first transmission signal ST1. The feed element F1 may receive the first transmission signal ST1 through a middle position of the strip conductor F1A and the conductive line F1B. The feed element F2 may be (but not limited to) a T shape feed element. The strip conductor of the feed element F2 and the second side D2 of the dual-polarized antenna AN may be in parallel and be separated by a second distance L2. The strip conductor of the feed element F2 may have a length 0.5 to 1 times a length of the second side D2. The second distance L2 may be related to impedance corresponding to the first reception signal SR1. The feed element F2 may transmit the first reception signal SR1 through a middle position of the strip conductor and the conductive line of the feed element F2.

Figure 7:
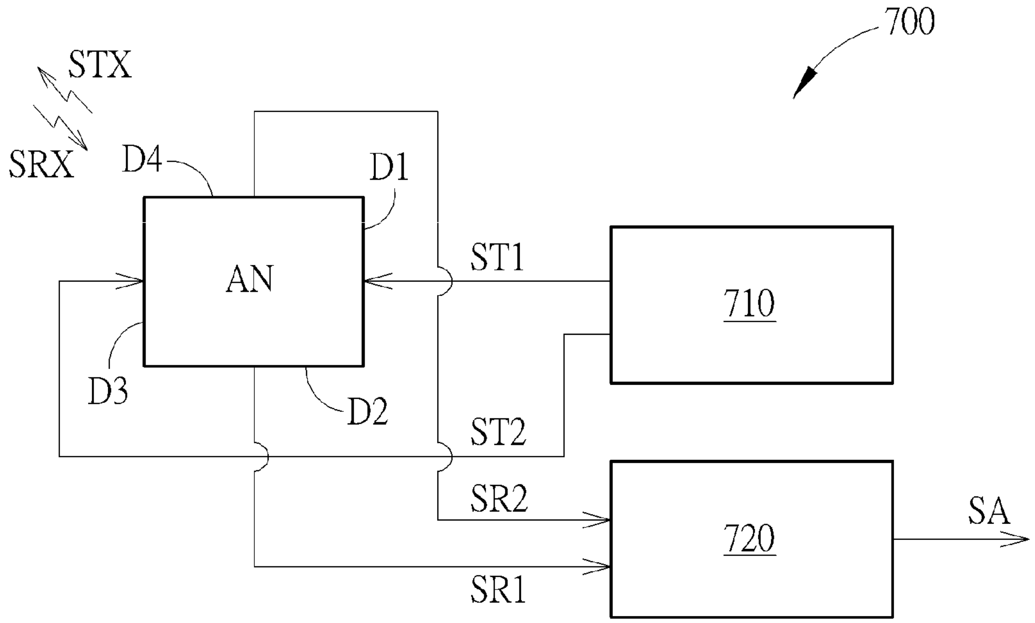
FIG. 7 illustrates a wireless signal transceiver device according to another embodiment.

FIG. 7 illustrates a wireless signal transceiver device 700 according to another embodiment. The wireless signal transceiver device 700 may include a dual-polarized antenna AN, a transmission circuit 710 and a reception circuit 720. In addition to the first side D1 and the second side D2 described above, the dual-polarized antenna AN may further include a third side D3 opposite to the first side D1. The third side D3 may be substantially orthogonal to the second side D2, coupled to the transmission circuit 710, and used to receive a second transmission signal ST2. The first wireless signal STX may be generated according to the first transmission signal ST1 and the second transmission signal ST2. The transmission circuit 710 may be used to transmit the first transmission signal ST1 and the second transmission signal ST2. As shown in FIG. 7, the dual-polarized antenna AN may further include a fourth side D4 opposite to the second side D2. The fourth side D4 may be substantially orthogonal to the first side D1, coupled to the reception circuit 720, and used to transmit a second reception signal SR2. The first reception signal SR1 and the second reception signal SR2 may be generated according to the second wireless signal SRX. The reception circuit 720 may be used to receive the first reception signal SR1 and the second reception signal SR2 and generate the processing signal SA according to the first reception signal SR1 and the second reception signal SR2. The first transmission signal ST1 and the second transmission signal ST2 may form a pair of differential signals. The first reception signal SR1 and the second reception signal SR2 may form a pair of differential signals. The relationship among the third side D3, the fourth side D4, feed zones corresponding to the sides D3 and D4, and the antenna shape centroid CT may be similar to the relationship among the first side D1, the second side D2, the feed zones FZ1 and FZ2, and the antenna shape centroid CT shown in FIG. 1, so it is not described repeatedly. However, a third direction defined from a third zone shape centroid corresponding to the third side D3 to the antenna shape centroid CT may be opposite to the first direction DR1. A fourth direction defined from a fourth zone shape centroid corresponding to the fourth side D4 to the antenna shape centroid CT may be opposite to the second direction DR2.

Figure 8:
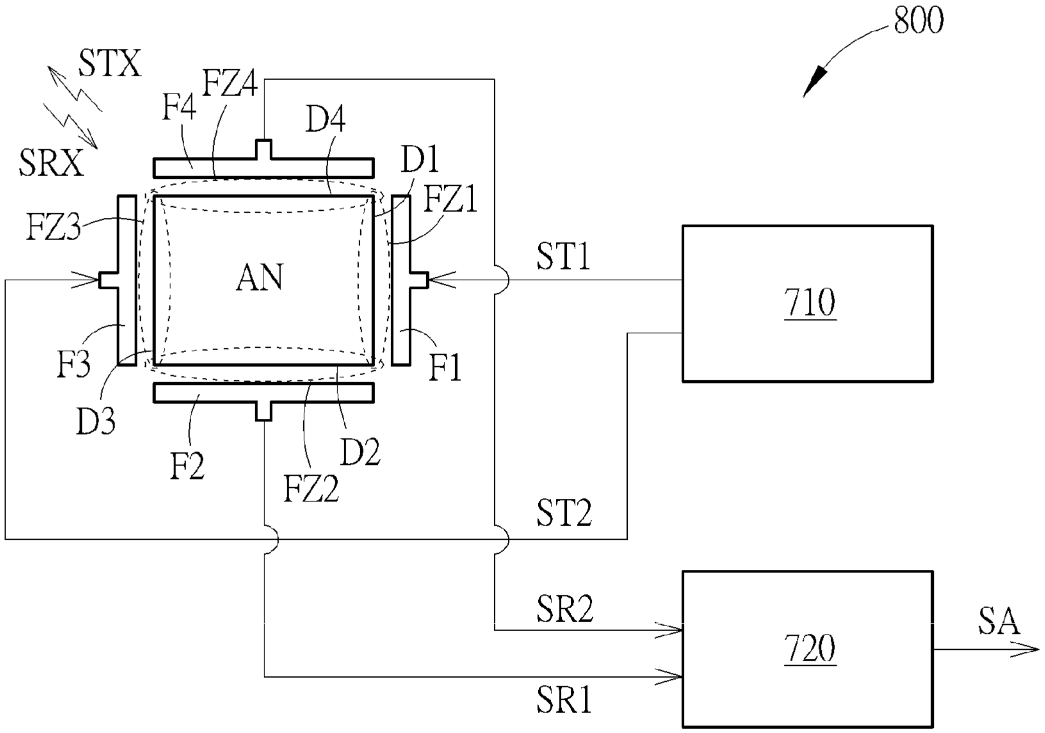
FIG. 8 illustrates a wireless signal transceiver device according to another embodiment.

FIG. 8 illustrates a wireless signal transceiver device 800 according to another embodiment. Similarities between FIG. 8 and FIG. 7 are not described repeatedly. As shown in FIG. 8, the wireless signal transceiver device 800 may include feed elements F1 to F4. Like FIG. 1 and FIG. 6, the dual-polarized antenna AN may have four feed zones FZ1 to FZ4 respectively including the first side D1 to the fourth side D4. The feed elements F1 and F2 may be as described above. The third feed element F3 may be similar to the feed element F1 and be disposed corresponding to the third side D3 of the dual-polarized antenna AN for receiving the second transmission signal ST2 and feeding the second transmission signal ST2 to the dual-polarized antenna AN through electromagnetic induction. The feed element F3 may be substantially insulated from the dual-polarized antenna AN, and a distance between the feed element F3 and the dual-polarized antenna AN may be related to impedance corresponding to the second transmission signal ST2. The fourth feed element F4 may be similar to the feed element F2 and be disposed corresponding to the fourth side D4 of the dual-polarized antenna AN for being fed with the second reception signal SR2 through electromagnetic induction and transmitting the second reception signal SR2 to the reception circuit 720. The feed element F4 may be substantially insulated from the dual-polarized antenna AN, and a distance between the feed element F4 and the dual-polarized antenna AN may be related to impedance corresponding to the second reception signal SR2. The first transmission signal ST1 and the second transmission signal ST2 may form a pair of differential signals, and the first reception signal SR1 and the second reception signal SR2 may form a pair of differential signals. The relationship among the third side D3, the fourth side D4, the feed zones FZ3 and FZ4 corresponding to the sides D3 and D4, and the antenna shape centroid CT may be similar to the relationship among the first side D1, the second side D2, the corresponding feed zones FZ1 and FZ2, and the antenna shape centroid CT shown in FIG. 1, so it is not described repeatedly. However, a third direction defined from a third zone shape centroid of the third feed zone FZ3 to the antenna shape centroid CT may be opposite to the first direction DR1. A fourth direction defined from a fourth zone shape centroid of the fourth feed zone FZ4 to the antenna shape centroid CT may be opposite to the second direction DR2.

Figure 9:
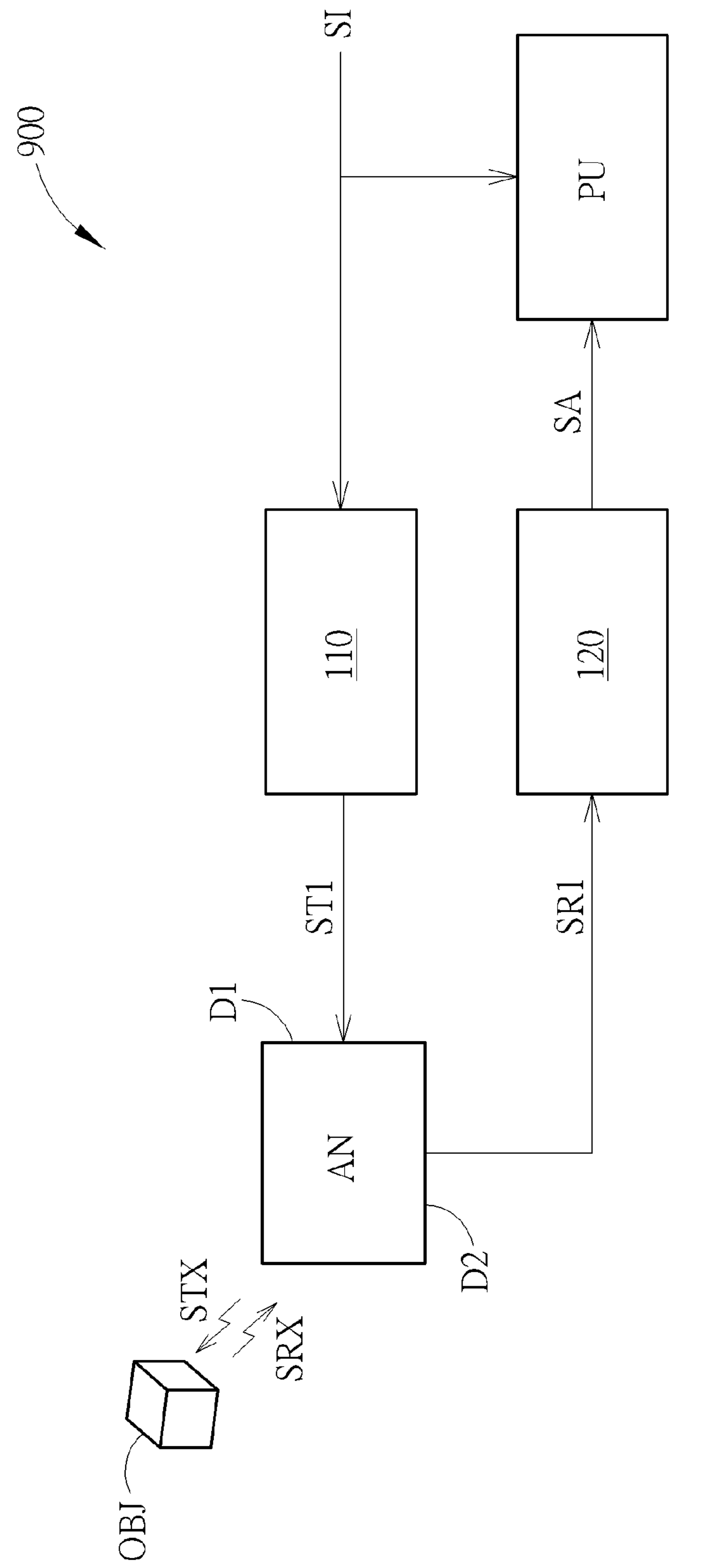
FIG. 9 illustrates a wireless signal transceiver device according to another embodiment.

FIG. 9 illustrates a wireless signal transceiver device 900 according to another embodiment. As shown in FIG. 9, the first wireless signal STX may be reflected by an object OBJ to generate the second wireless signal SRX. The transmission circuit 110 may be used to generate the first transmission signal ST1 according to an input signal SI. The wireless signal transceiver device 900 may further include a processing unit PU. The processing unit PU may be coupled to the transmission circuit 110 and the reception circuit 120 and used to generate spatial information of the object OBJ according to the processing signal SA and the input signal SI. In other words, the wireless signal transceiver device 900 may be used to detect the spatial information of the object OBJ such as at least one of a distance between the wireless signal transceiver device 900 and the object OBJ, a moving speed of the object OBJ, a moving angle of the object OBJ and time of detecting the object OBJ.

Figure 10:
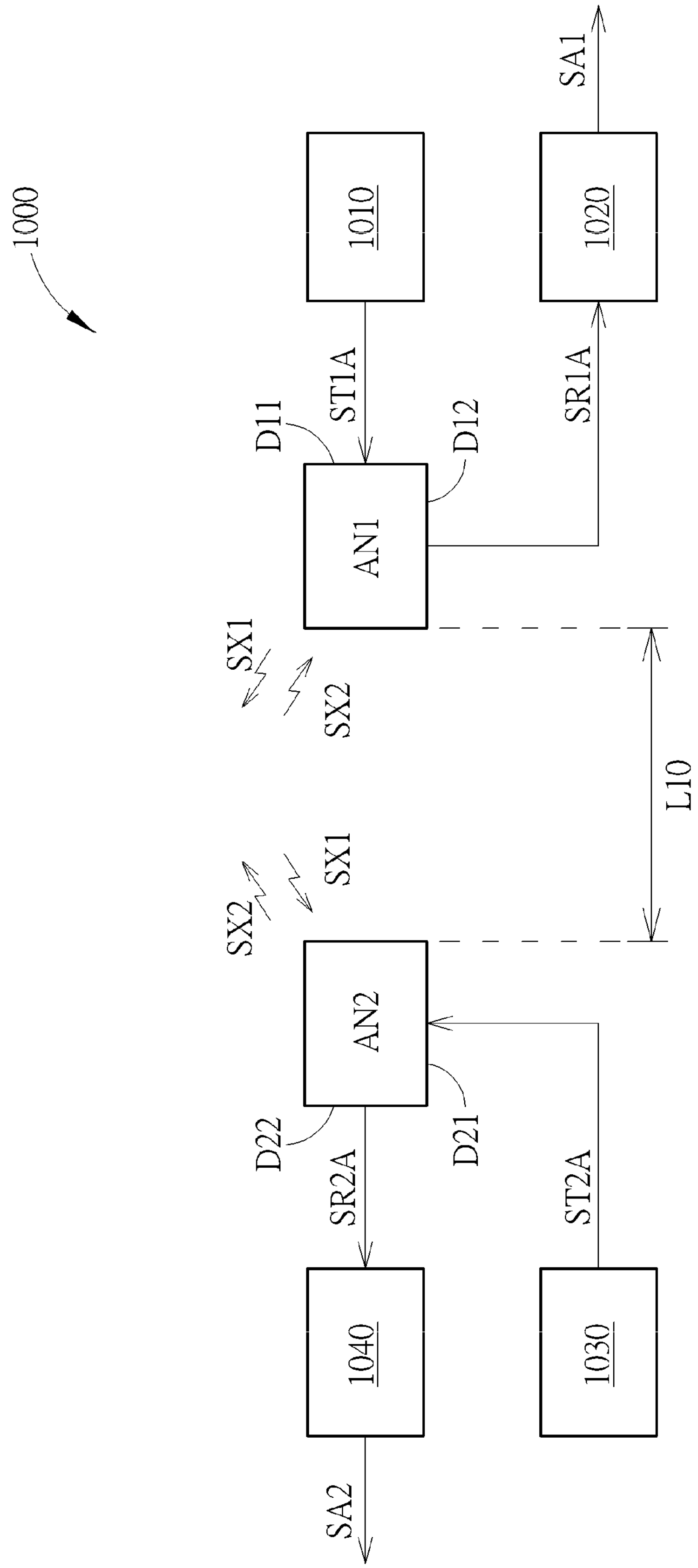
FIG. 10 illustrates a wireless signal transceiver device according to another embodiment.

FIG. 10 illustrates a wireless signal transceiver device 1000 according to another embodiment. The wireless signal transceiver device 1000 may include two dual-polarized antennas AN1 and AN2, two transmission circuits 1010 and 1030, and two reception circuits 1020 and 1040.

The dual-polarized antenna AN1 may be used to transmit a first wireless signal SX1 and receive a second wireless signal SX2 substantially at the same time. Each of the dual-polarized antennas AN1 and AN2 may be designed to be similar to the dual-polarized antennas AN of FIG. 1. The dual-polarized antenna AN1 may include a first feed zone, a second feed zone and a first antenna shape centroid. The first feed zone may include a first side D11 and a first zone shape centroid, and the second feed zone may include a second side D12 and a second zone shape centroid. A first direction defined from the first zone shape centroid to the first antenna shape centroid may be substantially orthogonal to a second direction defined from the second zone shape centroid to the first antenna shape centroid. The first side D11 may be used to receive a first transmission signal ST1A where the first wireless signal SX1 is related to the first transmission signal ST1A. The second side D12 may be used to transmit the first reception signal SR1A related to the second wireless signal SX2. The transmission circuit 1010 may be coupled to the first side D11 of the dual-polarized antenna AN1 and used to generate the first transmission signal ST1A. The reception circuit 1020 may be coupled to the second side D12 of the dual-polarized antenna AN1 and used to generate a processing signal SA1 related to the first reception signal SR1A.

The dual-polarized antenna AN2 may be used to transmit the second wireless signal SX2 and receive the first wireless signal SX1 substantially at the same time. Like the dual-polarized antenna AN1, the dual-polarized antenna AN2 may include a first feed zone, a second feed zone and a second antenna shape centroid. The first feed zone may include a first side D21 and a first zone shape centroid, and the second feed zone may include a second side D22 and a second zone shape centroid. A third direction defined from the first zone shape centroid of the dual-polarized antenna AN2 to the second antenna shape centroid may be substantially orthogonal to a fourth direction defined from the second zone shape centroid of the dual-polarized antenna AN2 to the second antenna shape centroid. The first side D21 may be used to receive a second transmission signal ST2A where the second wireless signal SX2 is related to the second transmission signal ST2A. The second side D22 may be used to transmit the second reception signal SR2A related to the first wireless signal SX1. The transmission circuit 1030 may be coupled to the first side D21 and used to generate the second transmission signal ST2A. The reception circuit 1040 may be coupled to the second side D22 and used to generate a processing signal SA2 related to the second reception signal SR2A. As shown in FIG. 10, The first direction may be substantially orthogonal to the third direction, and the second direction may be substantially orthogonal to the fourth direction.

According to embodiments, the first wireless signal SX1 and the second wireless signal SX2 may be radio frequency signals. During a time interval, since the first wireless signal SX1 may be constantly transmitted by the dual-polarized antenna AN1, the first wireless signal SX1 may be constantly received by the dual-polarized antenna AN2; and since the second wireless signal SX2 may be constantly transmitted by the dual-polarized antenna AN2, the second wireless signal SX2 may be constantly received by the dual-polarized antenna AN1. In other words, the dual-polarized antenna AN1 may be used to constantly transmit the first wireless signal SX1 and receive the second wireless signal SX2 substantially at the same time. Conversely, the dual-polarized antenna AN2 may be used to constantly transmit the second wireless signal SX2 and receive the first wireless signal SX1 substantially at the same time. According to embodiments, the waveforms of the first wireless signals SX1 and the second wireless signal SX2 may be fixed or varied by time, and the waveforms may be determined according to data included in the processing signals SA1 and SA2.

According to an embodiment, the dual-polarized antennas AN1 and AN2 may be separated by a distance L10. The first side D11 of the dual-polarized antenna AN1 may be orthogonal to the second side D12 of the dual-polarized antenna AN1. The first side D11 of the dual-polarized antenna AN1 may be orthogonal to the first side D21 of the dual-polarized antenna AN2. The first side D21 of the dual-polarized antenna AN2 may be orthogonal to the second side D22 of the dual-polarized antenna AN2.

According to embodiments, the first side D11 and the second side D12 of the dual-polarized antenna AN1 may be adjacent to one another. The first side D21 and the second side D22 of the dual-polarized antenna AN2 may be adjacent to one another.

As shown in FIG. 10, wireless data communications may be performed by means of the wireless signal transceiver device 1000. For example, when the distance L10 is 100 meters, wireless data communications of 100 meters between the dual-polarized antennas AN1 and AN2 may be performed.

According to embodiments, the first wireless signal SX1 may be generated according to at least the first transmission signal ST1A. The first reception signal SR1A may be generated according to the second wireless signal SX2. The second wireless signal SX2 may be generated according to at least the second transmission signal ST2A. The second reception signal SR2A may be generated according to the first wireless signal SX1.

According to embodiments, the first side D11 of the dual-polarized antenna AN1 and the second side D22 of the dual-polarized antenna AN2 may be dual-polarized antenna portions corresponding to one another when transceiving wireless signals. The first side D21 of the dual-polarized antenna AN2 and the second side D12 of the dual-polarized antenna AN1 may be dual-polarized antenna portions corresponding to one another when transceiving wireless signals. Hence, the first side D11 and the second side D22 may have a substantially same length, and be in parallel/overlapped in projection with one another. The first side D21 and the second side D12 may have a substantially same length, and be in parallel/overlapped in projection with one another.

According to embodiments, the first side D11 and the second side D12 may have a substantial same length. For example, because lengths of sides of a dual-polarized antenna for feeding a signal may relate to a frequency of the signal, the first side D11 and the second side D12 may be designed to have a substantial same length when using a fixed frequency to perform time-division data transmission.

According to another embodiment, the first side D11 and the second side D12 of the dual-polarized antenna AN1 may have different lengths. For example, when using different frequencies to perform time-division data transmission, the first side D11 and the second side D12 may be designed to have different lengths. According to another embodiment, the first side D11 of the dual-polarized antenna AN1 and the second side D22 of the dual-polarized antenna AN2 may have substantially the same first length, the second side D12 of the dual-polarized antenna AN1 and the first side D21 of the dual-polarized antenna AN2 may have substantially the same second length, and the first length is different with the second length.

According to embodiments, each of the dual-polarized antennas AN1 and AN2 may have a square or rectangular shape. A feed element may be disposed corresponding to each side of the dual-polarized antennas AN1 and AN2 as shown in FIG. 6 and FIG. 8 to feed a signal to or from an antenna through electromagnetic induction.

According to embodiments, the dual-polarized antennas AN1 and AN2 may be used to transmit or receive a pair of differential signals as shown in FIG. 6 and FIG. 8.

In FIG. 1 to FIG. 10 and FIG. 13, each of the dual-polarized antennas has a rectangular shape. FIG. 1 to FIG. 10 and FIG. 13 are merely examples, and a dual-polarized antenna with an oval shape as shown in FIG. 11 may be coupled and configured as shown in FIG. 1 to FIG. 10 and FIG. 13.

FIG. 11 illustrates a portion of a wireless signal transceiver device according to an embodiment. In FIG. 11, the transmission circuit 110 and the reception circuit 120 of FIG. 1 are omitted, and a dual-polarized antenna ANB and feed elements F111 and F112 are illustrated. The feed elements F111 and F112 may be disposed corresponding to feed zones FZ111 and FZ112. The dual-polarized antenna ANB may have an oval shape and be different from the rectangular antennas in FIG. 1 to FIG. 10 and FIG. 13. The feed element F111 may include a strip conductor F111A and a conductive line F111B. The strip conductor F111A may be disposed along an edge of the dual-polarized antenna ANB, and the strip conductor F111A and the edge of the dual-polarized antenna ANB may be in parallel. In other words, when the dual-polarized antenna ANB has an oval shape or a circle shape, the strip conductor F111A may have an arc shape. Likewise, the feed element F112 may include a strip conductor F112A and a conductive line F112B with a shape described above. The strip conductor F111A and the edge of the dual-polarized antenna ANB may be separated by a distance DT1. The distance DT1 may be related to impedance corresponding to a transmitted signal. When the dual-polarized antenna ANB is applied in a scenario of FIG. 6 as an example, the conductive line F111B may be coupled to a middle position of the strip conductor F111A to receive the first transmission signal ST1. Similarly, the conductive line F112B of the feed element F112 may be used to transmit the first reception signal SR1. Like FIG. 1, the dual-polarized antenna ANB in FIG. 11 may have feed zones FZ111 and FZ112, and an antenna shape centroid CT. Each of the feed zones FZ111 and FZ112 may have a zone shape centroid. A first direction DR1 may be defined from the zone shape centroid of the feed zone FZ111 to the antenna shape centroid CT, and a second direction DR2 may be defined from the zone shape centroid of the feed zone FZ112 to the antenna shape centroid CT. The first direction DR1 may be orthogonal to the second direction DR2. An angle AA1 formed with the feed zone FZ111 and the antenna shape centroid CT may be approximately in a range of 22.5 to 120 degrees. An angle AA2 formed with the feed zone FZ112 and the antenna shape centroid CT may be approximately in a range of 22.5 to 120 degrees. A sum of the angles AA1 and AA2 may be less than or equal to 180 degrees.

The dual-polarized antenna ANB may have a first antenna surface and a second antenna surface opposite to one another, the first antenna surface and the second antenna surface are separated by a thickness. The first antenna surface or the second antenna surface may be coplanar with a reference plane. Projection areas of the strip conductors F111A and F112A onto the reference plane may be outside a projection area of the dual-polarized antenna ANB onto the reference plane without overlapping. The strip conductor F111A, the conductive line F111B and the reference plane may be coplanar with one another. The strip conductor F111A and the edge of the dual-polarized antenna ANB may be in parallel and be separated by a distance DT1. The strip conductor F112A and the conductive line F112B may be similar to the strip conductor F111A and the conductive line F112B, and the strip conductor F112A and the edge of the dual-polarized antenna ANB may be in parallel and be separated by a distance DT2. For example, the dual-polarized antenna ANB may be formed on a metal layer of a circuit board such as (but not limited to) a printed circuit board, and the feed elements may be formed on a same metal layer. According to other embodiments, an antenna and feed elements may be formed on different metal layers to be disposed as FIG. 11.

FIG. 12 illustrates a portion of a wireless signal transceiver device according to an embodiment. Like FIG. 11, FIG. 12 merely illustrates the dual-polarized antenna ANB and the feed elements F111A and F111B. However, in FIG. 12, projection areas of the strip conductors F111A and F112A onto a reference plane may be within a projection area of the dual-polarized antenna ANB onto the reference plane, so the projection areas of the strip conductors F111A and F112A may overlap the projection area of the dual-polarized antenna ANB in a vertical direction. The strip conductor and the conductive line of each of the feed elements F111 and F112 may be coplanar with one another. The strip conductor may be on a plane which is parallel with the reference plane and is separated from the reference plane by a vertical distance. For example, the dual-polarized antenna ANB may be formed on a metal layer of a circuit board such as (but not limited to) a printed circuit board, and the feed elements may be formed on another metal layer to form the antenna structure shown in FIG. 12. The two metal layers may be separated by the vertical distance. The relationship among the feed zones FZ111 and FZ112 and the antenna shape centroid CT in FIG. 12 may be similar to the embodiment of FIG. 11, so it is not described repeatedly.

FIG. 11 and FIG. 12 illustrate examples with two feed elements, but it is allowed to respectively dispose four feed elements corresponding to four feed zones of an oval dual-polarized antenna as shown in FIG. 8. The similarities of application are not described repeatedly.

Figure 13:
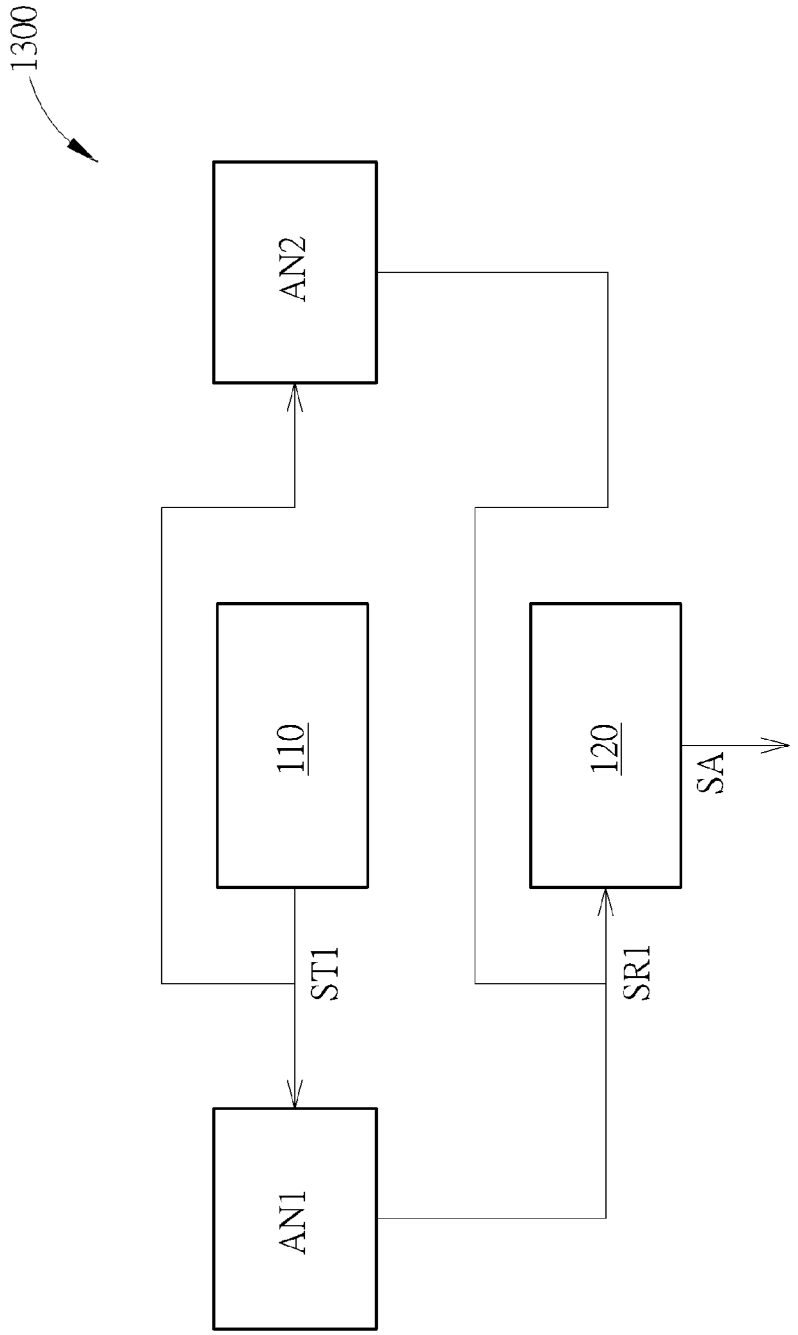
FIG. 13 illustrates a wireless signal transceiver device according to another embodiment.

FIG. 13 illustrates a wireless signal transceiver device 1300 according to another embodiment. The wireless signal transceiver device 1300 may be an embodiment of the wireless signal transceiver device 100. As shown in FIG. 13, a main difference between the wireless signal transceiver devices 100 and 1300 may be that the wireless signal transceiver device 1300 further includes a dual-polarized antenna AN2. Both the dual-polarized antennas AN2 and AN1 may be coupled to the transmission circuit 110 and the reception circuit 120, and be used to receive the first transmission signal ST1 and transmit the second wireless signal SRX (not shown in FIG. 13) substantially at the same time. The dual-polarized antennas AN2 and AN1 may form a 1×2 antenna matrix. According to another embodiment, one or more additional dual-polarized antennas may be coupled to the transmission circuit 110 and the reception circuit 120 to form an M×N antenna matrix with the dual-polarized antennas AN2 and AN1. The M×N antenna matrix may be used for receiving signals (e.g. the first transmission signal ST1) from a transmission circuit (e.g. 110) and outputting signals (e.g. first reception signal SR1) to a reception circuit (e.g. 120). The parameters M and N may be positive integers larger than zero. For example, in an M×N antenna matrix, one of M and N may be 1, and another may be an integer larger than one. Hence, the M×N antenna matrix may be a 1×N antenna matrix or an M×1 antenna matrix. In another example, both of M and N may be integers larger than one.

Figure 14:
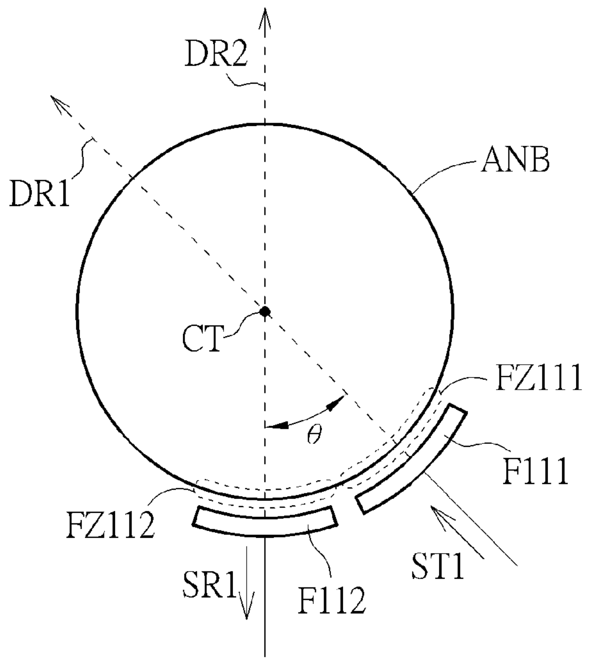
FIG. 14 illustrates a portion of wireless signal transceiver device according to another embodiment.

FIG. 14 illustrates a portion of wireless signal transceiver device according to another embodiment. Like FIG. 11, the transmission circuit 110 and the reception circuit 120 described in FIG. 1 or other embodiments above are omitted, and a dual-polarized antenna ANB and feed elements F111 and F112 are illustrated.

Like FIG. 11, in FIG. 14, the feed elements F111 and F112 may be disposed corresponding to feed zones FZ111 and FZ112. In FIG. 14, a first direction DR1 may be defined from the zone shape centroid of the feed zone FZ111 towards the antenna shape centroid CT, and a second direction DR2 may be defined from the zone shape centroid of the feed zone FZ112 towards the antenna shape centroid CT. An acute angle θ formed between the first direction DR1 and the second direction DR2 is not less than 45 degrees. In other words, $45° \leq \theta < 90°$. For example, if two angles 95° and 85° are formed between the first direction DR1 and the second direction DR2, the acute angle θ should be 85°.

The dual-polarized antenna ANB in FIG. 14 may have a circular or oval shape.

For example, the feed elements F111 and F112 in FIG. 14 may be disposed beside the dual-polarized antenna ANB as FIG. 11, where the projection area of the dual-polarized antenna ANB may not overlap the projection areas of the feed elements F111 and F112.

In another example, the feed elements F111 and F112 in FIG. 14 may be disposed above or below the dual-polarized antenna ANB as FIG. 12, where the projection area of the dual-polarized antenna ANB may overlap the projection areas of the feed elements F111 and F112.

Figure 15:
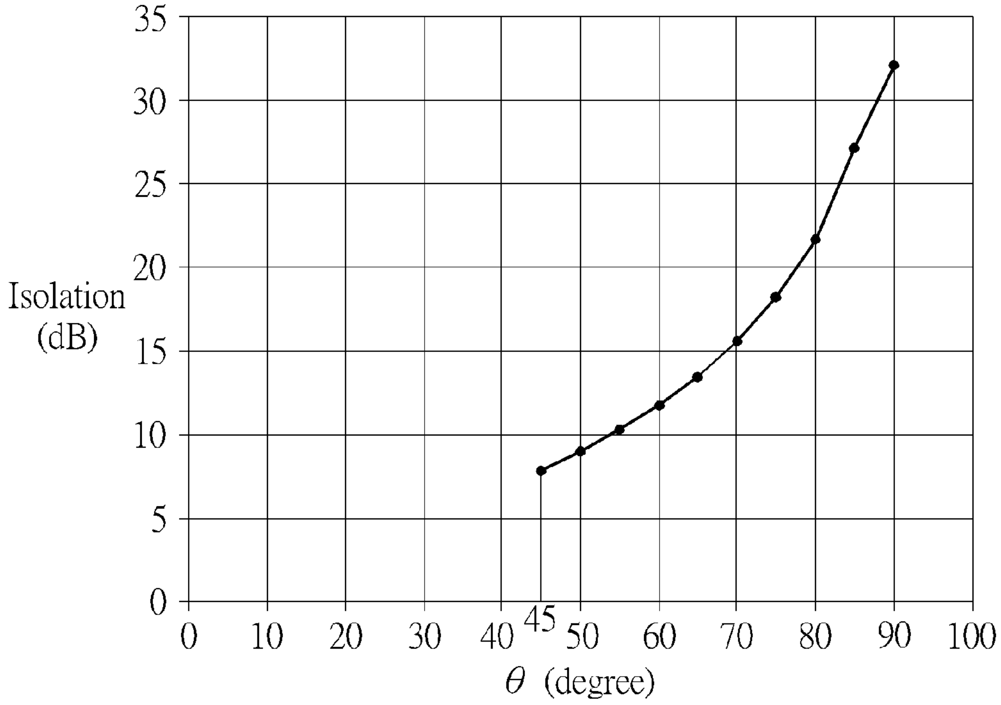
FIG. 15 is a diagram of the angle versus the isolation between the wireless signals transmitted and received by the dual-polarized antenna in FIG. 14.

Each of the feed elements F111 and F112 may be insulated from the dual-polarized antenna ANB. By means of the coupling effect, signals may be transceived between the dual-polarized antenna ANB and each of the feed elements F111 and F112. FIG. 15 is a diagram of the angle θ versus the isolation between the wireless signals transmitted and received by the dual-polarized antenna ANB in FIG. 14.

As FIG. 15, when the acute angle θ is greater or equal to 45 degrees (i.e. 45°≤0), the isolation may be greater than 8 decibels (dB) and be acceptable. As the acute angle θ is increased from 45 degrees to 90 degrees, the isolation may be increased by around 24 dB to be about 32 dB, and the signal quality may be further ensured.

As FIG. 15, when the acute angle θ is greater than 75 degrees, the isolation may be increased more significantly with increased slopes on the curved diagram. Hence, according to an embodiment, the acute angle θ may be not less than 75 degrees. In other words, the angle θ may be set as 75°<θ<90° for a better signal isolation.

By means of a wireless signal transceiver device provided by an embodiment, a dual-polarized antenna which is a single radiator may be used to transceive signals. Applications of object detection or long distance signal transmission may therefore be practiced. In addition, an external coupling element or duplexer between a dual-polarized antenna and an amplifier circuit could be omitted according to embodiments. It is beneficial for reducing size of a dual-polarized antenna and a related system and simplifying a structure of the system.

Figure 16:
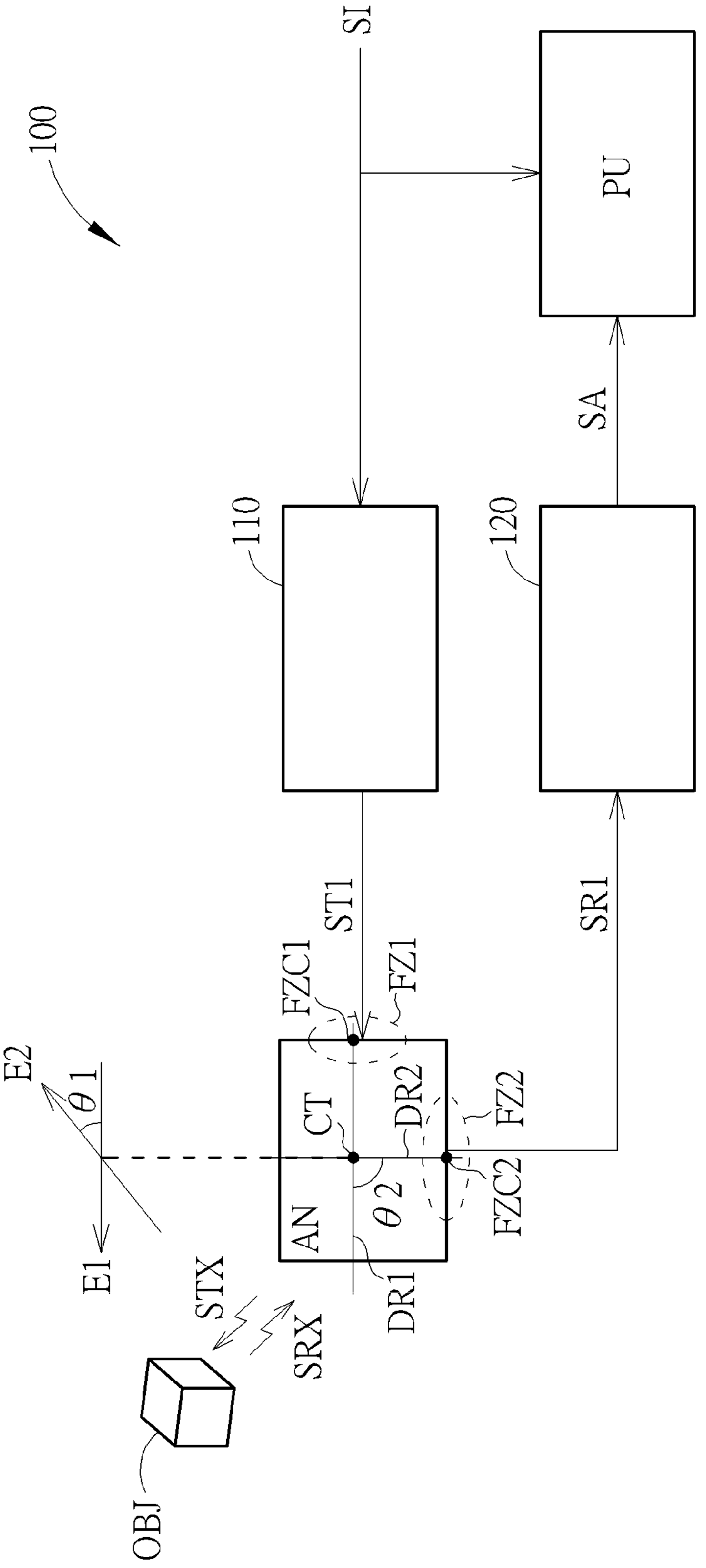
FIG. 16 illustrates a wireless signal transceiver device according to an embodiment.

FIG. 16 illustrates a wireless signal transceiver device 100 according to an embodiment. The wireless signal transceiver device 100 includes a dual-polarized antenna AN, a transmission circuit 110, a reception circuit 120 and a processor PU. The dual-polarized antenna AN is used to transmit a first wireless signal STX and receive a second wireless signal SRX at the same time. The first wireless signal STX is reflected by an object OBJ to generate the second wireless signal SRX.

The dual-polarized antenna AN includes a first feed zone FZ1 and a second feed zone FZ2. The first feed zone FZ1 is used to receive a transmission signal ST1, and the first wireless signal STX is generated according to at least the transmission signal ST1. The second feed zone FZ2 is used to output a reception signal SR1 generated according to the second wireless signal SRX.

The dual-polarized antenna AN is used to form a first radiated electric-field E1 having a first co-polarization according to the first wireless signal STX and form a second radiated electric-field E2 having a second co-polarization according to the second wireless signal SRX. The first co-polarization and the second co-polarization form an angle θ1 between 45 degrees to 135 degrees to each other in a far field.

The transmission circuit 110 is used to generate the transmission signal ST1 according to an input signal SI. The reception circuit 120 is used to generate a processing signal SA according to the reception signal SR1. The processing unit PU is couple to the transmission circuit 110 and the reception circuit 120, and used to generate a spatial information of the object OBJ according to the processing signal SA and the input signal SI.

In FIG. 16, the wireless signal transceiver device 100 may be a radar device. The first wireless signal STX may be continuously transmitted while the second wireless signal SRX is continuously received during a time interval. When the object OBJ moves, a frequency shift may be generated according to Doppler effect. Hence, the processing unit PU may determine whether the object OBJ moves according to a frequency difference between the first wireless signal STX and the second wireless signal SRX. When the first wireless signal STX and the second wireless signal SRX have a substantially the same frequency, the object OBJ can be determined to keep stationary without moving.

As shown in FIG. 16, a first line DR1 may be defined from a shape centroid FZC1 of the first feed zone FZ to a shape centroid CT of the dual-polarized antenna AN. A second line DR2 may be defined from a shape centroid FZC2 of the second feed zone FZ2 to the shape centroid CT of the dual-polarized antenna AN. The first line DR1 and the second line DR2 may form an angle θ2 between 45 to 135 degrees for providing enough isolation between the signals accessed by the feed zones FZ1 and FZ2, and generating the first co-polarization and the second co-polarization in a far field as mentioned above. According to an embodiment, the angle θ2 may be adjusted to be 90 degrees to improve the isolation between the signals accessed by the feed zones FZ1 and FZ2. However, the locations of the feed zones FZ1 and FZ2 related to the lines DR1 and DR2 shown in FIG. 16 are merely of an example, and the location of each of the feed zones of an antenna can be adjusted according to the structure and the performance of the antenna.

Figure 17:
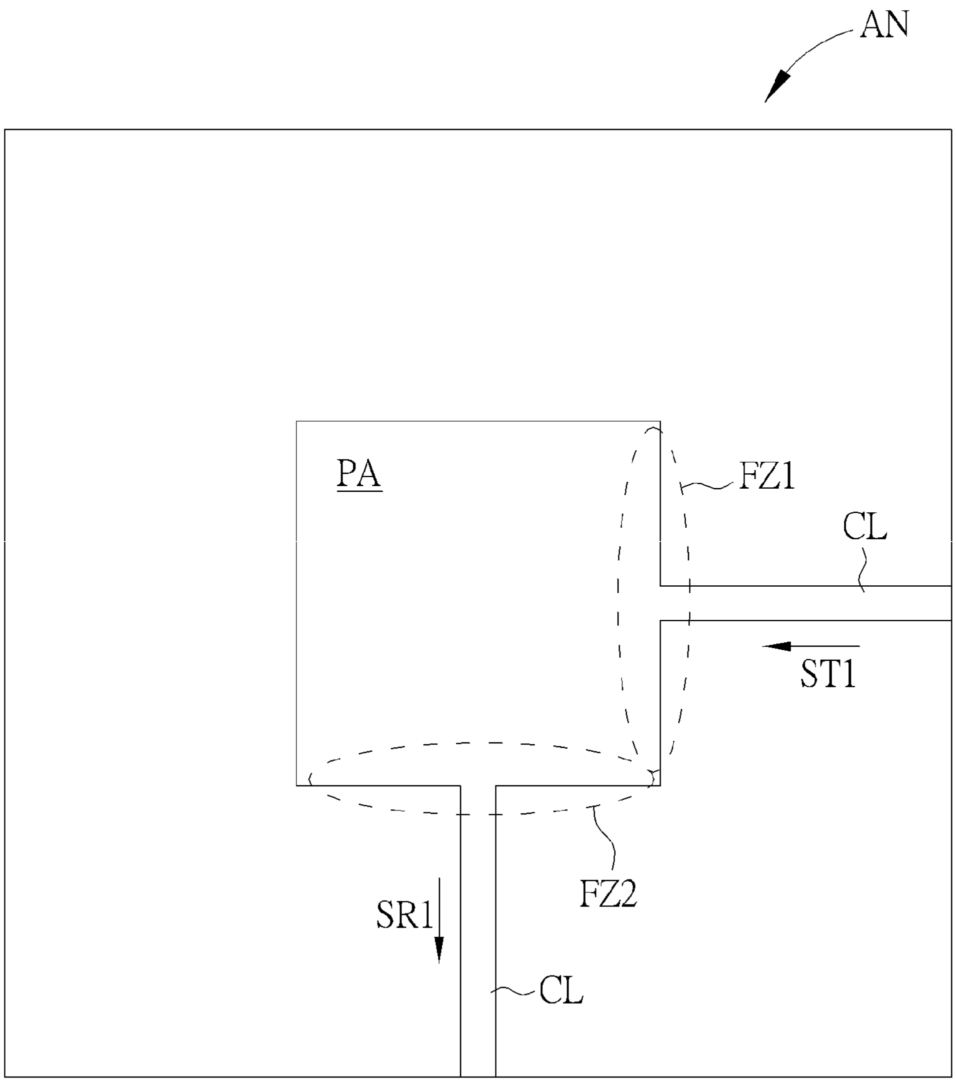
FIG. 17 and FIG. 18 respectively illustrate a top view and a side view of the dual-polarized antenna of FIG. 16.
Figure 18:
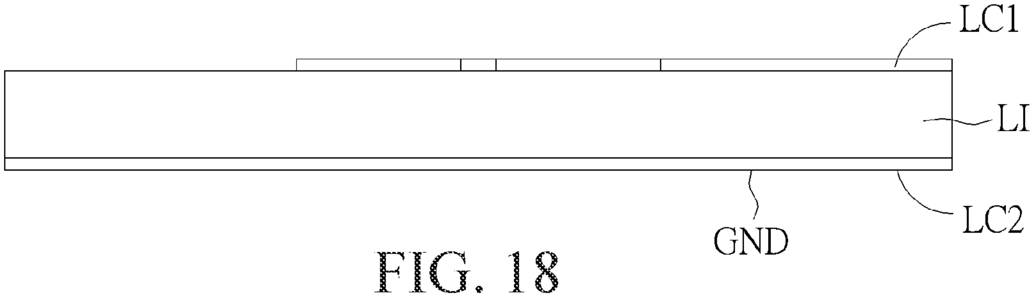

FIG. 17 and FIG. 18 respectively illustrate a top view and a side view of the dual-polarized antenna AN according to an embodiment. As shown in FIG. 17 and FIG. 18, the dual-polarized antenna AN may include a patch PA, a conductive line CL, a ground GND, an insulation layer LI. The patch PA may be formed on a first conductive layer LC1. The conductive line CL may be formed on the first conductive layer LC1, coupled to one of the first feed zone FZ1 and the second feed zone FZ2, and used to access the transmission signal ST1 or the reception signal SR1 accordingly. The ground GND may be formed on a second conductive layer LC2. The insulation layer LI may be located between the first conductive layer LC1 and the second conductive layer LC2. The first conductive layer LC1 may or may not be insulated from the second conductive layer LC2 according to embodiments. In FIG. 17 and FIG. 18, the conductive line CL may be a microstrip line. Each insulation layer mentioned in the text may be a substrate.

Figure 19:
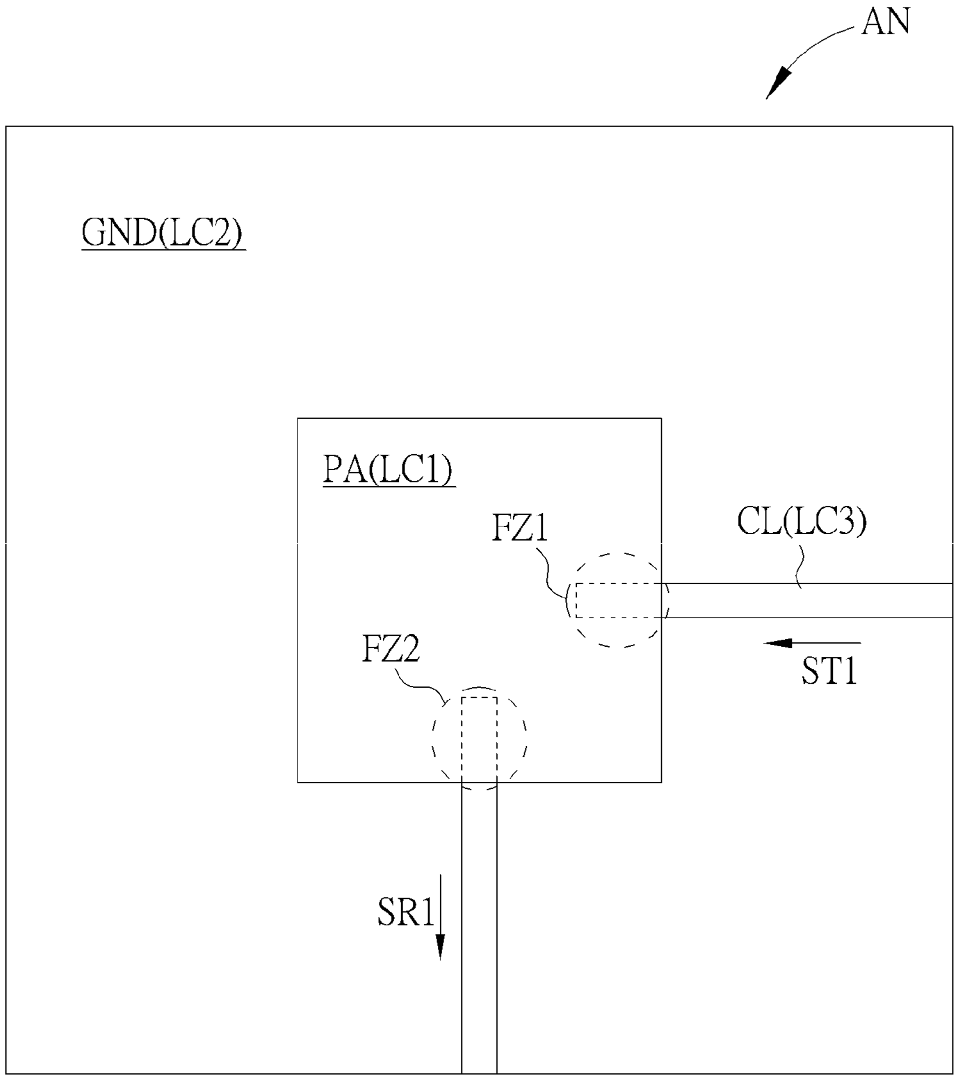
FIG. 19 and FIG. 20 respectively illustrate a top view and a side view of the dual-polarized antenna according to another embodiment.
Figure 20:
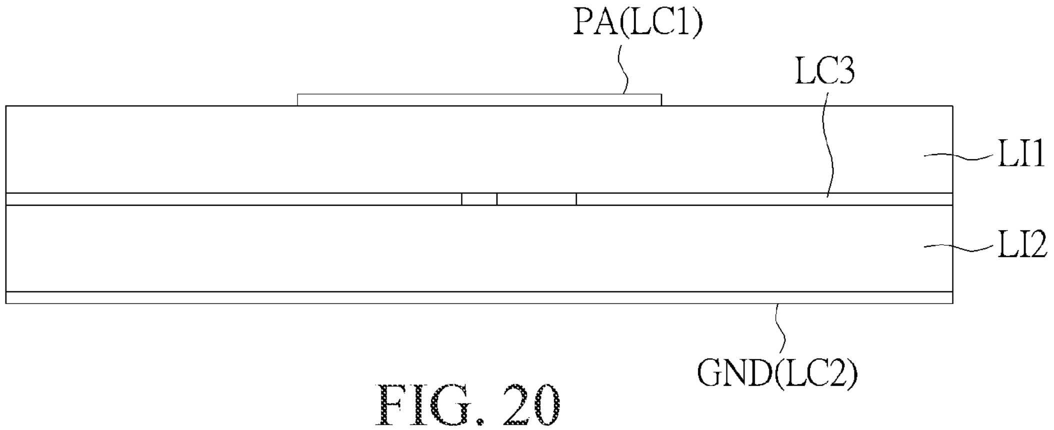

FIG. 19 and FIG. 20 respectively illustrate a top view and a side view of the dual-polarized antenna AN according to another embodiment. As shown in FIG. 19 and FIG. 20, the dual-polarized antenna AN may include a patch PA, a ground GND, a conductive line CL, a first insulation layer LI1 and a second insulation layer LI2. The patch PA may be formed on a first conductive layer LC1. The ground GND may be formed on a second conductive layer LC2. The conductive line CL may be formed on a third conductive layer LC3, disposed to overlap one of the first feed zone FZ1 and the second feed zone FZ2, and used to access the transmission signal ST1 or the reception signal SR1 accordingly. The first insulation layer LI1 may be located between the first conductive layer LC1 and the third conductive layer LC3. The second insulation layer LI2 may be located between the second conductive layer LC2 and the third conductive layer LC3. As shown in FIG. 20, the third conductive layer LC3 may be located between the first conductive layer LC1 and the second conductive layer LC2. The first conductive layer LC1, the second conductive layer LC2 and the third conductive layer LC3 may or may not be insulated from one another according to embodiments. In FIG. 19 and FIG. 20, the conductive line CL may be a microstrip line.

Figure 21:
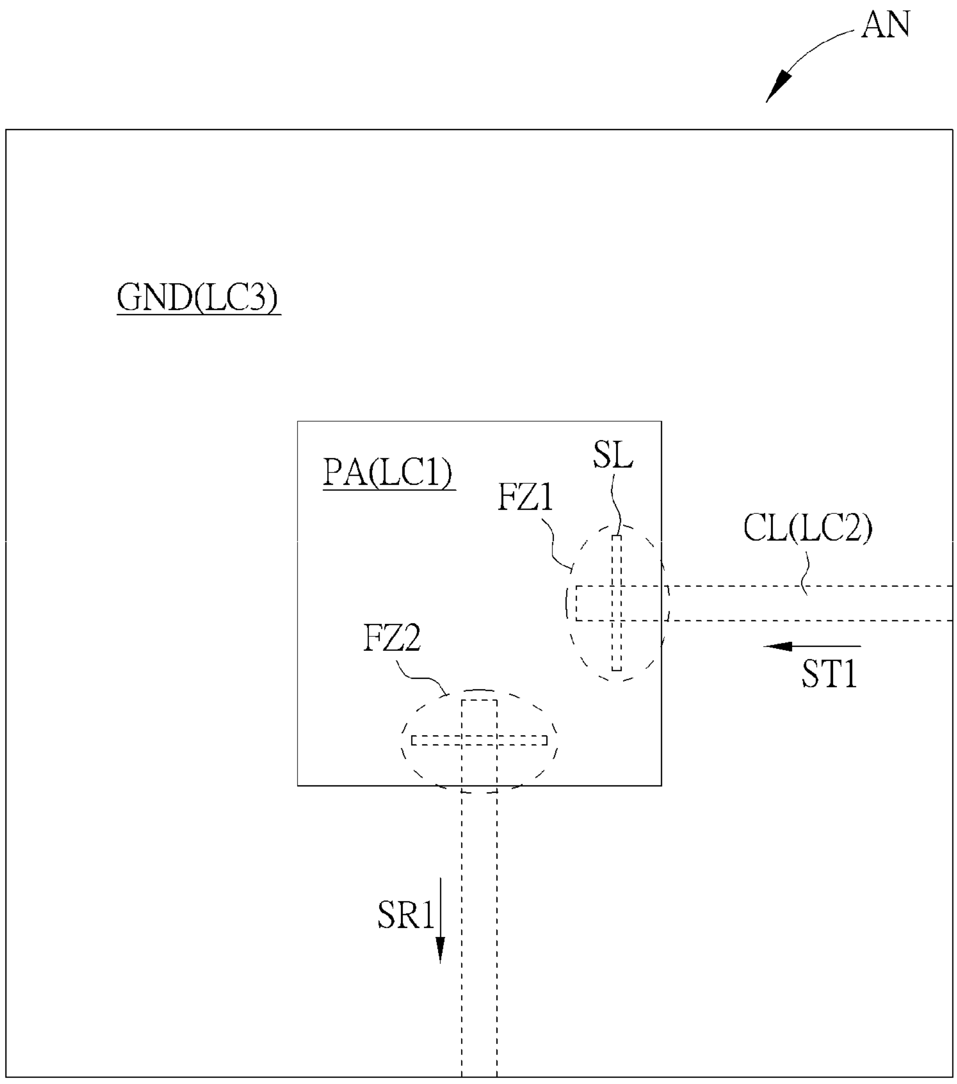
FIG. 21 and FIG. 22 respectively illustrate a top view and a side view of the dual-polarized antenna according to another embodiment.
Figure 22:
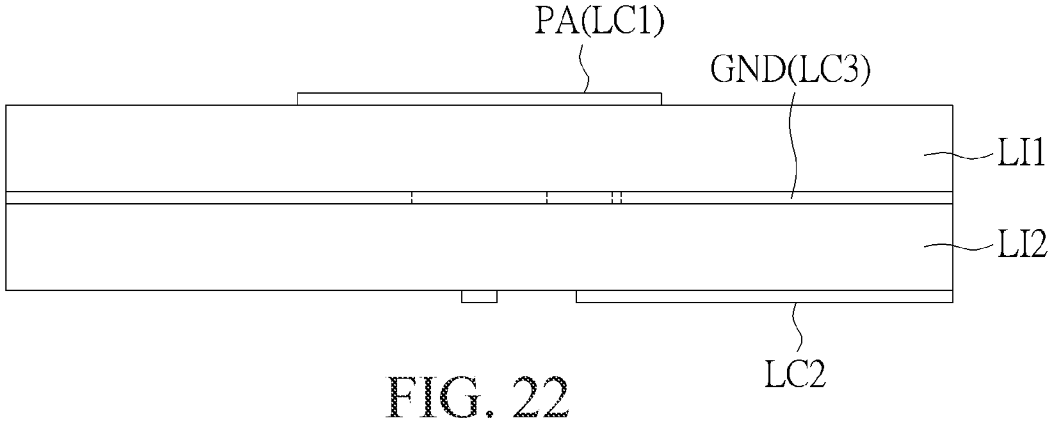

FIG. 21 and FIG. 22 respectively illustrate a top view and a side view of the dual-polarized antenna AN according to another embodiment. The dual-polarized antenna AN may include a patch PA, a conductive line CL, a ground GND, a slot SL, a first insulation layer LI1 and a second insulation layer LI2. The patch PA may be formed on a first conductive layer LC1. The conductive line CL may be formed on a second conductive layer LC2, disposed to overlap one of the first feed zone FZ1 and the second feed zone FZ2, and used to access the transmission signal ST1 or the reception signal SR1 accordingly. The ground GND may be formed on a third conductive layer LC3. The slot SL may be generated on the third conductive layer LC3 and located between the conductive line CL and the patch PA. The first insulation layer LI1 may be located between the first conductive layer LC1 and the third conductive layer LC3. The second insulation layer LI2 may be located between the third conductive layer LC3 and the second conductive layer LC2. The third conductive layer LC3 may be between the first conductive layer LC1 and the second conductive layer LC2. The first conductive layer LC1, the second conductive layer LC2 and the third conductive layer LC3 may or may not be insulated from one another according to embodiments. In FIG. 21 and FIG. 22, signals may be transmitted between the patch PA and the conductive line CL with the coupling effect through the slot SL.

In some embodiments, the slot SL has a narrow rectangular shape, and in some other embodiments, the slot SL may have a rectangular shape, an H shape, a circular shape, an oval shape or an irregular shape. Each of the first feed zone FZ1 and the second feed zone FZ2 may be located near a side of the patch PA, a center of the patch PA or a corner of the patch PA. For example, when the first feed zone FZ1 is near the bottom right corner of the patch PA, the slot SL may be formed at the bottom right corner of the patch PA, and the conductive line CL may overlap the bottom right corner of the patch PA.

In FIG. 17 to FIG. 22, the conductive line CL may be a line (e.g. a microstrip line) coupled to one of the transmission circuit 110 and the reception circuit 120. However, in the dual-polarized antenna AN, a conductive element coupled to the transmission circuit 110 and the reception circuit 120 may be a probe instead of being limited to a line.

Figure 23:
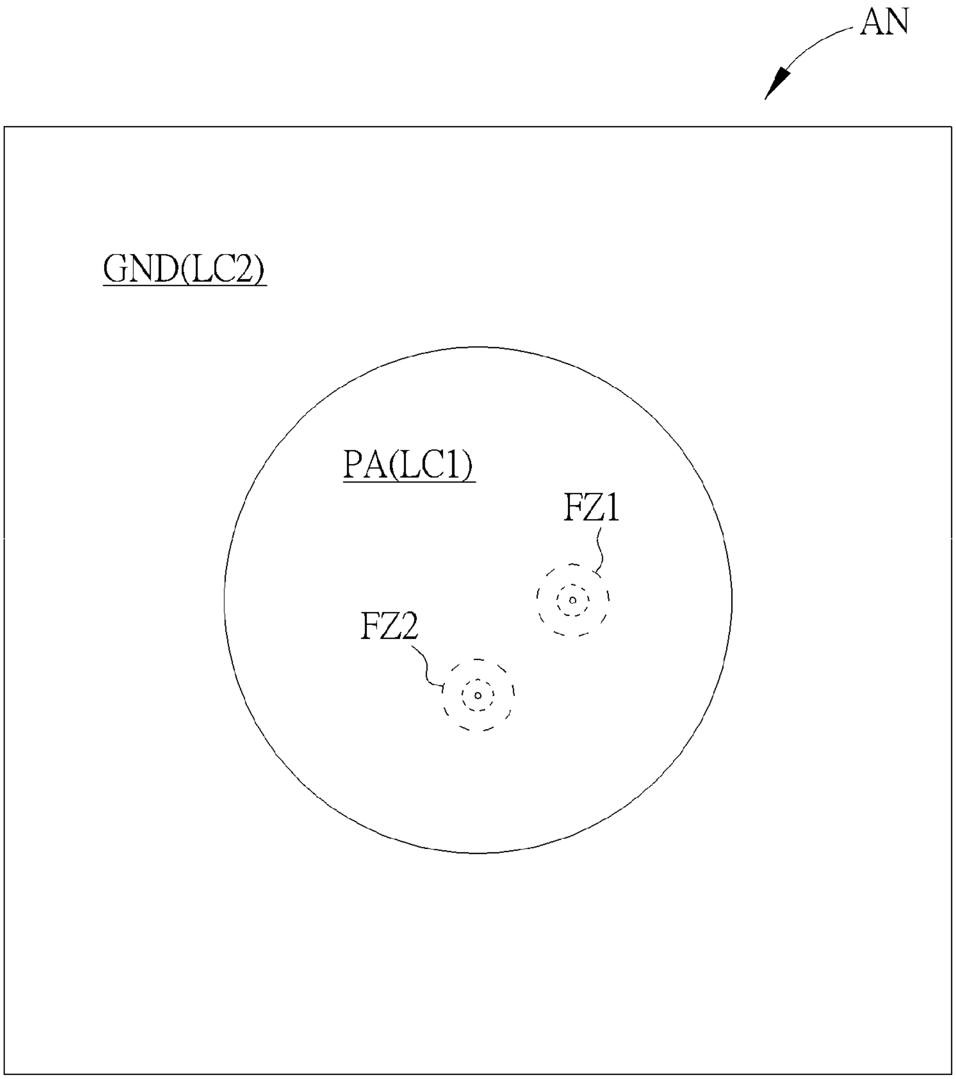
FIG. 23 and FIG. 24 respectively illustrate a top view and a side view of the dual-polarized antenna according to another embodiment.
Figure 24:
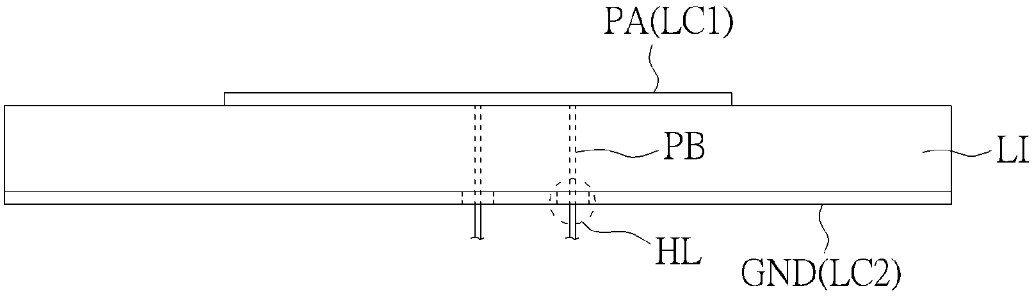

FIG. 23 and FIG. 24 respectively illustrate a top view and a side view of the dual-polarized antenna AN according to another embodiment. As shown in FIG. 23 and FIG. 24, the dual-polarized antenna AN may include a patch PA, a ground GND, a hole HL, a probe PB and an insulation layer LI. The patch PA may be formed on a first conductive layer LC1. The ground GND may be formed on a second conductive layer LC2. The hole HL may be formed on the second conductive layer LC2 and disposed to overlap one of the first feed zone FZ1 and the second feed zone FZ2. The probe PB may be disposed through the hole HL. The probe PB may include a first terminal coupled to the patch PA and a second terminal coupled to one of the transmission circuit 110 and the reception circuit 120. The probe PB may be used to access the transmission signal ST1 or the reception signal SR1 accordingly. The insulation layer LI may be located between the first conductive layer LC1 and the second conductive layer LC2. The first conductive layer LC1 may or may not be insulated from the second conductive layer LC2.

In FIG. 23, the patch PA has a circular shape as an example, and the patch PA may have another shape such as the rectangular shape shown in FIG. 17.

Figure 25:
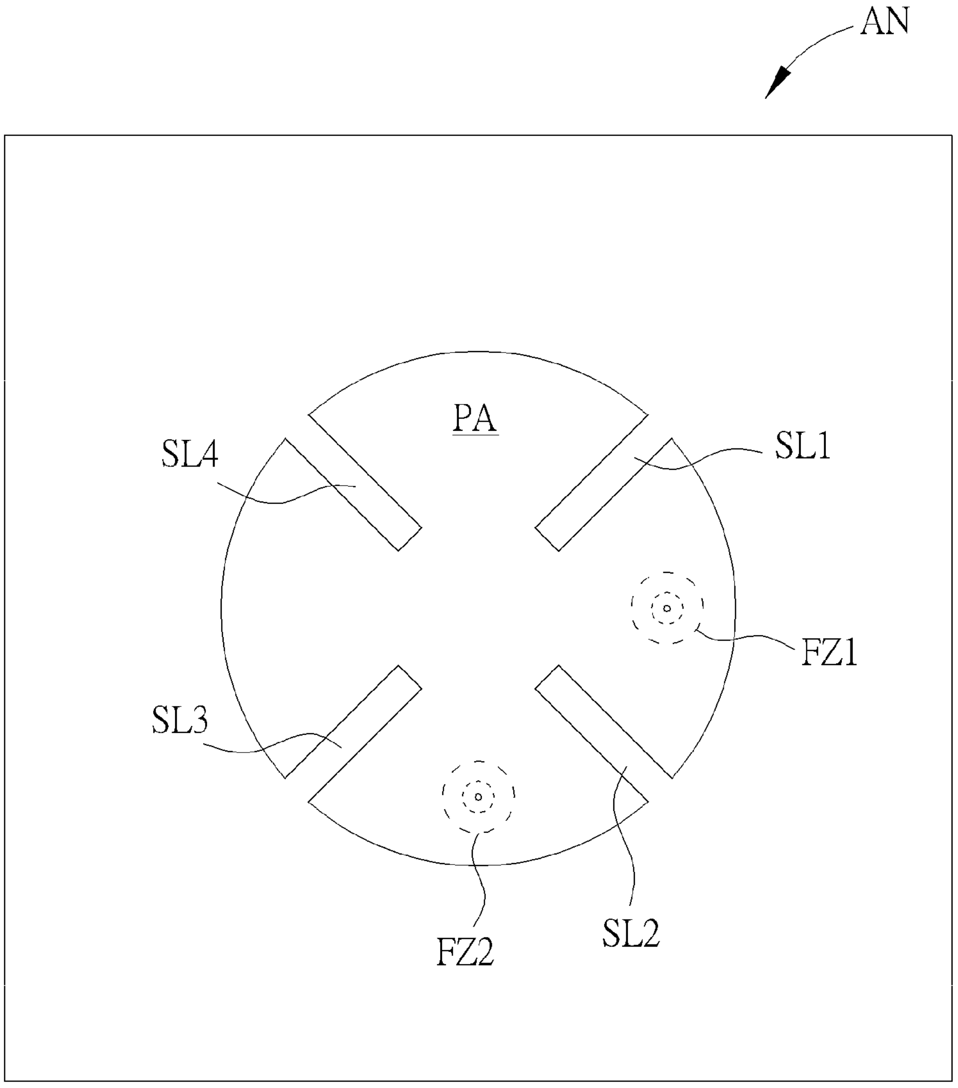
FIG. 25 illustrates a top view of the dual-polarized antenna according to another embodiment.

FIG. 25 illustrates a top view of the dual-polarized antenna AN according to another embodiment. The patch PA in FIG. 25 may be similar to that in FIG. 23 and further includes a first slot SL1, a second slot SL2, a third slot SL3 and a fourth slot SL4. The first slot SL1, the second slot SL2, the third slot SL3 and the fourth slot SL4 may be formed on the patch PA and disposed to respectively cut off a first part, a second part, a third part and a fourth part of an edge of the patch PA. The first feed zone FZ1 may be located between the first slot SL1 and the second slot SL2. The second feed zone FZ2 may be located between the second slot SL2 and the third slot SL3. The second slot SL2 may be opposite to the fourth slot SL4, and the first slot SL1 may be opposite to the third slot SL3.

In the example of FIG. 25, each slot has a long straight shape; however, embodiments are not limited thereto. Each slot may have another shape such as a triangular shape or an L shape as shown in FIG. 26.

Figure 26:
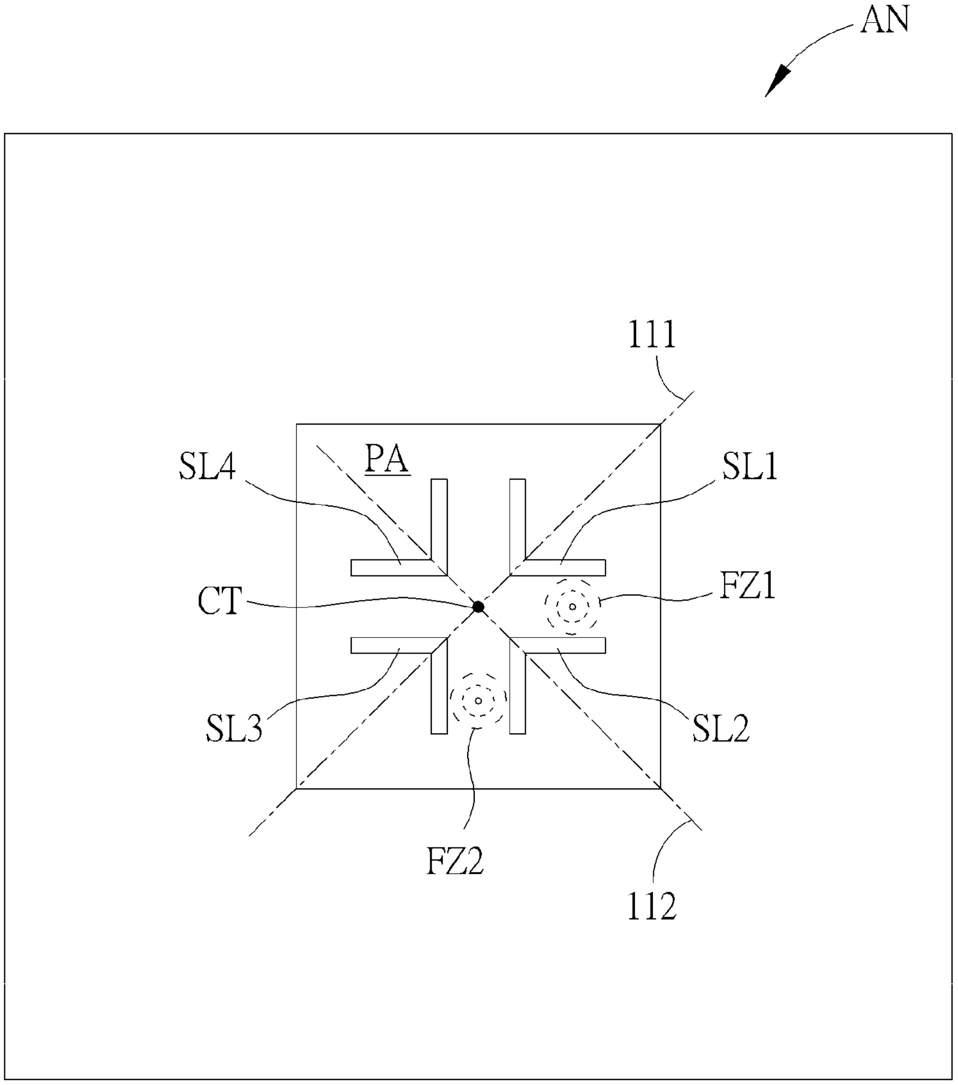
FIG. 26 illustrates a top view of the dual-polarized antenna according to another embodiment.

FIG. 26 illustrates a top view of the dual-polarized antenna AN according to another embodiment. In FIG. 26, a first slot SL1, a second slot SL2, a third slot SL3 and a fourth slot SL4 may be formed on the patch PA. The slots SL1 to SL4 may be symmetrically disposed around a shape centroid CT of the patch PA. Each of the slots SL1 to SL4 can have a substantially same shape. The first slot SL1 may be opposite to the third slot SL3, and the second slot SL2 may be opposite to the fourth slot SL4.

According to embodiments, the shape of each of the slots SL1 to SL4 may be (but not limited to be) an I-shape or a non-linear shape. For example, the non-linear shape may be (but not limited to be) an arc shape or an L shape. In FIG. 26, the slots SL1 to SL4 each has an L shape as an example instead of limiting the scope of embodiments. Moreover, with regarding the shape centroid CT, the slots SL1 and SL3 may be of point symmetry (i.e. rotational symmetry) with one another; and the slots SL2 and SL4 may be of point symmetry with one another.

In the example of FIG. 26, each of the first slot SL1, the second slot SL2, the third slot SL3 and the fourth slot SL4 may have an L shape so as to have a first part, a second part and a turning point connected to the first part and the second part. For example, the first slot SL1 may have a first par and a second part perpendicular to each other.

As shown in FIG. 26, a first line 111 may be defined by a turning point of the first slot SL1 and a turning point of the third slot SL3. A second line 112 may be defined by a turning point of the second slot SL2 and a turning point of the fourth slot SL4. A shape centroid CT of the patch PA may be on a cross point of the first line 111 and the second line 112. However, FIG. 26 is merely an example, and the locations of the slots may not be exactly symmetrical as long as the performance of the dual-polarized antenna AN is acceptable.

According to an embodiment, when the patch PA has a rectangular shape with four sides, the first part and/or the second part of each of the first slot SL1, the second slot SL2, the third slot SL3 and the fourth slot SL4 may be substantially parallel to one of the sides of the patch PA. In another example, the first part and/or the second part of each of the slots may not be parallel to one of the sides of the patch PA.

By cutting slots on the patch PA, since the currents may flow along the edges of the slots, the path of the current may be lengthened, and the area of the patch PA may be reduced for accessing signals of the same frequency. In other words, the size of the antenna can be reduced.

Figure 27:
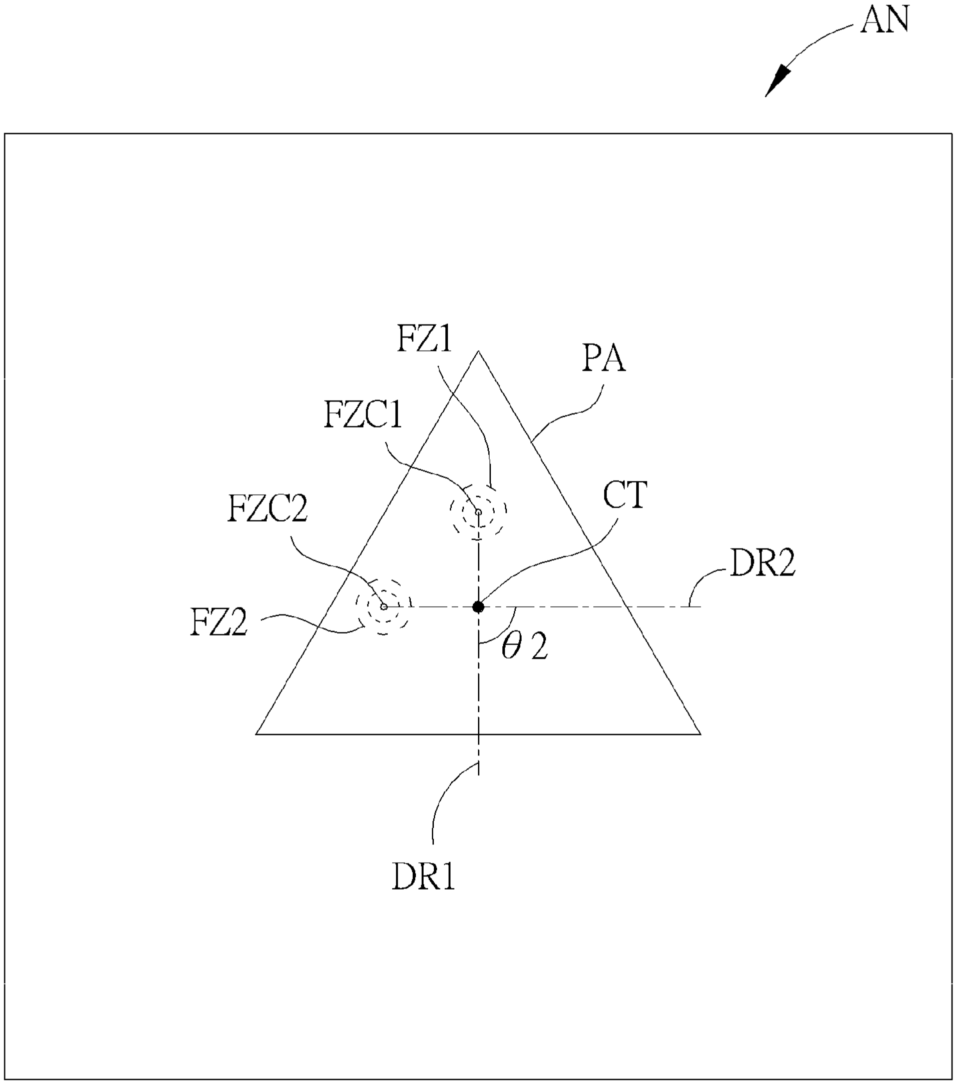
FIG. 27 illustrates a top view of the dual-polarized antenna according to another embodiment.

FIG. 27 illustrates a top view of the dual-polarized antenna AN according to another embodiment. FIG. 27 may be similar to FIG. 23; however, unlike FIG. 23, the patch PA may have a triangular shape. The first line DR1 may be defined by the shape centroid FZC1 of the first feed zone FZ1 and the shape centroid CT of the patch PA. The second line DR2 may be defined by the shape centroid FZC2 of the second feed zone FZ2 and the shape centroid CT. The first line DR1 and the second line DR2 may also form the angle θ2 between 45 degrees to 135 degrees.

Figure 28:
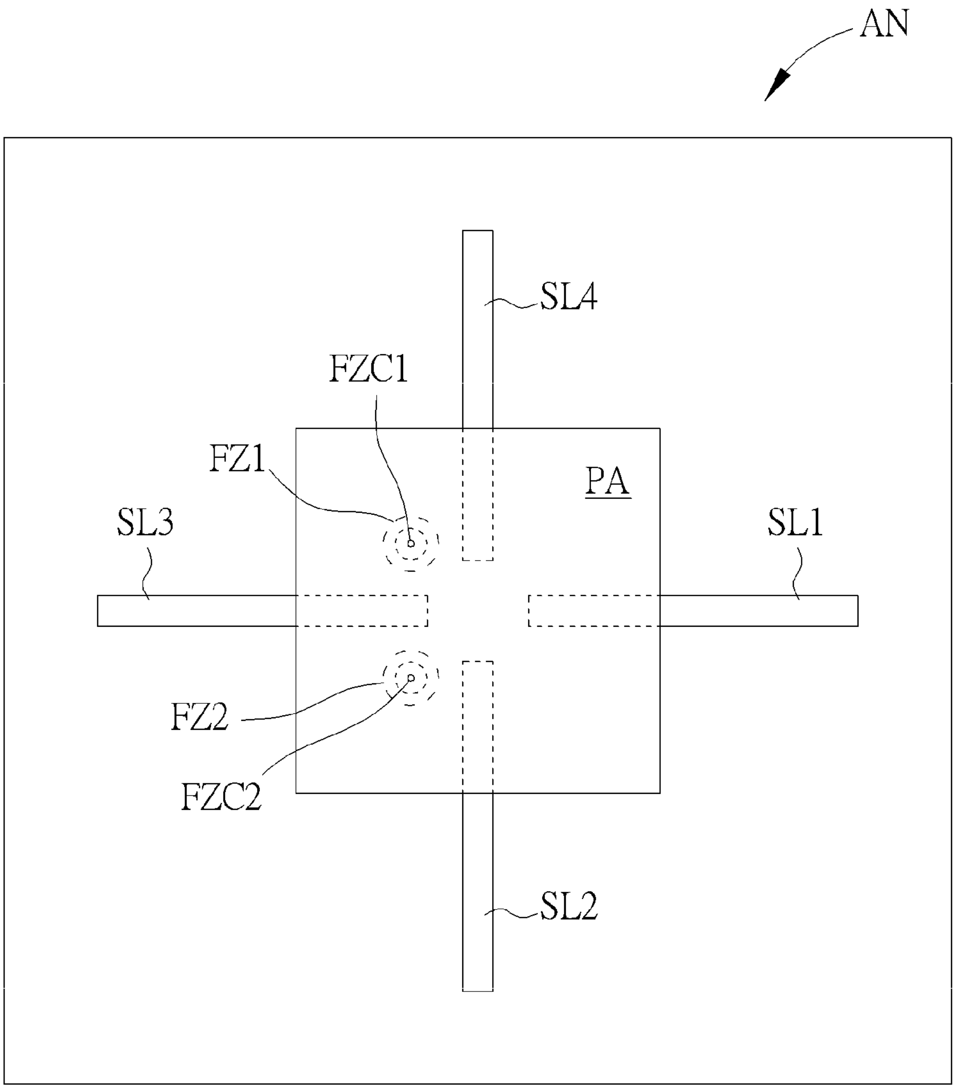
FIG. 28 illustrates a top view of the dual-polarized antenna according to another embodiment.

FIG. 28 illustrates a top view of the dual-polarized antenna AN according to another embodiment. FIG. 28 may be similar to FIG. 23; however, unlike FIG. 23, the patch PA may have a rectangular shape in FIG. 28, and a plurality of slots may be formed on the ground GND in FIG. 28. As shown in FIG. 28, a first slot SL1, a second slot SL2, a third slot SL3 and a fourth slot SL4 may be formed on the ground GND formed on the second conductive layer LC2 (where the second conductive layer LC2 is shown in FIG. 24). A shape centroid FZC1 of the first feed zone FZ1 may overlap an area between two adjacent slots (e.g., the slots SL3 and SL4) of the first slot SL1 to the fourth slot SL4. A shape centroid FZC2 of the second feed zone may overlap an area between another two adjacent slots (e.g., the slots SL2 and SL3) of the first slot SL1 to the fourth slot SL4.

Figure 29:
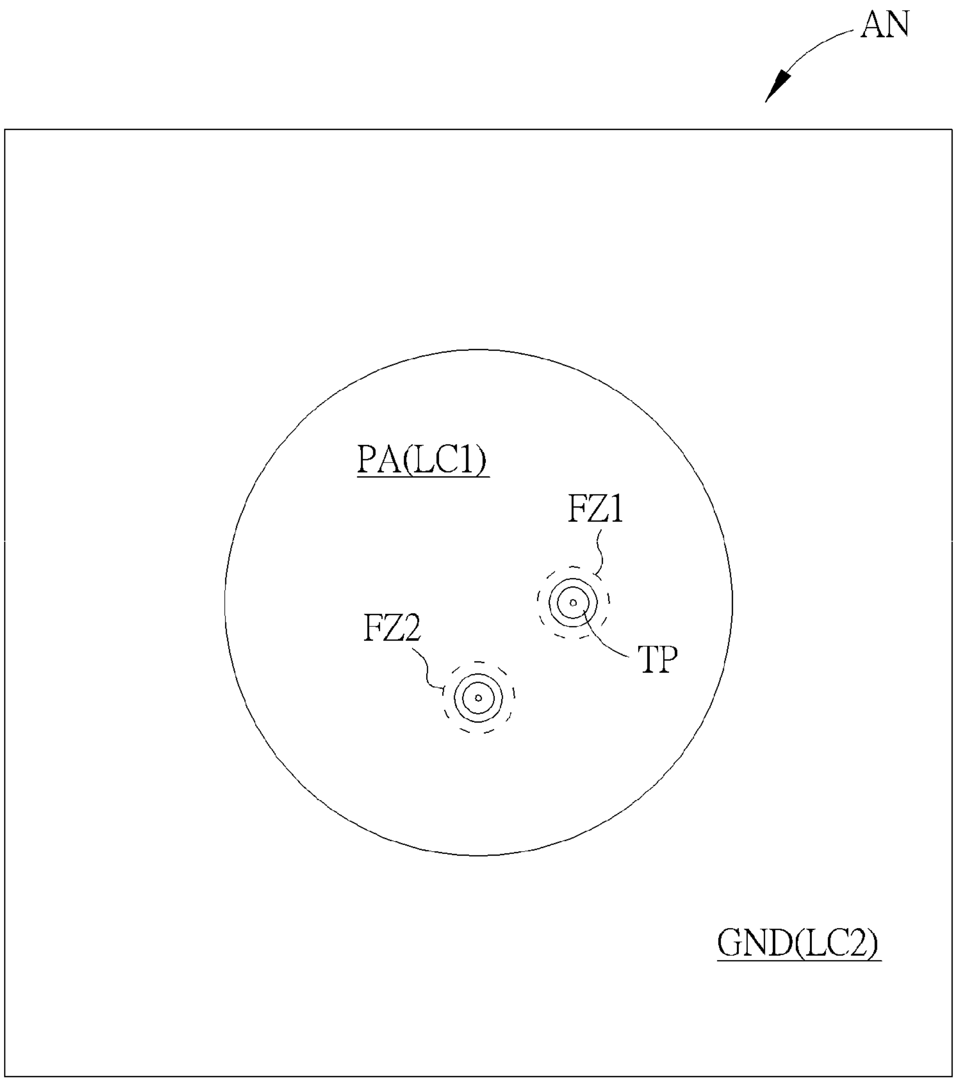
FIG. 29 and FIG. 30 respectively illustrate a top view and a partial side view of the dual-polarized antenna according to another embodiment.
Figure 30:
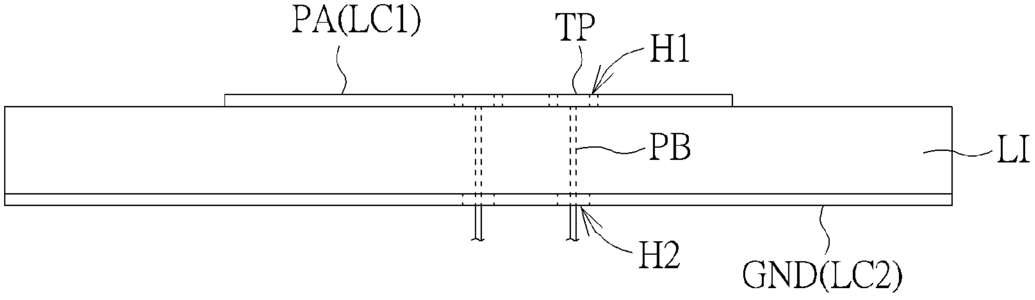

FIG. 29 and FIG. 30 respectively illustrate a top view and a partial side view of the dual-polarized antenna AN according to another embodiment. The dual-polarized antenna AN in FIG. 29 may include a patch PA, a ground GND and an insulation layer LI like FIG. 23 and FIG. 24, and further include a conductive top portion TP and a probe PB. The patch PA may be formed on a first conductive layer LC1 and include a first hole H1. The ground GND may be formed on a second conductive layer LC2 and include a second hole H2. The insulation layer LI may be formed between the first conductive layer LC1 and the second conductive layer LC2. The conductive top portion TP may be formed on the first conductive layer LC1 and located in the first hole H1. The probe PB may be located through the second hole H2. The probe PB may include a first terminal coupled to the conductive top portion TP and a second terminal coupled to one of the transmission circuit 110 and the reception circuit 120. The probe PB may be used to access the transmission signal ST1 or the reception signal SR1 accordingly. The first hole H1 and the second hole H2 may overlap one of the first feed zone FZ1 and the second feed zone FZ2. The probe PB and the conductive top portion TP may be insulated from each of the first conductive layer LC1 and the second conductive layer LC2. The first conductive layer LC1 may or may not be insulated from the second conductive layer LC2 according to embodiments. As shown in FIG. 29 and FIG. 30, the conductive top portion TP and the probe PB may form a "pushpin" shape, and transmit and receive signals to and from the patch PA with the coupling effect.

Figure 31:
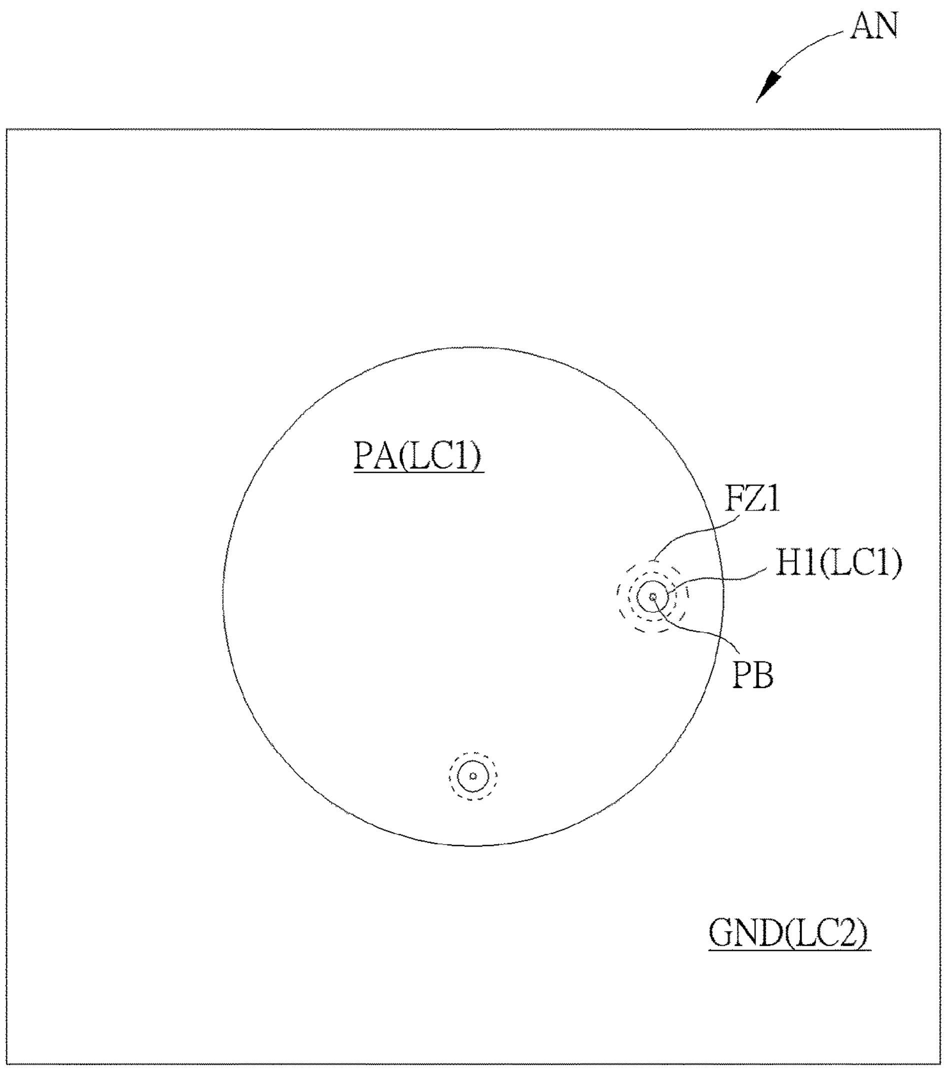
FIG. 31 illustrates a top view of the dual-polarized antenna according to another embodiment.
Figure 32:
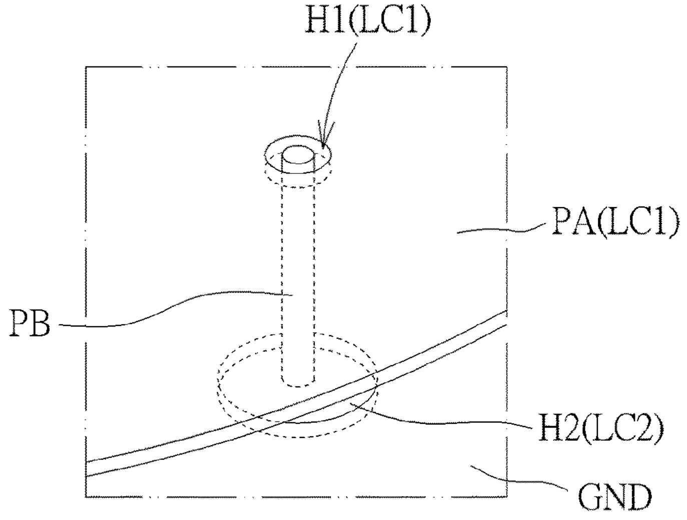
FIG. 32 illustrates a perspective view of the dual-polarized antenna in FIG. 31.

FIG. 31 illustrates a top view of the dual-polarized antenna AN according to another embodiment. FIG. 32 illustrates a perspective view of the dual-polarized antenna AN in FIG. 31. The dual-polarized antenna AN in FIG. 31 and FIG. 32 may be similar to that in FIG. 29 and FIG. 30; however, the dual-polarized antenna AN in FIG. 31 and FIG. 32 may not include the conductive top portion TP. As the dual-polarized antenna AN in FIG. 29, in FIG. 31 and FIG. 32, the probe PB may transmit and receive signals to and from the patch PA with the coupling effect.

Figure 33:
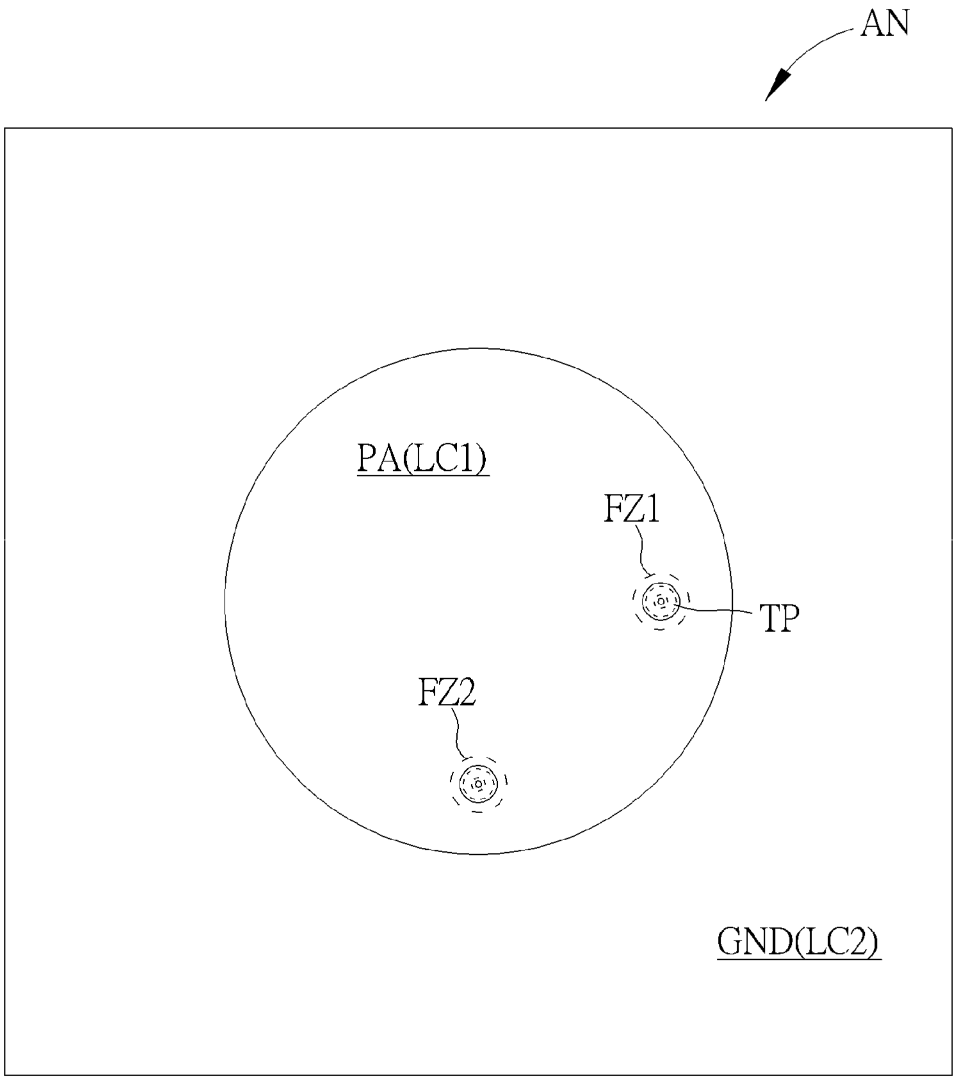
FIG. 33 and FIG. 34 respectively illustrate a top view and a partial side view of the dual-polarized antenna according to another embodiment.
Figure 34:
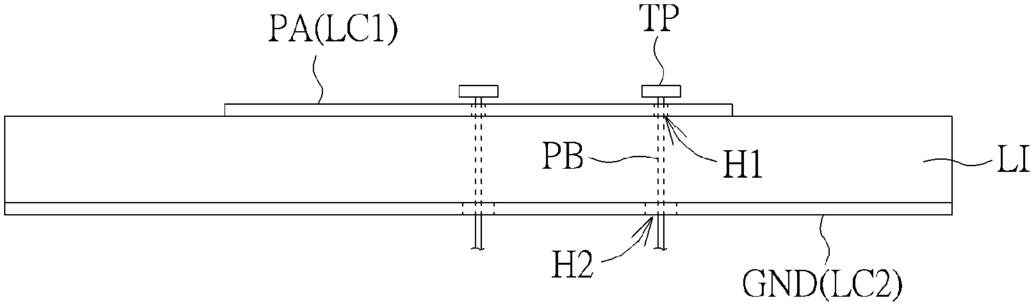

FIG. 33 and FIG. 34 respectively illustrate a top view and a partial side view of the dual-polarized antenna AN according to another embodiment. The dual-polarized antenna AN in FIG. 33 and FIG. 33 may be similar to that in FIG. 29 and FIG. 30; however, the conductive top portion TP in FIG. 33 and FIG. 34 may be located above the first hole H1 and the first conductive layer LC1 instead of in the first hole H1. Hence, the diameter of the conductive top portion TP in FIG. 33 and FIG. 34 may be larger than the diameter of the first hole H1. The conductive top portion TP may be generated using a conductive layer located above the first conductive layer LC1 and the second conductive layer LC2.

Figure 35:
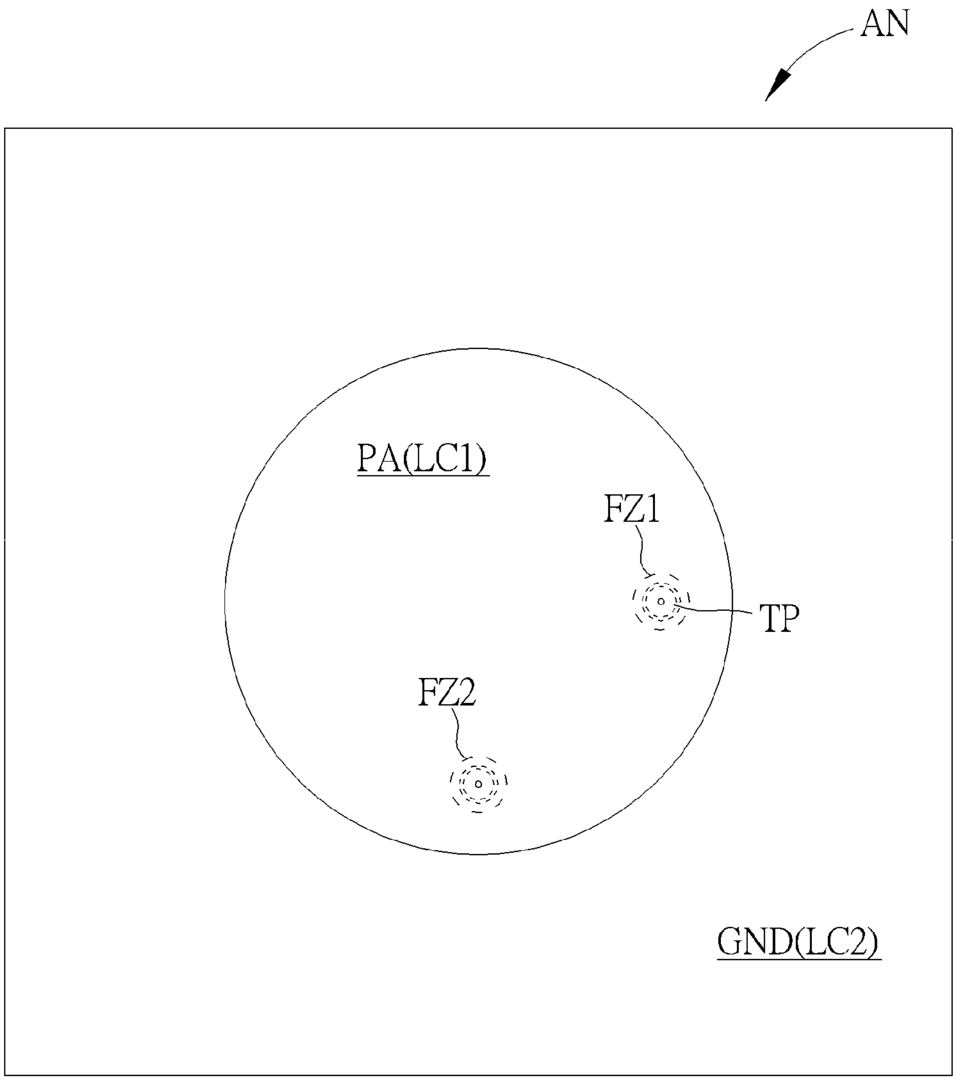
FIG. 35 illustrates a top view of the dual-polarized antenna according to another embodiment.
Figure 36:
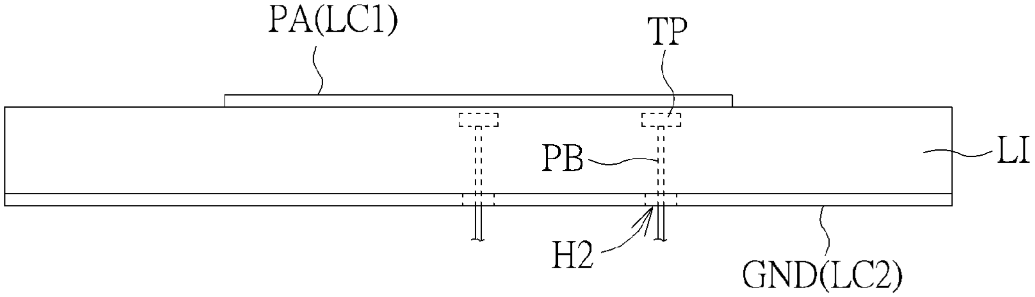
FIG. 36 illustrates a partial side view of the dual-polarized antenna in FIG. 35.

FIG. 35 illustrates a top view of the dual-polarized antenna AN according to another embodiment. FIG. 36 illustrates a partial side view of the dual-polarized antenna AN in FIG. 35. The dual-polarized antenna AN in FIG. 35 may be similar to that in FIG. 29; however, in FIG. 35, the conductive top portion TP may be located between the first conductive layer LC1 and the second conductive layer LC2 instead of being located in a hole on the first conductive layer LC1. Hence, as shown in FIG. 35 and FIG. 36, the second conductive layer LC2 may have a hole H2 while no hole is generated on the first conductive layer LC1. The conductive top portion TP may be generated using a conductive layer located between the first conductive layer LC1 and the second conductive layer LC2.

As shown in FIG. 35 and FIG. 36, the conductive top portion TP may have a circular shape; however, the conductive top portion TP may be in another shape. For example, the top conductive portion TP may have a rectangular shape, a square shape, an oval shape, a circular shape or an irregular shape. The top conductive portion TP may have a first side and a second side, and the first terminal of the probe PB may be coupled to the second side of top conductive portion TP.

Figure 37:
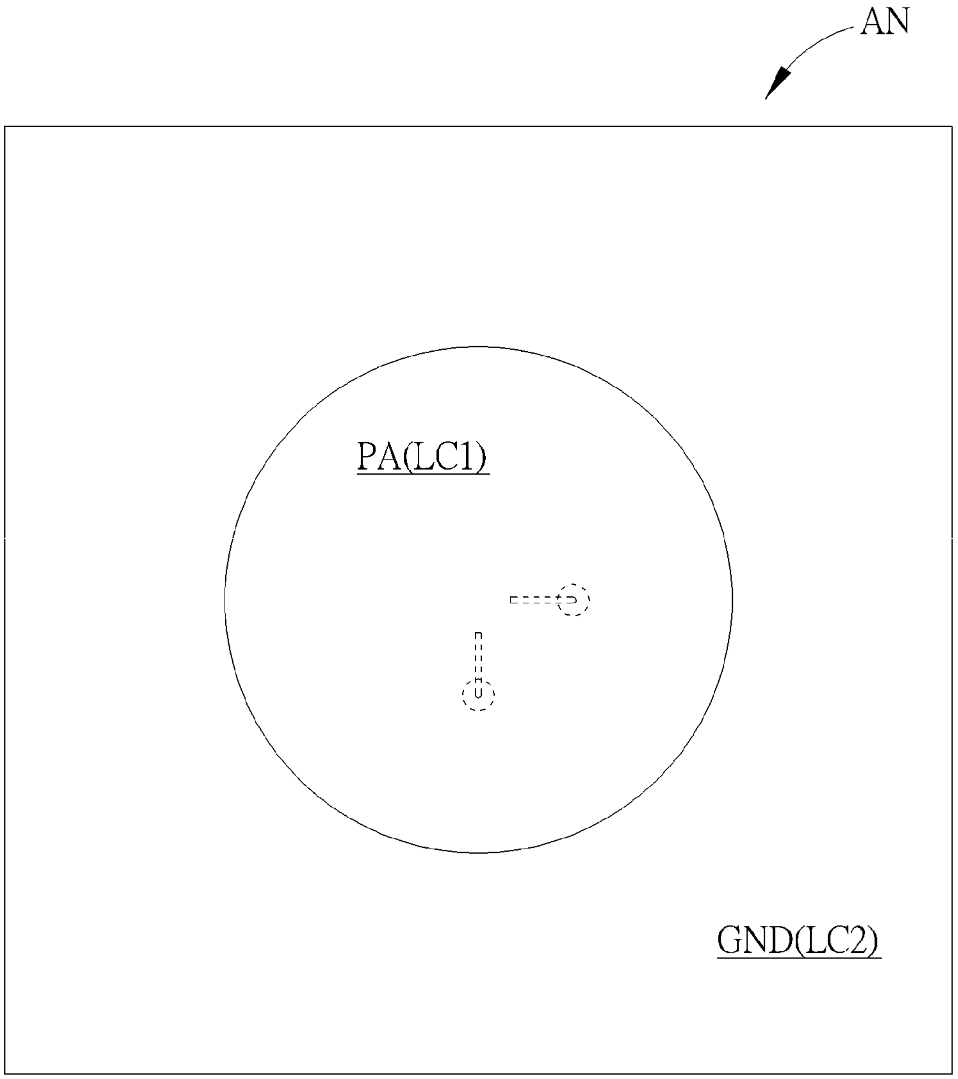
FIG. 37 illustrates a top view of the dual-polarized antenna according to another embodiment.
Figure 38:
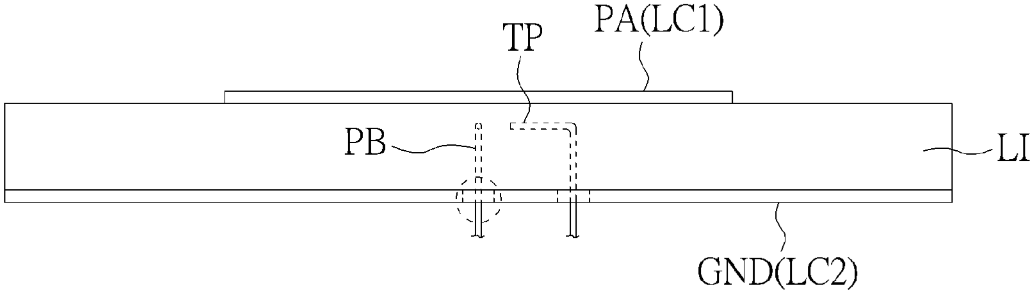
FIG. 38 illustrates a side view of the dual-polarized antenna in FIG. 37.

FIG. 37 illustrates a top view of the dual-polarized antenna AN according to another embodiment. FIG. 38 illustrates a side view of the dual-polarized antenna AN in FIG. 37. The dual-polarized antenna AN in FIG. 37 and FIG. 38 may be similar to that in FIG. 35 and FIG. 36; however, the top conductive portion TP in FIG. 37 and FIG. 38 may have a first terminal and a second terminal coupled to the first terminal of the probe PB, and the top conductive portion TP may be substantially perpendicular to the probe PB. In other words, the top conductive portion TP and the probe PB may form a turned L shape structure.

Figure 39:
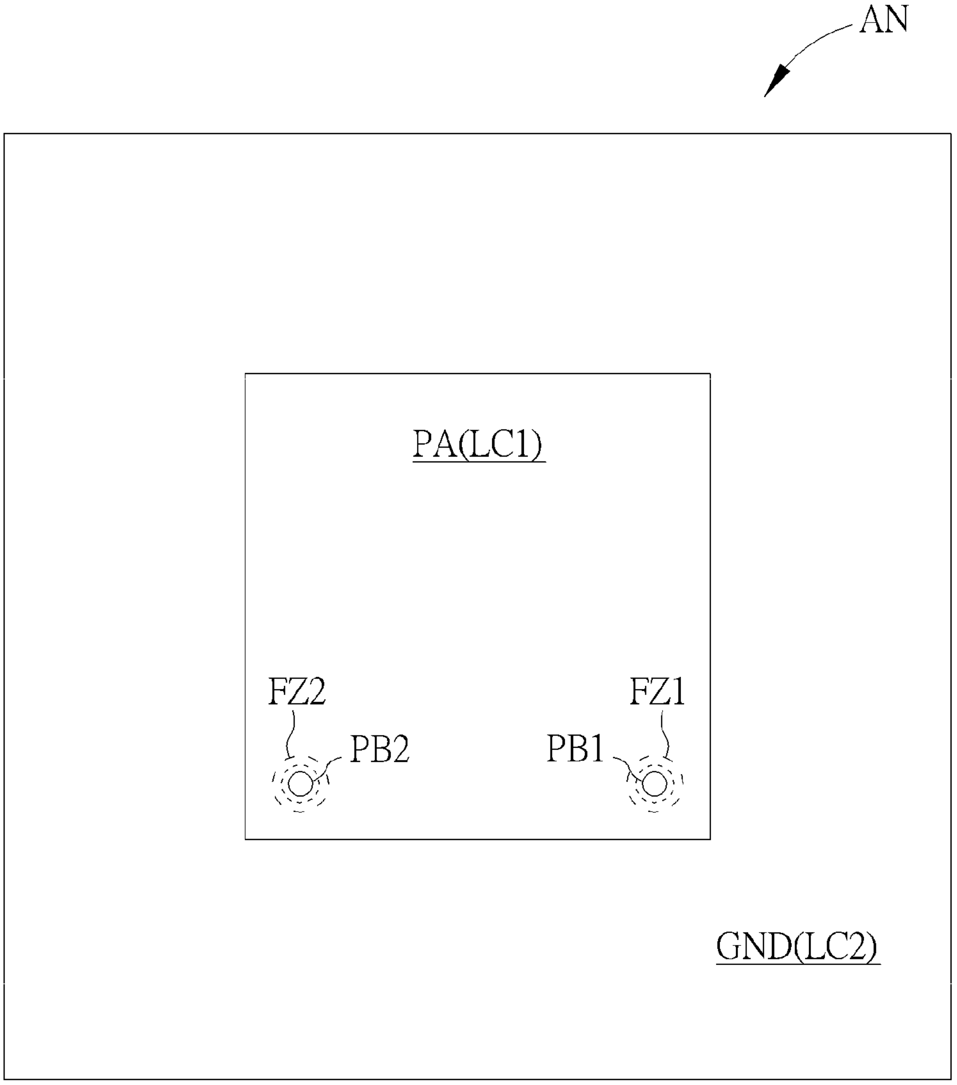
FIG. 39 illustrates a top view of the dual-polarized antenna according to another embodiment.

FIG. 39 illustrates a top view of the dual-polarized antenna AN according to another embodiment. The dual-polarized antenna AN in FIG. 39 may be similar to that in FIG. 29, FIG. 31, FIG. 33, FIG. 35 or FIG. 37. However, in FIG. 39, the patch PA may have a rectangular shape, and the two probes PB1 and PB2 of the dual-polarized antenna AN in FIG. 39 may be located at two corners of the patch PA. The two probes PB1 and PB2 may be used to transmit and receive signals to the reception circuit 120 and from the transmission circuit 110 and may access signals with the patch PA using the coupling effect.

Figure 40:
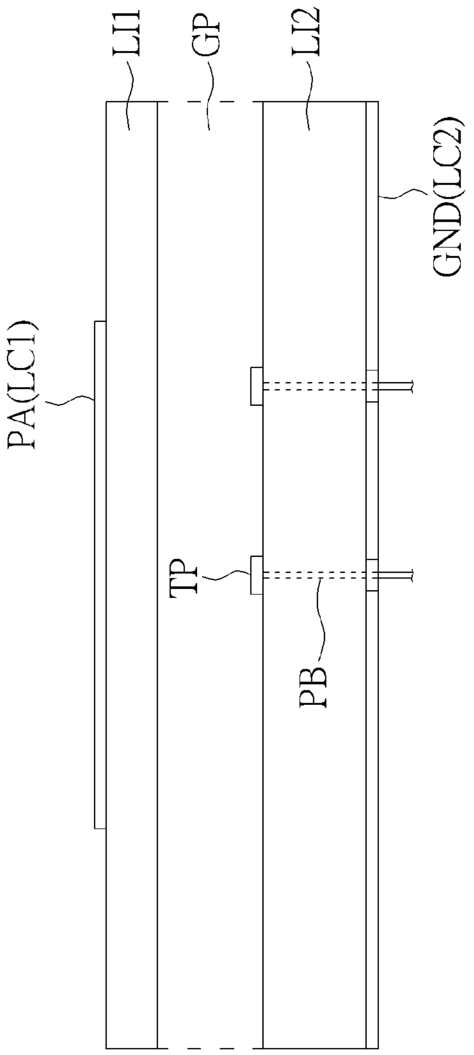
FIG. 40 illustrates a side view of the dual-polarized antenna according to another embodiment.

FIG. 40 illustrates a side view of the dual-polarized antenna AN according to another embodiment. The dual-polarized antenna AN in FIG. 40 may be similar to that in FIG. 35 and FIG. 36. The dual-polarized antenna AN in FIG. 40 may include a conductive top portion TP and a probe PB coupled to one another and used to transmit signal to the patch PA or receive signal from the patch PA using the coupling effect. The dual-polarized antenna AN in FIG. 40 may include a first insulation layer LI1, a second insulation layer LI2 and a gap GP. The first insulation layer LI1 may be located between the first conductive layer LC1 and the second conductive layer LC2. The second insulation layer LI2 may be located between the first insulation layer LC1 and the second conductive layer LC2 and include a first side and a second side where the second conductive layer LC2 is at the second side. The gap GP may be located between the first insulation layer LI1 and the second insulation layer LI2. As FIG. 35, the second conductive layer LC2 may have a hole for the probe PB to pass through to be coupled to the transmission circuit 110 or the reception circuit 120.

In the text, each of the mentioned insulation layers may be a substrate or a layer made of an insulation material. For example, when the insulation material is air, the insulation layer may be a gap. In the text, each of the mentioned conductive lines may be a microstrip line.

FIG. 17 to FIG. 40 introduce a plurality of sorts of conductive paths used in a dual-polarized antenna AN for accessing signals with the transmission circuit 110 and/or the reception circuit 120. As mentioned above, a conductive line coupled to a patch, a probe, a probe with a conductive part, and/or a conductive line insulated from a patch can be used to accessed the transmission signal ST1 and/or the reception signal SR1 shown in FIG. 16.

The abovementioned structures may be used in hybrid. Each of FIG. 41 to FIG. 45 illustrates a top view of the dual-polarized antenna AN with a hybrid structure according to another embodiment.

Figure 41:
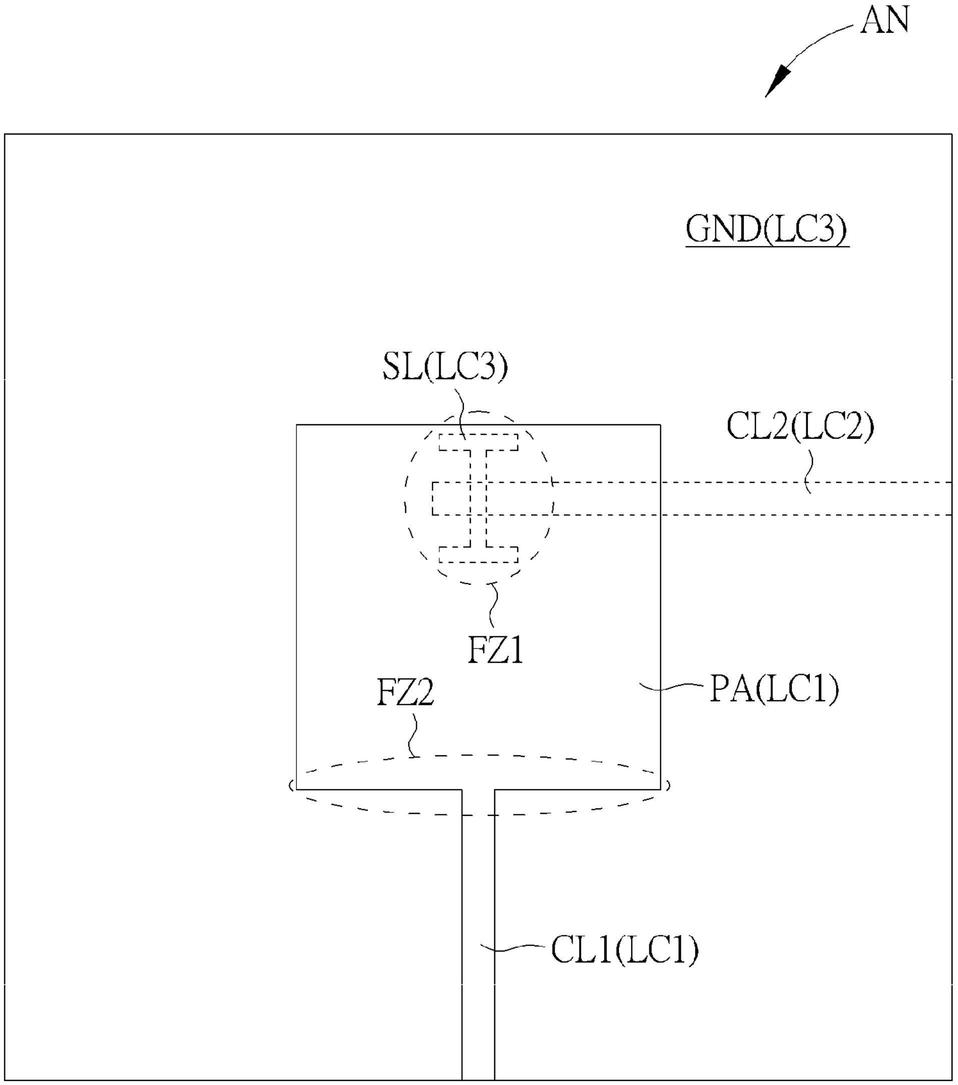
FIG. 41 to FIG. 45 illustrate top views of the dual-polarized antennas with hybrid structures according to other embodiments.

The dual-polarized antenna AN in FIG. 41 may include a first conductive layer LC1, a third conductive layer LC3 and a second conductive layer LC2 from top to bottom as FIG. 22. Aground GND may be formed on the second conductive layer LC2. A first conductive line CL1 may be coupled to the patch PA and formed on the first conductive layer LC1. A slot SL may be formed on the third conductive layer LC3. For example, the slot SL may have an H shape, but embodiments are not limited thereto. A second conductive line CL2 may be formed on the second conductive layer LC2 and access signals to and from the patch PA through the slot SL using the coupling effect. In other words, in FIG. 41, the first conductive line CL1 may be similar to the conductive line CL shown in FIG. 17, and the second conductive line CL2 may be similar to the conductive line CL shown in FIG. 21.

Figure 42:
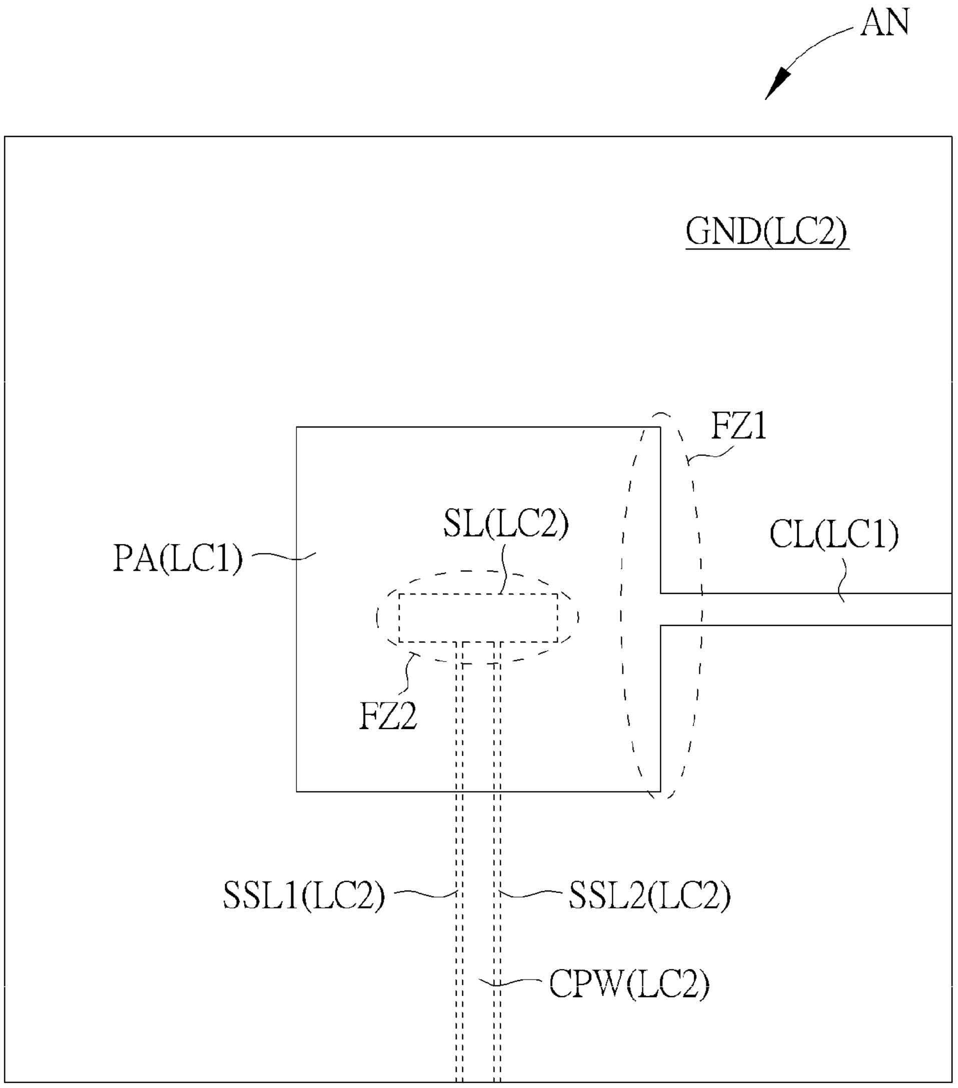

The dual-polarized antenna AN in FIG. 42 may include a conductive line CL and a coplanar waveguide CPW. The conductive line CL and the coplanar waveguide CPW may be two conductive paths coupled to one and the other one of the transmission circuit 110 and the reception circuit 120. The dual-polarized antenna AN in FIG. 42 may include a first conductive layer LC1 and a second conductive layer LC2. A patch PA may be formed on a first conductive layer LC1. A ground GND may be formed on a second conductive layer LC2. An insulation layer may be located between the first conductive layer LC1 and the second conductive layer LC2. A slot SL may be generated on the second conductive layer LC2 and located to overlap one of the first feed zone FZ1 and the second feed zone FZ2.

In the example of FIG. 42, the slot SL overlaps the second feed zone FZ2. Two straight slots SSL1 and SSL2 may be generated on the second conductive layer LC2 and inwardly extended from an edge or an inner portion of the ground GND to the slot SL. The first conductive layer LC1 may or may not be insulated from the second conductive layer LC2 according to embodiments. The two straight slots SSL1 and SSL2 may be parallel or angular with one another, and a portion between the two straight slots SSL1 and SSL2 is used as the coplanar waveguide CPW for accessing the transmission signal ST1 or the reception signal SR1 accordingly. FIG. 42 merely shows an example. The straight slots SSL1 and SSL2 may be extended to locations for being coupled to pins of a chip. The straight slots SSL1 and SSL2 may be designed in a taper style. The straight slots SSL1 and SSL2 may be designed to be in parallel with another coplanar waveguide with regarding resistance conversion.

Figure 43:
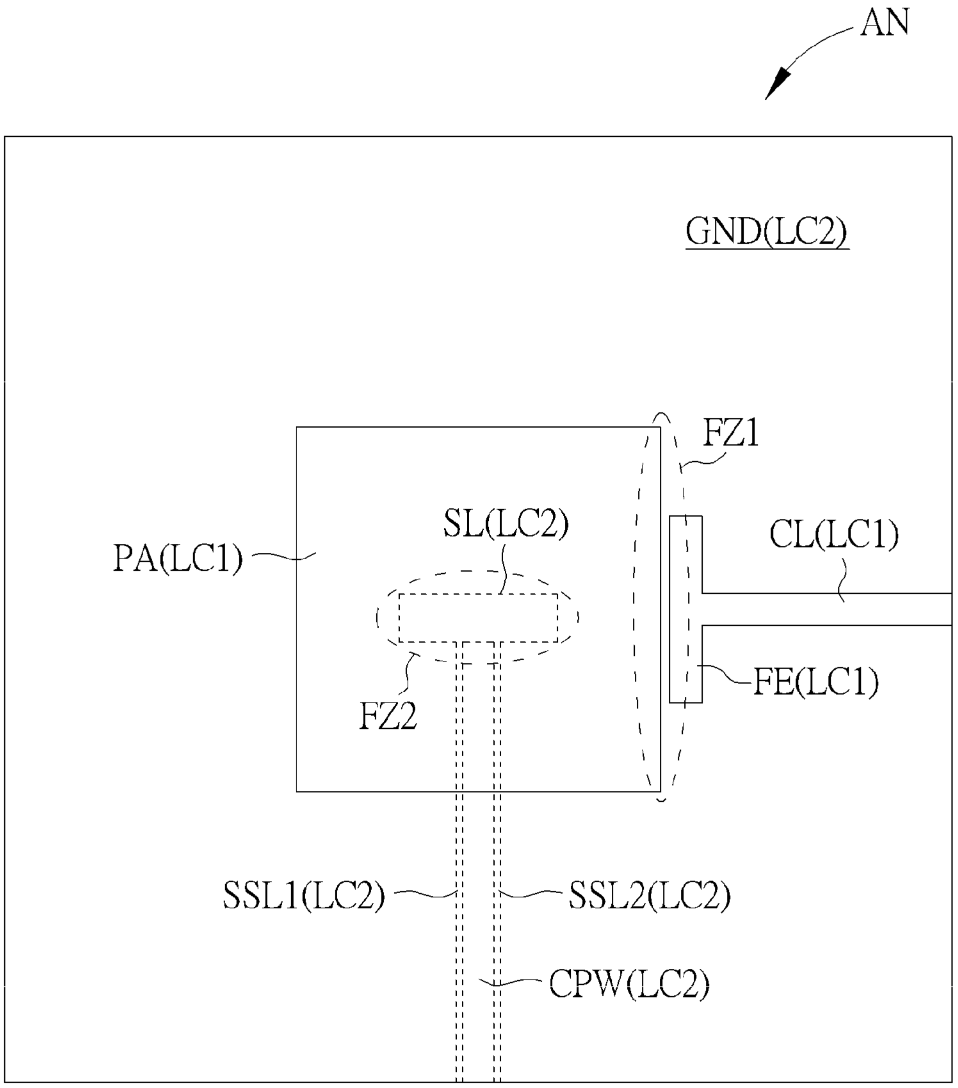

The dual-polarized antenna AN in FIG. 43 may include a feed element FE and a coplanar waveguide CPW. The dual-polarized antenna AN in FIG. 43 may include a first conductive layer LC1 and a second conductive layer LC2 as described in FIG. 17, FIG. 18 and FIG. 43. The patch PA and the coplanar waveguide CPW may be similar to that shown in FIG. 42, and it is not repeatedly described. The feed element FE may be formed on the first conductive layer LC1 and be insulated from the patch PA. The feed element FE may be located corresponding to one of the first feed zone FZ1 and the second feed zone FZ2. In the example of FIG. 43, the feed element FE is located corresponding to the first feed zone FZ1. Signals may be transceived between the feed element FE and the patch PA by means of the coupling effect. The conductive line CL may be formed on the first conductive layer LC1 and coupled to the feed element FE for accessing the transmission signal ST1 or the reception signal SR1 accordingly. The feed element FE and the coplanar waveguide CPW may be coupled to one and the other one of the transmission circuit 110 and the reception circuit 120.

Figure 44:
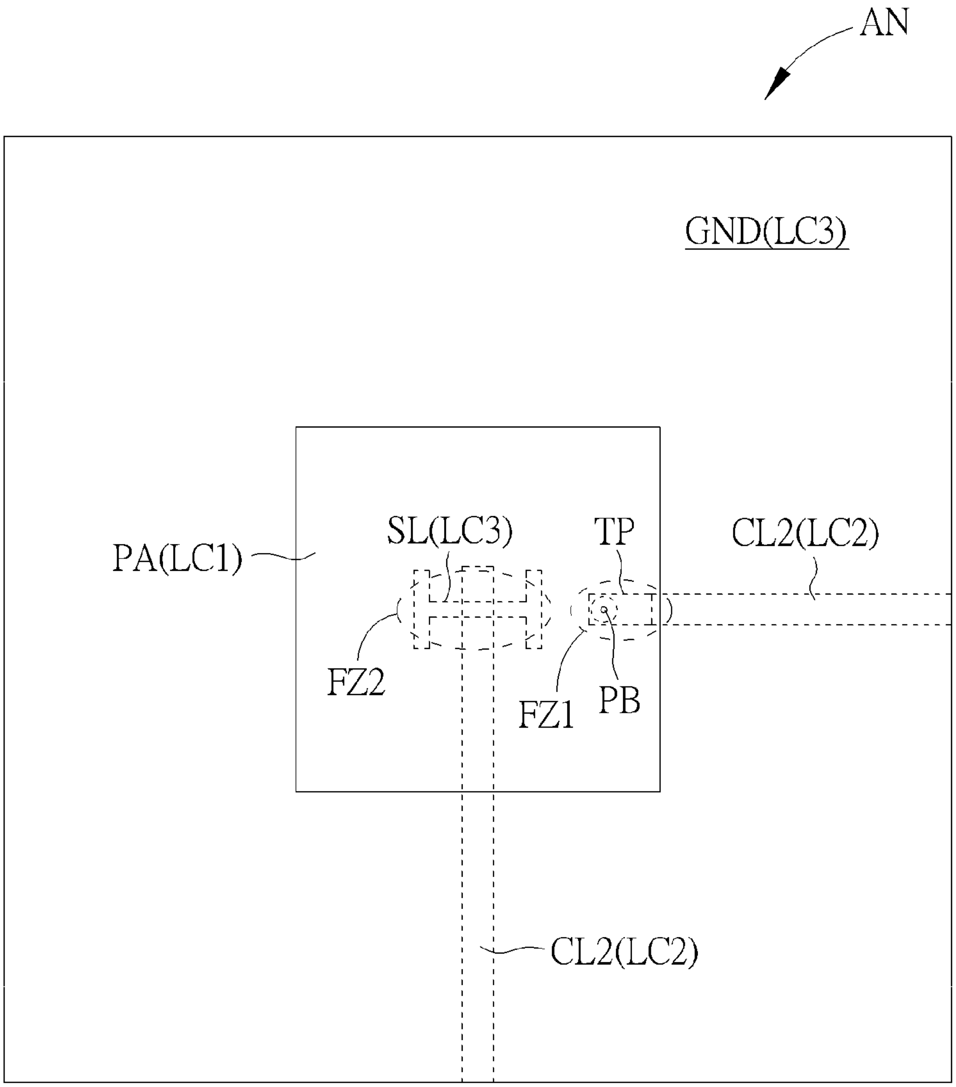

The dual-polarized antenna AN in FIG. 44 may include a first conductive layer LC1, a third conductive layer LC3 and a second conductive layer LC2 from top to bottom as FIG. 21. In FIG. 44, a first conductive line CL1 may be formed on the second conductive layer LC2. A top conductive portion TP may overlap one of the first feed zone F1 and the second feed zone F2 and be located between the first conductive layer LC1 and the third conductive layer LC3. A probe PB may have a first terminal coupled to the top conductive portion TP and a second terminal coupled to the first conductive line CL1. The probe PB may pass through a hole formed on the third conductive layer LC3. In other words, the path formed with the top conductive portion TP, the probe PB and the first conductive line CL1 may be similar to the example of FIG. 35 and FIG. 36. The second conductive line CL2 may be similar to the conductive line CL shown in FIG. 21 and FIG. 22.

Figure 45:
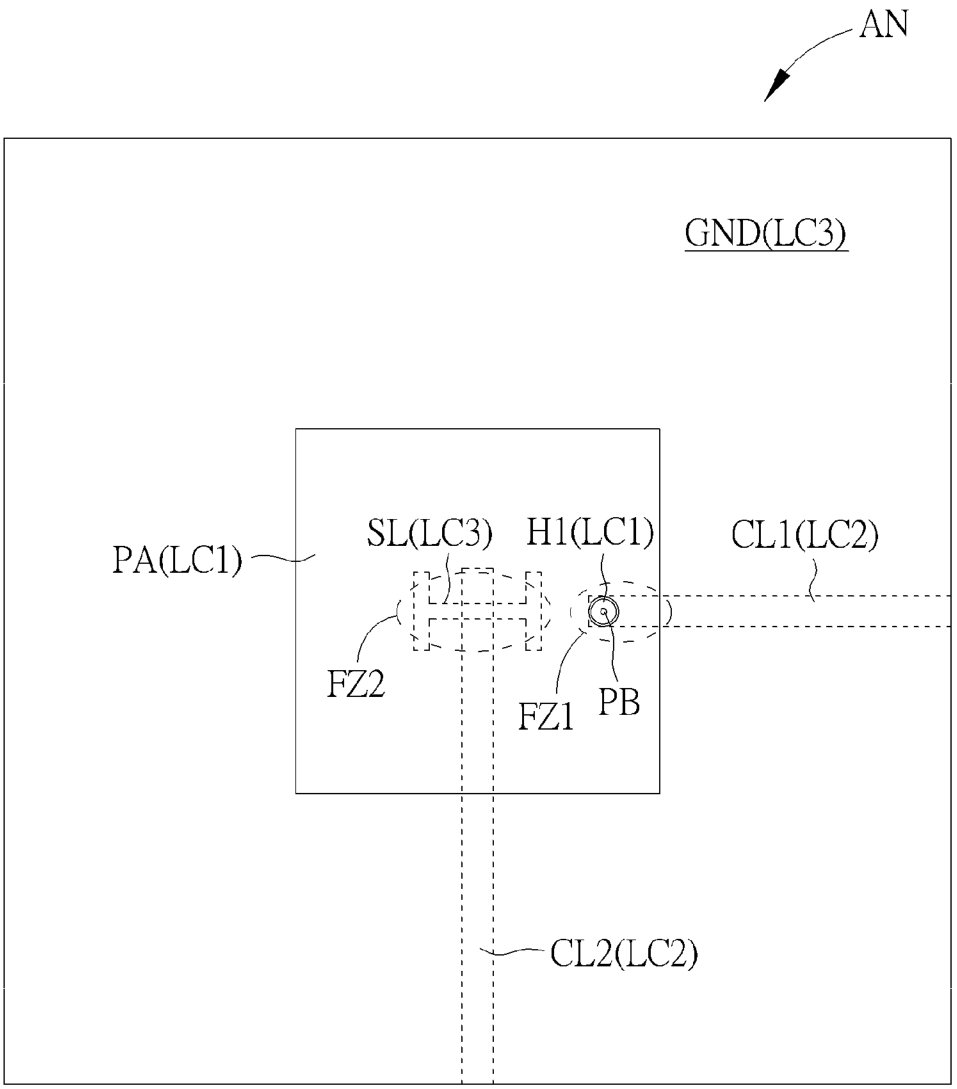

The dual-polarized antenna AN in FIG. 45 may include a first conductive layer LC1, a third conductive layer LC3 and a second conductive layer LC2 from top to bottom as FIG. 21. In FIG. 45, the dual-polarized antenna AN may include a first conductive line CL1 and a second conductive line CL2. The first conductive line CL1 may be formed on the second conductive layer LC2 and coupled to a probe PB. The probe PB may pass through the third conductive layer LC3 via a hole on the third conductive layer LC3. A hole H1 may also be formed on the first conductive layer LC1 so that the probe PB may be insulated from the first conductive layer LC1 and the third conductive layer LC3. The conductive line CL2 in FIG. 45 may be similar to conductive line CL2 in FIG. 44 and not repeatedly described.

The dual-polarized antenna AN in each of FIG. 41 to FIG. 45 may be deemed to have a hybrid structure because of having two sorts of conductive paths corresponding to the two feed zones FZ1 and FZ2.

The dual-polarized antennas AN in FIG. 41 to FIG. 45 are merely examples instead of limiting embodiments. If the structure is manufacturable, two or more sorts of abovementioned conductive paths may be used in a dual-polarized antenna AN to form a hybrid structure for accessing the transmission signal ST1 and/or the reception signal SR1.

The locations of the first feed zone FZ1 and the second feed zone FZ2 shown in FIG. 16 to FIG. 45 are mere examples. According to embodiments, the dual-polarized antenna AN may include a patch PA, and each of the first feed zone FZ1 and the second feed zone FZ2 may be located near a side of the patch PA, a center of the patch PA or a corner of the patch PA. The locations of the feed zones FZ1 and FZ2 may be adjusted to improve the performance of the antenna matching. The effect of signal feeding may be insufficient initially; however, some skills (such as adjusting BOM (bill of material) or using open/short stub) may be used to improve the matching related to the feed zones FZ1 and FZ2 and improve the effect of signal feeding.

Figure 46:
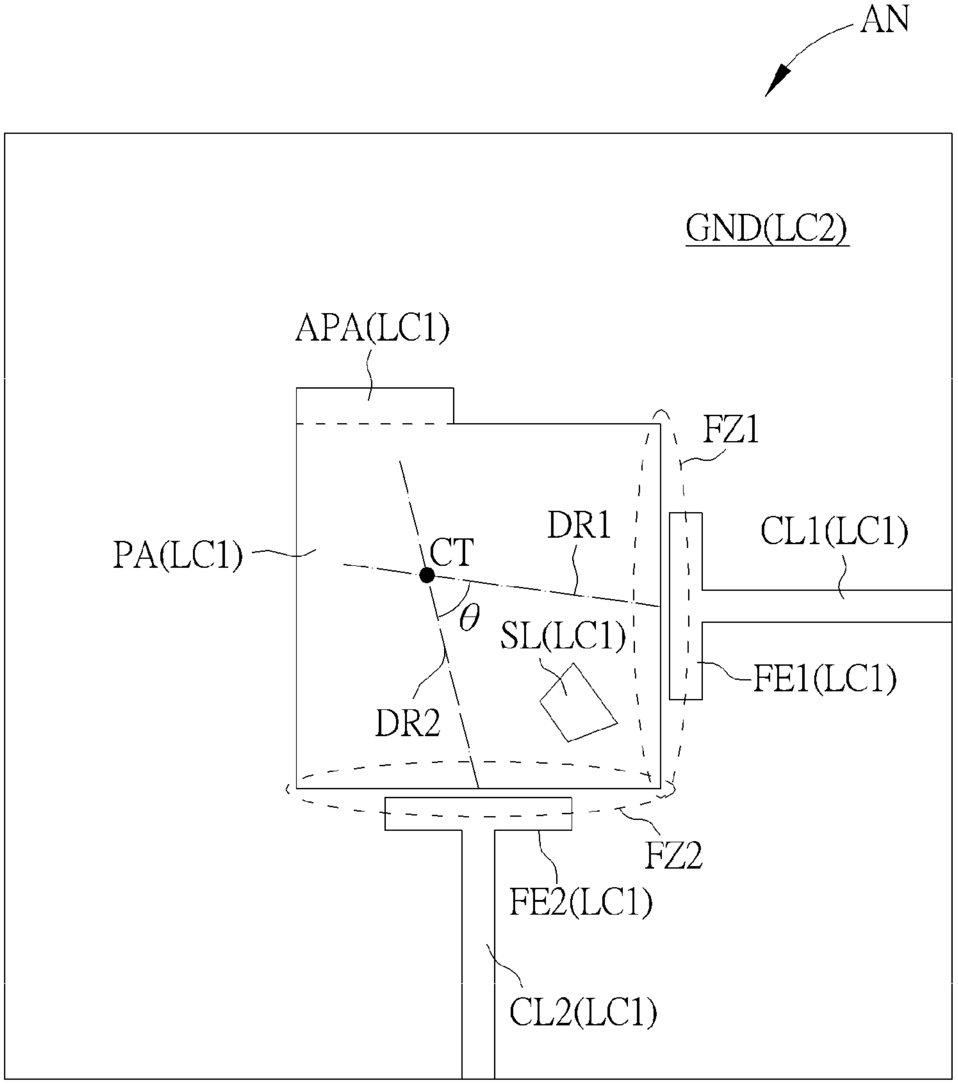
FIG. 46 illustrates a top view of the dual-polarized antenna according to another embodiment.

FIG. 46 illustrates a top view of the dual-polarized antenna AN according to another embodiment. As shown in FIG. 46, the dual-polarized antenna AN may include a patch PA, a first conductive line CL1, a second conductive line CL2, a first feed element FE1, a second feed element FE2, a ground GND, an insulation layer LI (not shown). The patch PA, the first conductive line CL1, the second conductive line CL2, the first feed element FE1, and the second feed element FE2 may be formed on a first conductive layer LC1. The ground GND may be formed on a second conductive layer LC2. The first feed element FE1 is located corresponding to the first feed zone FZ1, and the second feed element FE2 is located corresponding to the second feed zone FZ2. In other words, in FIG. 46, the first conductive line CL1 and the second conductive line CL2 may be similar to the conductive line CL shown in FIG. 43. Signals may be transceived between the first/second element FE1/FE2 and the patch PA by means of the coupling effect. The first/second conductive line CL1/CL2 may be formed on the first conductive layer LC1 and coupled to the first/second feed element FE1/FE2 for accessing the transmission signal ST1 or the reception signal SR1 accordingly. The insulation layer LI may be located between the first conductive layer LC1 and the second conductive layer LC2. The first conductive layer LC1 may or may not be insulated from the second conductive layer LC2 according to embodiments. The first/second conductive line CL1/CL2 may be a microstrip line. Each insulation layer mentioned in the text may be a substrate. The patch PA may include an additional shape APA and/or a slot/aperture SL. A line DR1 can be from the shape centroid of the first feed zone FZ1 to the shape centroid CT of the patch PA, a line DR2 can be from the shape centroid of the second feed zone FZ2 to the shape centroid CT of the patch PA, and an angle θ is formed by the lines DR1 and DR2. Besides, the structure of the dual-polarized antenna AN may be replaced by the abovementioned dual-polarized antenna AN as shown in FIG. 16 to FIG. 45.

In some situations of the wireless signal transceiver device 100, the frequency corresponding to the best performance of return loss of the first wireless signal STX, the frequency corresponding to the best performance of return loss of the second wireless signal SRX, and the frequency corresponding to the best performance of the isolation between the first wireless signal STX and the second wireless signal SRX may be different. For example, the trace length corresponding to the transmission circuit 110 and the trace length corresponding to the reception circuit 120 may be different because of the PCB design of the wireless signal transceiver device 100. Hence, as shown in FIG. 46, the shape of the patch PA may be generated by adding the additional shape APA (e.g. a small rectangle) to an original shape (e.g. a larger square), and/or by removing a slot/aperture SL (e.g., a smaller trapezoid) from the original shape (e.g. a larger square), so that the angle θ is not equal to 90 degrees. For example, 45 degrees<θ<90 degrees, or 90 degrees<θ<135 degrees.

Figure 47:
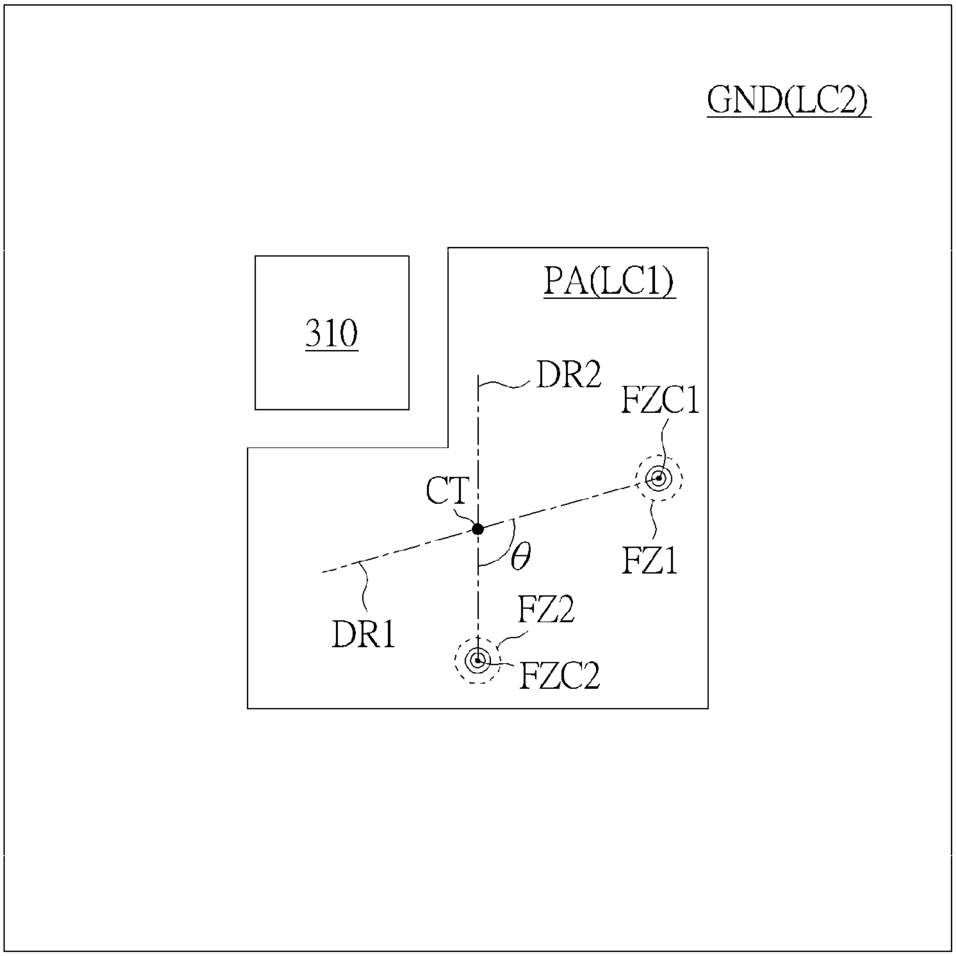
FIG. 47 illustrates a top view of a dual-polarized antenna and a circuit according to an embodiment.

FIG. 47 illustrates a top view of a dual-polarized antenna AN and a circuit 310 according to an embodiment. In a compact device, some circuit component(s) may occupy an area, where the area may be occupied by the patch or another part of an antenna in other cases. Hence, as shown in FIG. 47, the shape of the dual-polarized antenna AN or the shape of the patch PA of the dual-polarized antenna AN may be an non-convex shape (e.g. a concave shape). For example, as shown in FIG. 47, the patch may have a concave hexagonal shape, where the concave hexagonal shape may be generated by removing a part (e.g., a smaller square) from an original shape (e.g. a larger square). FIG. 47 merely provides an example. Likewise, a part of a circular patch, a triangular patch or a rectangular patch may be removed for placing a circuit. The dual-polarized antenna AN in FIG. 47 may be similar to the dual-polarized antenna AN in FIG. 29 to have probes; however, this is merely an example.

In FIG. 47, the line DR1 can be from the shape centroid FZC1 of a feed zone to the shape centroid CT of the dual-polarized antenna AN. The line DR2 can be from the shape centroid FZC2 of another feed zone to the shape centroid CT of the dual-polarized antenna AN. Since the shape of the patch PA may not be a complete rectangle, triangle or circle, the lines DR1 and DR2 may not be perpendicular to one another. For example, regarding the angle θ formed by the lines DR1 and DR2, θ≠90 degrees. For example, 45 degrees<θ<90 degrees, or 90 degrees<θ<135 degrees.

In summary, embodiments provide a plurality of solutions for designing conductive paths of a dual-polarized antenna AN to transceive signals with the transmission circuit 110 and the reception circuit 120. The performance and size of the dual-polarized antennas AN can be adjusted more easily, and the flexibility of design can be improved.

The present disclosure is also related to embodiments described below with reference to one or more of FIGS. 1-47 and to FIGS. 48-51.

Figure 48:
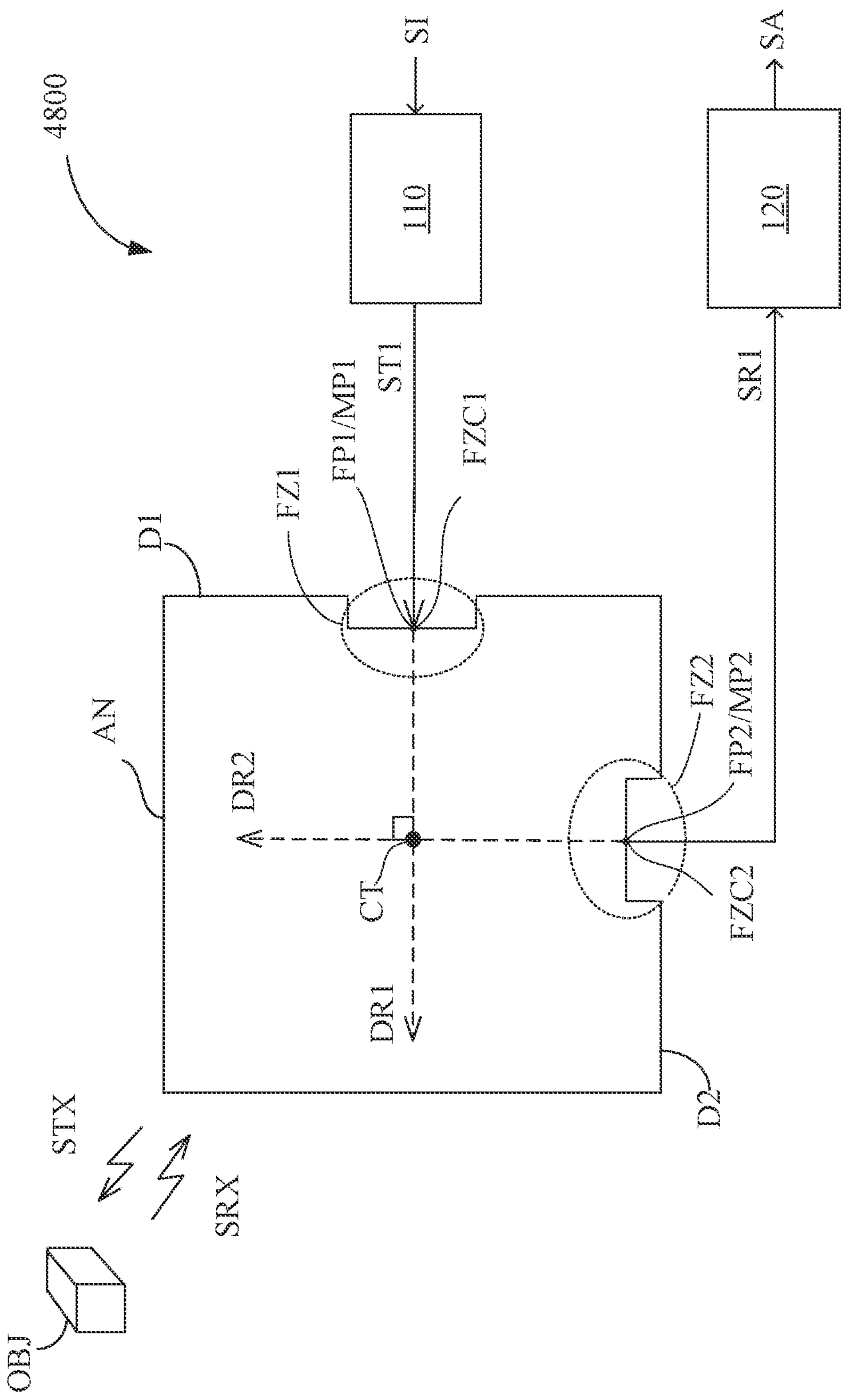
FIG. 48 illustrates an exemplary wireless signal transceiver device, according to some embodiments of the present disclosure.

FIG. 48 illustrates an exemplary wireless signal transceiver device 4800, according to some embodiments of the present disclosure. Wireless signal transceiver device 4800 includes dual-polarized antenna AN, transmission circuit 110, and reception circuit 120. Antenna AN includes sides D1 and D2. Sides D1 and D2 include first and second U-shaped portions, respectively. Transmission circuit 110 is coupled to a feed point FP1 on the first U-shaped portion of side D1. Reception circuit 120 is coupled to a feed point FP2 on the second U-shaped portion of side D2. Wireless signal transceiver device 4800 is an instance of wireless signal transceiver device 100 with the first and second U-shaped portions and operates similarly as wireless signal transceiver device 100. Those elements in FIG. 48 having the same reference characters as those in FIG. 1 operate in similar ways as described above with reference to FIG. 1. The first and second U-shaped portions of antenna AN are defined as any inwardly curved side, such as a slot, a groove, and a U-shape portion.

In wireless signal transceiver device 4800 (FIG. 48), feed point FP1 is also a midpoint MP1 of the first U-shaped portion and of side D1. When transmission circuit 110 feeds a transmission signal ST1 to feed point FP1, a feed zone FZ1 is formed. Feed zone FZ1 has a zone shape centroid FZC1. As shown in FIG. 48, zone shape centroid FZC1 overlaps with feed point FP1 and midpoint MP1 on side D1. Feed point FP2 is also a midpoint MP2 of the second U-shaped portion and of side D2. When antenna AN feeds a reception signal SR1 from feed point FP2 to reception circuit 120, a feed zone FZ2 is formed. Feed zone FZ2 has a zone shape centroid FZC2. As shown in FIG. 48, zone shape centroid FZC2 overlaps with feed point FP2 and midpoint MP2 on side D2.

In wireless signal transceiver device 100 (FIG. 1), zone shape centroid FZC1 is also a feed point and a midpoint on side D1 of antenna AN. Zone shape centroid FZC2 is also a feed point and a midpoint on side D2 of antenna AN. Thus, in the description herein, a feed point or a midpoint on sides D1 and D2 of antenna AN in wireless signal transceiver device 100 refers to zone shape centroids FZC1 and FZC2 in FIG. 1, respectively.

In some embodiments, e.g., wireless signal transceiver device 100 (FIG. 1) or 4800 (FIG. 48), antenna AN is configured to transmit wireless signal STX based on transmission signal ST1 and to receive wireless signal SRX substantially at the same time during at least a time period. Wireless signal SRX includes a reflected wireless signal STX from an object OBJ. For example, after a round-trip time for wireless signal STX to travel from antenna AN to object OBJ, and back to antenna AN, antenna AN starts to receive wireless signal SRX. At the same time, antenna AN continues to transmit wireless signal STX. Starting from this moment, antenna AN transmits wireless signal STX and receives wireless signal SRX at the same time. Before antenna AN stops transmitting wireless signal STX, antenna AN transmits wireless signal STX and receives wireless signal SRX at the same time for a time period, such as 0.2, 0.5, 1, or 5 seconds. Length of the time period depends on application fields and can be any length of time. Transmission circuit 110 is configured to generate transmission signal ST1 and output transmission signal ST1 to side D1 of antenna AN. Reception circuit 120 is configured to receive reception signal SR1 from side D2 of antenna AN. Antenna AN outputs reception signal SR1 based on wireless signal SRX. Side D1 of antenna AN is different from side D2 of antenna AN.

In some embodiments, wireless signal transceiver device 100 (FIG. 1) or 4800 (FIG. 48) may further include a processor, e.g., processing unit PU (FIG. 9) or processor PU (FIG. 16), coupled to transmission circuit 110 and reception circuit 120. Transmission circuit 110 (FIG. 1 or 48) is configured to generate transmission signal ST1 based on input signal SI. Input signal SI is also input to the processor. Reception circuit 120 (FIG. 1 or 48) is further configured to generate processing signal SA based on reception signal SR1 and to output processing signal SA to the processor. The processor is configured to generate spatial information about object OBJ based on values of the processing signal SA and input signal SI, respectively corresponding to the received signal and the transmitted signal, at a substantially same instant in time.

In some embodiments, e.g., wireless signal transceiver device 100 (FIG. 1) or 4800 (FIG. 48), a direction DR1 is defined from midpoint MP1 of side D1 to an antenna shape centroid CT of antenna AN. Another direction DR2 is defined from midpoint MP2 of side D2 to antenna shape centroid CT of antenna AN. As shown in FIG. 1 or 48, direction DR1 is orthogonal to direction DR2.

In some embodiments, e.g., wireless signal transceiver device 100 (FIG. 1) or 4800 (FIG. 48), side D1 of antenna AN, to which transmission circuit 110 feeds transmission signal ST1, is adjacent to side D2 of antenna AN, from which reception circuit 120 is fed reception signal SR1.

In some embodiments, e.g., wireless signal transceiver device 100 (FIG. 1) or 4800 (FIG. 48), side D1 of antenna AN, to which transmission circuit 110 feeds transmission signal ST1, is orthogonal to side D2 of antenna AN, from which reception circuit 120 is fed reception signal SR1.

In some embodiments, e.g., wireless signal transceiver device 100 (FIG. 1) or 4800 (FIG. 48), transmission circuit 110 is configured to output transmission signal ST1 to feed point FP1 on side D1 of antenna AN. Reception circuit 120 is configured to receive reception signal SR1 from feed point FP2 on side D2 of antenna AN.

In some embodiments, e.g., wireless signal transceiver device 100 (FIG. 1) or 4800 (FIG. 48), direction DR1 is defined from feed point FP1 on side D1 to antenna shape centroid CT of antenna AN. Direction DR2 is defined from feed point FP2 on side D2 to antenna shape centroid CT of antenna AN. As shown in FIG. 1 or 48 and noted above, direction DR1 is orthogonal to direction DR2.

In some embodiments, e.g., wireless signal transceiver device 4800 (FIG. 48), side D1 of antenna AN includes the first U-shaped portion and feed point FP1 is thereon. Side D2 of antenna AN includes the second U-shaped portion and feed point FP2 is thereon.

Figure 49:
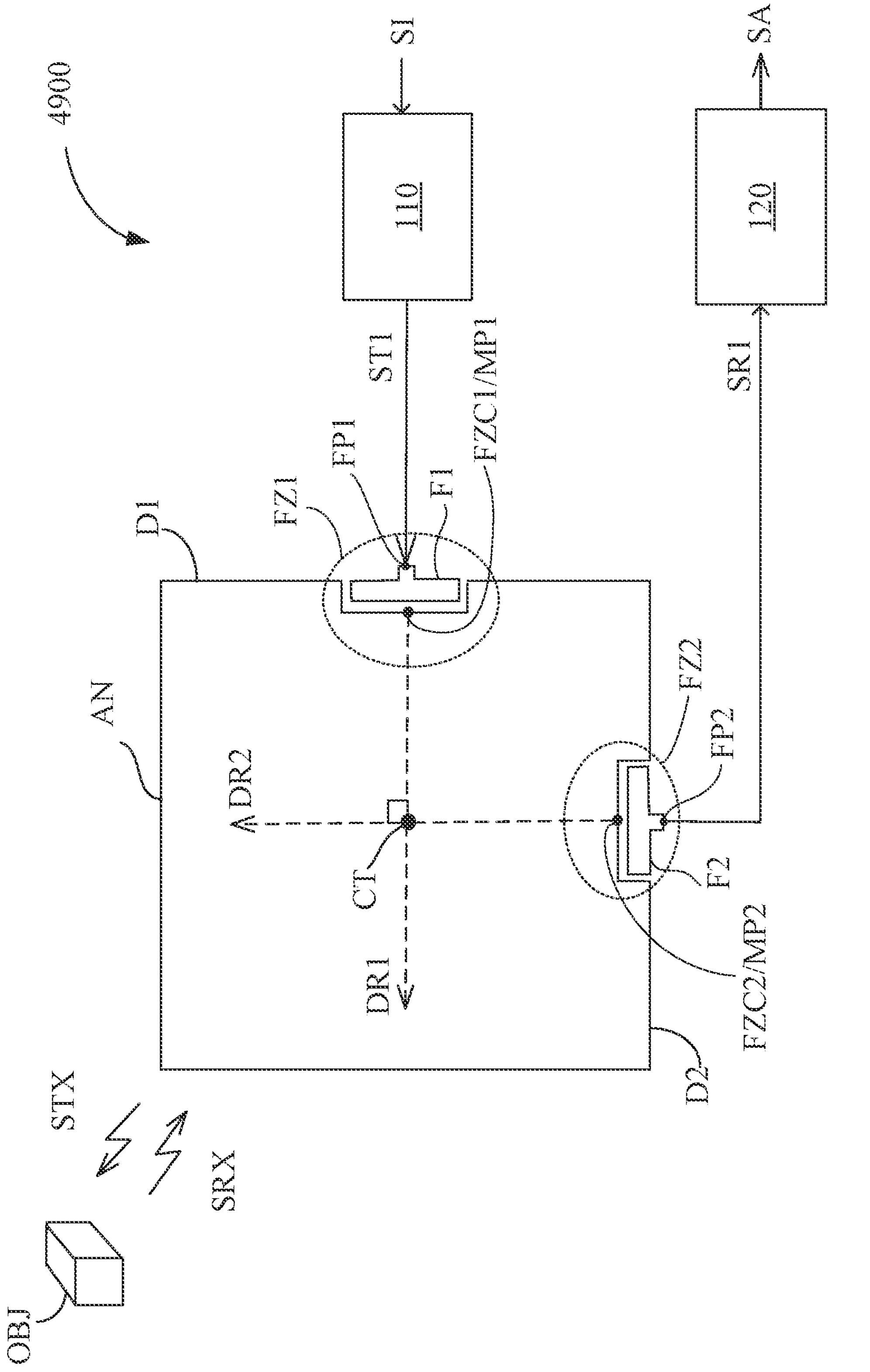
FIG. 49 illustrates another exemplary wireless signal transceiver device, according to some embodiments of the present disclosure.

FIG. 49 illustrates another exemplary wireless signal transceiver device 4900, according to some embodiments of the present disclosure. Wireless signal transceiver device 4900 includes dual-polarized antenna AN, feed elements F1 and F2, transmission circuit 110, and reception circuit 120. Antenna AN includes sides D1 and D2. Sides D1 and D2 include first and second U-shaped portions, respectively. Transmission circuit 110 is coupled to a feed point FP1 on feed element F1 corresponding to side D1 of antenna AN. Reception circuit 120 is coupled to a feed point FP2 on feed element F2 corresponding to side D2 of antenna AN. Wireless signal transceiver device 4900 is an instance of wireless signal transceiver device 600 (FIG. 6) with the first and second U-shaped portions, and operates similarly as wireless signal transceiver device 600. Those elements in FIG. 49 having the same reference characters as those in FIG. 6 operate in similar ways as described above with reference to FIG. 6.

In wireless signal transceiver device 4900 (FIG. 49), feed point FP1 is on feed element F1. When transmission circuit 110 feeds a transmission signal ST1 to feed point FP1, feed element F1 feeds transmission signal ST1 to side D1 of antenna AN through electromagnetic induction, and feed zone FZ1 is formed. Feed zone FZ1 has a zone shape centroid FZC1. As shown in FIG. 49, zone shape centroid FZC1 overlaps with a midpoint MP1 of the first U-shaped portion and of side D1. Feed point FP2 is on feed element F2. When antenna AN feeds a reception signal SR1 from side D2 to feed element F2 through electromagnetic induction, reception circuit 120 receives reception signal SR1 from feed point FP2. A feed zone FZ2 is formed and has a zone shape centroid FZC2. As shown in FIG. 49, zone shape centroid FZC2 overlaps with a midpoint MP2 of the second U-shaped portion and of side D2.

In some embodiments, e.g., wireless signal transceiver device 600 (FIG. 6) or 4900 (FIG. 49), feed element F1 corresponds to side D1 of antenna AN. And feed element F2 corresponds to side D2 of antenna AN. Transmission circuit 110 is configured to output transmission signal ST1 to feed point FP1 on feed element F1. Feed element F1 is configured to feed transmission signal ST1 to side D1 of antenna AN through electromagnetic induction. Feed element F2 is configured to be fed reception signal SR1 from side D2 of antenna AN. Reception circuit 120 is configured to receive reception signal SR1 from feed point FP2 on feed element F2.

In some embodiments, e.g., wireless signal transceiver device 600 (FIG. 6) or 4900 (FIG. 49), antenna AN is configured to transmit wireless signal STX based on transmission signal ST1 and to receive wireless signal SRX substantially at the same time during at least a time period. Wireless signal SRX includes a reflected wireless signal STX from an object OBJ. For example, after a round-trip time for wireless signal STX to travel from antenna AN to object OBJ, and back to antenna AN, antenna AN starts to receive wireless signal SRX. At the same time, antenna AN continues to transmit wireless signal STX. Starting from this moment, antenna AN transmits wireless signal STX and receives wireless signal SRX at the same time. Before antenna AN stops transmitting wireless signal STX, antenna AN transmits wireless signal STX and receives wireless signal SRX at the same time for a time period, such as 0.2, 0.5, 1, or 5 seconds. The length of the time period depends on application fields and can be any length of time.

In some embodiments, wireless signal transceiver device 600 or 4900 may further include a processor, e.g., processing unit PU (FIG. 9) or processor PU (FIG. 16), coupled to transmission circuit 110 and reception circuit 120. Transmission circuit 110 (FIG. 6 or 49) is configured to generate transmission signal ST1 based on input signal SI. Input signal SI is also input to the processor. Reception circuit 120 (FIG. 6 or 49) is further configured to generate processing signal SA based on reception signal SR1 and to output processing signal SA to the processor. The processor is configured to generate spatial information about object OBJ based on values of the processing signal SA and input signal SI, respectively corresponding to the received signal and the transmitted signal, at a substantially same instant in time.

In some embodiments, e.g., wireless signal transceiver device 4900 (FIG. 49), side D1 of antenna AN includes the first U-shaped portion. And side D2 of antenna AN includes the second U-shaped portion. Feed element F1 is configured to feed transmission signal SR1 to the first U-shaped portion of side D1 through electromagnetic induction. Feed element F2 is configured to be fed reception signal SR1 from the second U-shaped portion of side D2.

Figure 50:
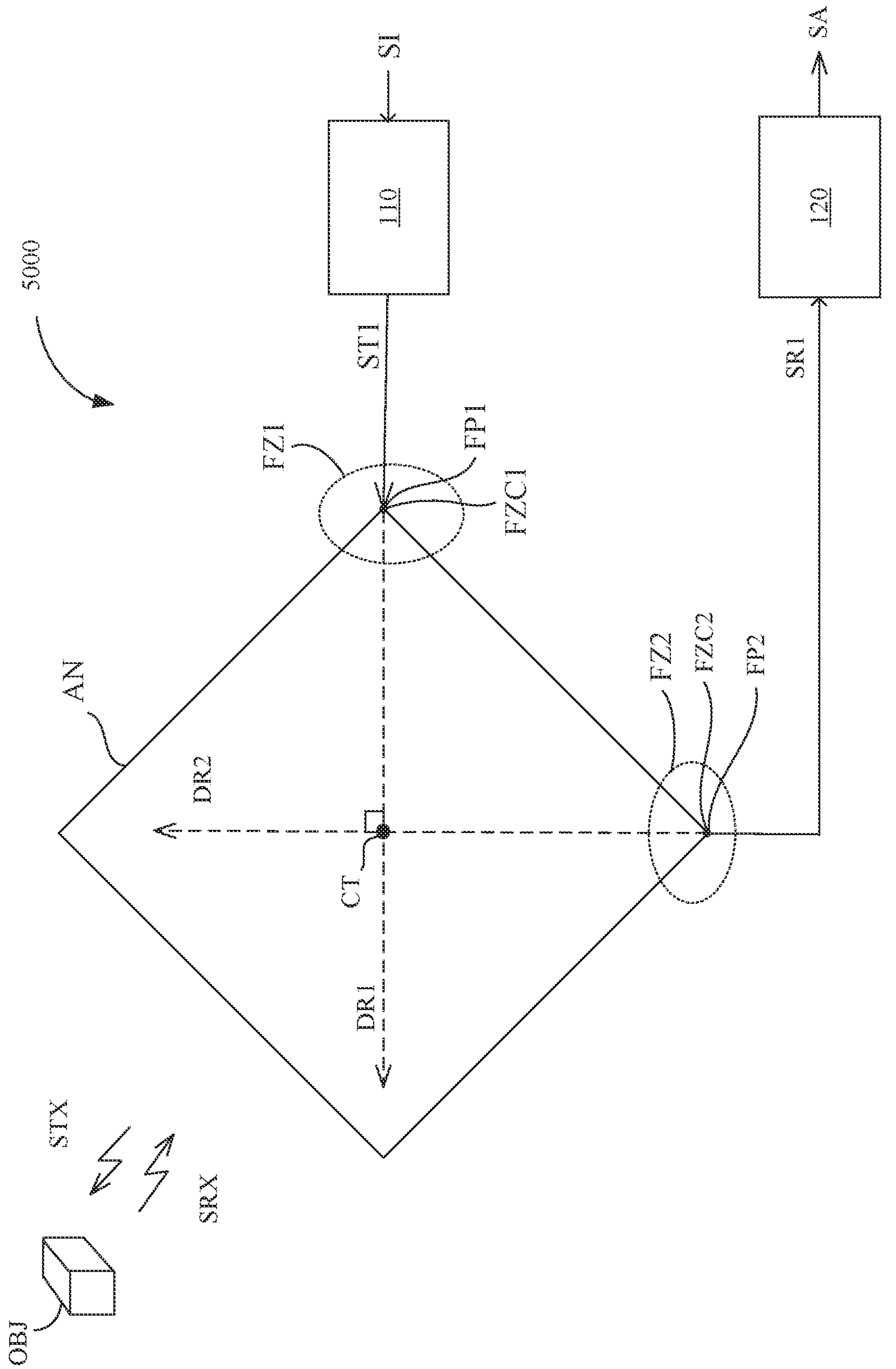
FIG. 50 illustrates another exemplary wireless signal transceiver device, according to some embodiments of the present disclosure.

FIG. 50 illustrates another exemplary wireless signal transceiver device 5000, according to some embodiments of the present disclosure. Wireless signal transceiver device 5000 includes dual-polarized antenna AN, transmission circuit 110, and reception circuit 120. Transmission circuit 110 is coupled to a feed point FP1 at a corner of antenna AN. Reception circuit 120 is coupled to a feed point FP2 at another corner of antenna AN. Wireless signal transceiver device 5000 is an alternative instance of wireless signal transceiver device 100 and operates similarly as wireless signal transceiver device 100. Those elements in FIG. 50 having the same reference characters as those in FIG. 1 operate in similar ways as described above with reference to FIG. 1.

In wireless signal transceiver device 5000 (FIG. 50), when transmission circuit 110 feeds a transmission signal ST1 to feed point FP1, a feed zone FZ1 is formed. Feed zone FZ1 has a zone shape centroid FZC1. As shown in FIG. 50, zone shape centroid FZC1 overlaps with feed point FP1. When antenna AN feeds a reception signal SR1 from feed point FP2 to reception circuit 120, a feed zone FZ2 is formed. Feed zone FZ2 has a zone shape centroid FZC2. As shown in FIG. zone shape centroid FZC2 overlaps with feed point FP2.

In some embodiments, e.g., wireless signal transceiver device 100 (FIG. 1) or 5000 (FIG. 50), antenna AN is configured to transmit a wireless signal STX based on transmission signal ST1 and to receive a wireless signal SRX substantially at the same time during at least a time period. Wireless signal SRX includes a reflected wireless signal STX from an object OBJ. For example, after a round-trip time for wireless signal STX to travel from antenna AN to object OBJ, and back to antenna AN, antenna AN starts to receive wireless signal SRX. At the same time, antenna AN continues to transmit wireless signal STX. Starting from this moment, antenna AN transmits wireless signal STX and receives wireless signal SRX at the same time. Before antenna AN stops transmitting wireless signal STX, antenna AN transmits wireless signal STX and receives wireless signal SRX at the same time for a time period, such as 0.2, 0.5, 1, or 5 seconds. The length of the time period depends on application fields and can be any length of time.

In some embodiments, wireless signal transceiver device 5000 may further include a processor, e.g., processing unit PU (FIG. 9) or processor PU (FIG. 16), coupled to transmission circuit 110 and reception circuit 120. Transmission circuit 110 (FIG. 50) is configured to generate transmission signal ST1 based on input signal SI. Input signal SI is also input to the processor. Reception circuit 120 (FIG. 50) is further configured to generate processing signal SA based on reception signal SR1 and to output processing signal SA to the processor. The processor is configured to generate spatial information about object OBJ based on values of the processing signal SA and input signal SI, respectively corresponding to the received signal and the transmitted signal, at a substantially same instant in time.

Transmission circuit 110 is configured to generate transmission signal ST1 and output transmission signal ST1 to feed point FP1 for antenna AN. Reception circuit 120 is configured to receive reception signal SR1 from feed point FP2 for antenna AN. Antenna AN outputs reception signal SR1 based on wireless signal SRX. A direction DR1 is defined from feed point FP1 to an antenna shape centroid CT of antenna AN. A direction DR2 is defined from feed point FP2 to antenna shape centroid CT of antenna AN. Directions DR1 and DR2 are orthogonal to each other. In some embodiments, e.g., the wireless signal transceiver device in FIG. 14, directions DR1 and DR2 form an acute angle not less than 45 degrees.

In some embodiments, e.g., wireless signal transceiver device 100 (FIG. 1) or 5000 (FIG. 50), feed point FP1 is on antenna AN, and feed point FP2 is on antenna AN.

Figure 51:
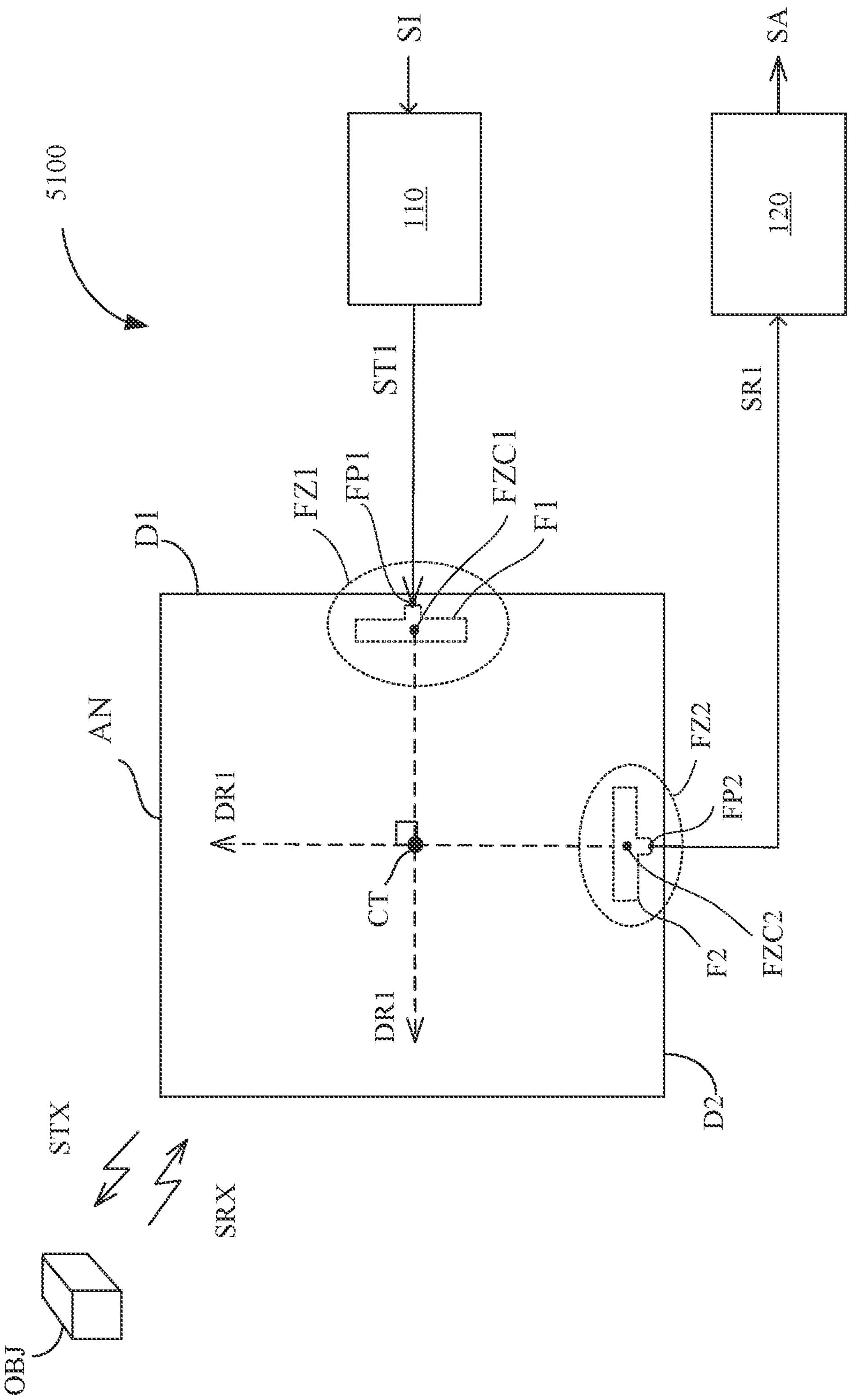
FIG. 51 illustrates another exemplary wireless signal transceiver device, according to some embodiments of the present disclosure.

FIG. 51 illustrates another exemplary wireless signal transceiver device 5100, according to some embodiments of the present disclosure. Wireless signal transceiver device 5100 includes dual-polarized antenna AN, feed elements F1 and F2, transmission circuit 110, and reception circuit 120. Antenna AN includes sides D1 and D2. Transmission circuit 110 is coupled to a feed point FP1 on feed element F1 corresponding to side D1 of antenna AN. Reception circuit 120 is coupled to a feed point FP2 on feed element F2 corresponding to side D2 of antenna AN. Wireless signal transceiver device 5100 is an instance of wireless signal transceiver device 600 (FIG. 6) with feed elements F1 and F2 placed underneath antenna AN, and operates similarly as wireless signal transceiver device 600. Those elements in FIG. 51 having the same reference characters as those in FIG. 6 operate in similar ways as described above with reference to FIG. 6.

In wireless signal transceiver device 5100 (FIG. 51), feed point FP1 is on feed element F1. When transmission circuit 110 feeds a transmission signal ST1 to feed point FP1, feed element F1 feeds transmission signal ST1 to antenna AN through electromagnetic induction, and feed zone FZ1 is formed. Feed zone FZ1 has a zone shape centroid FZC1. Feed point FP2 is on feed element F2. When antenna AN feeds a reception signal SR1 to feed element F2 through electromagnetic induction, reception circuit 120 receives reception signal SR1 from feed point FP2. A feed zone FZ2 is formed and has a zone shape centroid FZC2.

In some embodiments, e.g., wireless signal transceiver device 600 (FIG. 6) or 5100 (FIG. 51) or the wireless signal device in FIG. 14, the wireless signal transceiver device includes feed elements F1 and F2. Feed element F1 includes feed point FP1 and is configured to feed transmission signal SR1 to antenna AN through electromagnetic induction. Feed element F2 includes feed point FP2 and is configured to be fed reception signal SR1 from antenna AN through electromagnetic induction.

In some embodiments, e.g., wireless signal transceiver device 5100 (FIG. 51), antenna AN is configured to transmit wireless signal STX based on transmission signal ST1 and to receive wireless signal SRX substantially at the same time during at least a time period. Wireless signal SRX includes a reflected wireless signal STX from an object OBJ. For example, after a round-trip time for wireless signal STX to travel from antenna AN to object OBJ, and back to antenna AN, antenna AN starts to receive wireless signal SRX. At the same time, antenna AN continues to transmit wireless signal STX. Starting from this moment, antenna AN transmits wireless signal STX and receives wireless signal SRX at the same time. Before antenna AN stops transmitting wireless signal STX, antenna AN transmits wireless signal STX and receives wireless signal SRX at the same time for a time period, such as 0.2, 0.5, 1, or 5 seconds. The length of the time period depends on application fields and can be any length of time.

In some embodiments, wireless signal transceiver device 5100 may further include a processor, e.g., processing unit PU (FIG. 9) or processor PU (FIG. 16), coupled to transmission circuit 110 and reception circuit 120. Transmission circuit 110 (FIG. 51) is configured to generate transmission signal ST1 based on input signal SI. Input signal SI is also input to the processor. Reception circuit 120 (FIG. 51) is further configured to generate processing signal SA based on reception signal SR1 and to output processing signal SA to the processor. The processor is configured to generate spatial information about object OBJ based on values of the processing signal SA and input signal SI, respectively corresponding to the received signal and the transmitted signal, at a substantially same instant in time.

Figure 52:
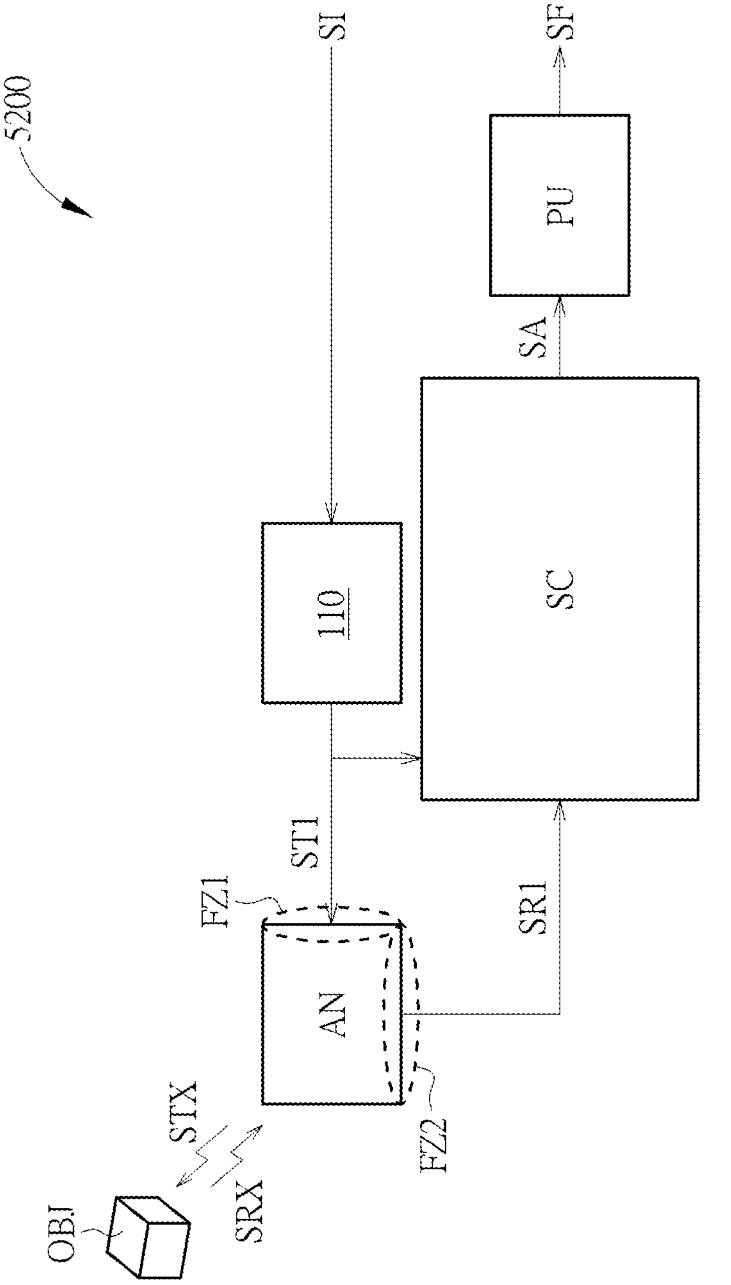
FIG. 52 to FIG. 56 illustrate transceivers according to different embodiments.

FIG. 52 illustrates a transceiver 5200 according to another embodiment. The transceiver 5200 can include an antenna AN, a transmission circuit 110, a sensing circuit SC and a processing unit PU. The antenna AN can receive a transmission signal ST1 and transmit a reception signal SR1. The antenna AN can be used to transmit a first wireless signal STX based on the transmission signal ST1, and receive a second wireless signal SRX, where the second wireless signal SRX can include a reflected first wireless signal STX from an object OBJ. The antenna AN can transmit the first wireless signal STX and receive the second wireless signal SRX at the same time. The antenna AN can output the reception signal SR1 based on the second wireless signal SRX.

For example, the antenna AN can have a feed zone FZ1 and a feed zone FZ2. The antenna AN can receive the transmission signal ST1 through the feed zone FZ1 and transmit the reception signal SR1 through the feed zone FZ2.

The transmission circuit 110 can be used to generate the transmission signal ST1. The transmission circuit 110 can have a first terminal coupled to the antenna, and a second terminal, where the first terminal can be used to output the transmission signal ST1, and the second terminal can be used to receive an input signal SI. The transmission signal ST1 can be generated based on the input signal SI.

The sensing circuit SC can be used to receive the transmission signal ST1 from the transmission circuit 110 and receive a reception signal SR1 from the antenna AN, and transmit a processing signal SA. The sensing circuit SC can have a first terminal, a second terminal and a third terminal. The first terminal of the sensing circuit SC can be coupled between the first terminal of the transmission circuit 110 and the antenna AN to receive the transmission signal ST1 from the transmission circuit 110. The second terminal of the sensing circuit SC can be coupled to the antenna to receive the reception signal SR1. The third terminal of the sensing circuit SC can be coupled to the processing unit PU to send the processing signal SA.

The processing unit PU can be used to generate a spatial information SF of the object OBJ based on the processing signal SA from the sensing circuit SC.

Since the sensing circuit SC can generate the processing signal SA based on the transmission signal ST1 and the reception signal SR1, the processing unit PU can generate the spatial information SF of the object OBJ uncomplicatedly by solely using the processing signal SA and omitting the input signal SI. In one embodiment, the processing unit PU can generate the spatial information SF of the object OBJ according to an envelope signal generated based on the processing signal SA from the sensing circuit SC. For example, a filtering operation (such as a low-pass filtering operation and/or a square root filtering operation) could be performed to the processing signal SA for generating the envelope signal. The envelope signal varies due to presence of the Doppler shift caused by the motion of the object OBJ, so that the processing unit PU can generate the spatial information SF of the object OBJ according to the variation of the envelope signal.

Figure 53A:
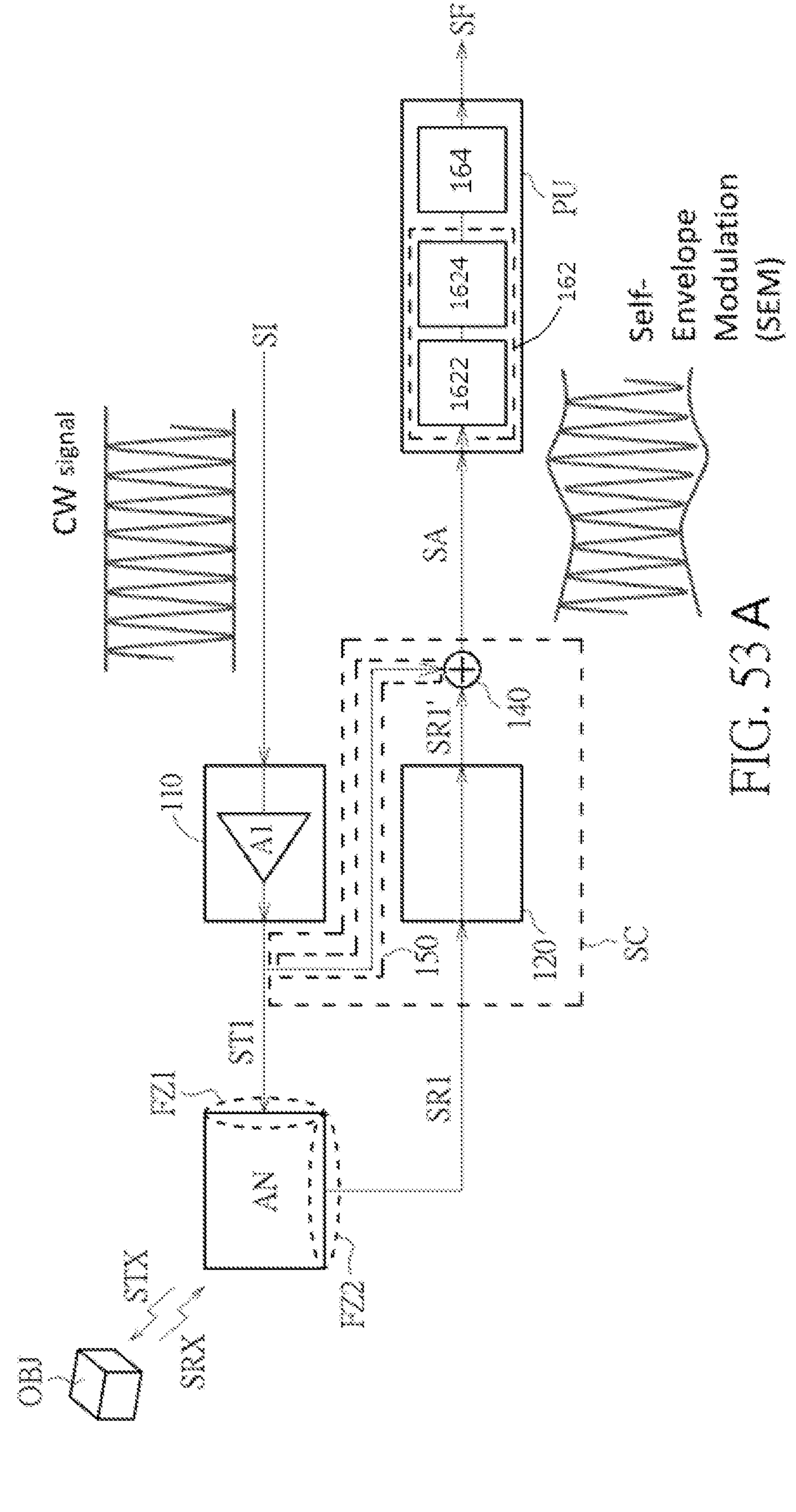

FIG. 53A illustrates a transceiver 5300 according to another embodiment. The similarities of FIG. 52 and FIG. 53A are not repeatedly described. As shown in FIG. 53A, the sensing circuit SC can include a reception circuit 120 used to receive the reception signal SR1. The reception circuit 120 can include a first terminal coupled to the second terminal of the sensing circuit SC, and a second terminal.

For example, the transmission circuit 110 can be coupled to the feed zone FZ1 of the antenna AN, and the reception circuit 120 can be coupled to the feed zone FZ2 of the antenna AN. Hence, the transmission circuit 110 can output the transmission signal ST1 to the feed zone FZ1 of the antenna AN, and the reception circuit 120 can receive the reception signal SR1 from the feed zone FZ2 of the antenna AN.

In FIG. 53A, the transmission circuit 110 can include an amplifier A1. The amplifier A1 of the transmission circuit 110 can include an input terminal and an output terminal. The input terminal of the amplifier A1 in the transmission circuit 110 can receive the input signal SI. The output terminal of the amplifier A1 in the transmission circuit 110 can output the transmission signal ST1. The amplifier A1 of the transmission circuit 110 can be a power amplifier (a.k.a. PA).

In FIG. 53A, the sensing circuit SC can further include a combining node 140. The combining node 140 can be coupled to the second terminal of the reception circuit 120, the first terminal of the transmission circuit 110 and the third terminal of the sensing circuit SC. The combining node 140 can be used to receive the transmission signal ST1 and a signal SR1' from the reception circuit 120 to generate the processing signal SA.

In FIG. 53A, the sensing circuit SC can further include a sensing element 150 coupled to the transmission circuit 110 and the combining node 140. In an embodiment, the sensing element 150 can be a conductive wire between the transmission circuit 110 and the combining node 140 for sending the transmission signal ST1 to the combining node 140. The sensing element 150 can be used to optionally provide a matching impedance of the antenna AN. In another embodiment, the sensing element 150 can include a resistor, an inductor and/or a capacitor to form a network to provide a matching impedance for the antenna AN.

For example, the combining node 140 can include a conductive node coupled among the sensing element 150, the reception circuit 120 and the processing unit PU. In this way, the combining node 140 can be used to perform an addition operation with the transmission signal ST1 and the signal SR1' from the reception circuit 120 to generate the processing signal SA.

According to an embodiment, the reception circuit 120 can be a conductive wire including a first terminal and a second terminal. The first terminal of the reception circuit 120 can be coupled to the antenna AN through the second terminal of the sensing circuit. The second terminal of the reception circuit 120 can be coupled to the combining node 140. When the reception circuit 120 is a conductive wire, the signal SR1' can be equal to the reception signal SR1, and the combining node 140 can be used to generate the processing signal SA by combining the transmission signal ST1 and the reception signal SR1.

The spatial information SF, such as the motion of the object OBJ, can be generated by the processing unit PU. According to an embodiment, the processing unit PU can include an envelope extraction circuit 162 and a motion detector 164. The input signal SI can be a continuous wave (CW) signal generated by an oscillator, and the processing signal SA can be a self-envelope modulation (SEM) signal. The amplifier A1 is configured to amplify the input signal SI (CW signal) and output the transmission signal ST1 to the antenna AN and the sensing circuit SC. When the object OBJ is moving, an envelope of the processing signal SA (SEM signal) varies due to presence of the Doppler shift caused by the motion of the object OBJ. In other words, the Doppler shift due to the motion of the object OBJ can be modulated onto the envelope of the processing signal SA (SEM signal) at the combining node 140. The envelope extraction circuit 162 can be configured to extract the signal envelope of the processing signal SA (SEM signal), and the motion detector 164 can be configured to determine whether the motion of the object OBJ is detected in accordance with the variation of the extracted signal envelope. In one embodiment, the processing unit PU can determine whether a motion of the object OBJ is detected based on at least one threshold for detecting variation of the envelope of the processing signal SA (SEM signal).

For example, the envelope extraction circuit 162 can include a rectifier 1622 and a low pass filter (LPF) 1624. The rectifier 1622 can be a rectifier circuit or a processor configured to execute instructions stored in memory to rectify the processing signal SA (SEM signal). The LPF 1624 can be an LPF circuit or the processor configured to execute the instructions stored in the memory to filter rectified the processing signal SA (SEM signal) for low frequency.

Figure 53B:
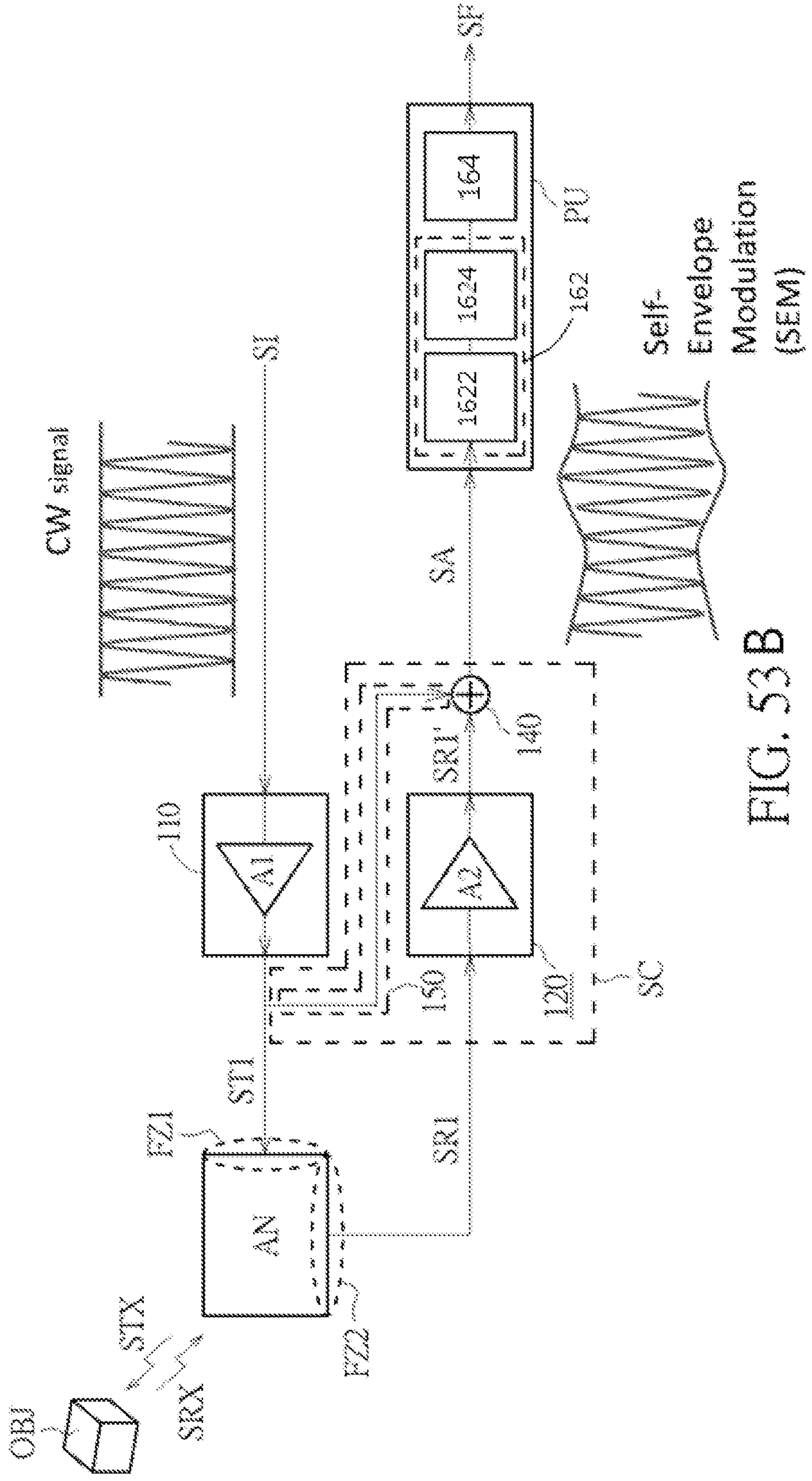

FIG. 53B illustrates a transceiver 5302 according to another embodiment. The similarities of FIG. 53A and FIG. 53B are not repeatedly described. As shown in FIG. 53B, the reception circuit 120 can include an amplifier A2 including an input terminal and an output terminal. The input terminal of the amplifier A2 can be coupled to the first terminal of the reception circuit 120, and the output terminal of the amplifier A2 can be coupled to the second terminal of the reception circuit 120. The input terminal of the amplifier A2 can be coupled to the antenna AN and be used to receive the reception signal SR1. The output terminal of the amplifier A2 can be coupled to the combining node 140 and be used to output an amplified reception signal which is the signal SR1'. The combining node 140 can generate the processing signal SA by combining the transmission signal ST1 and the amplified reception signal (i.e. SR1'). The amplifier A2 can be a low noise amplifier (LNA).

In FIG. 52, FIG. 53A and FIG. 53B, the sensing circuit SC, the transmission circuit 110 and the processing unit PU can be disposed in an integrated circuit (IC), i.e. a radar chip. Besides, the transmission circuit 110 and the processing unit PU can also be disposed in a chip.

Figure 54:
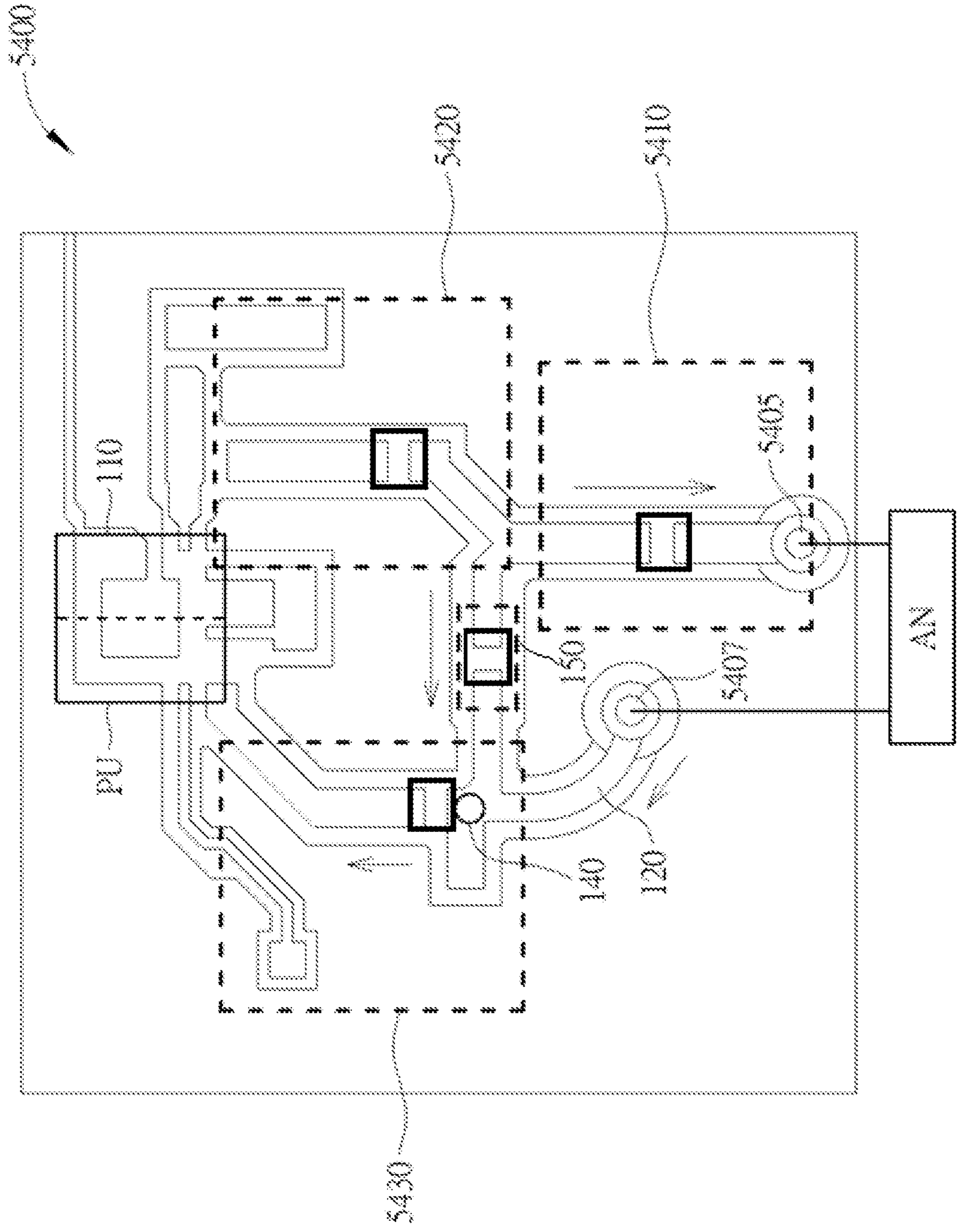

FIG. 54 illustrates a layout diagram of a transceiver 5400 according to another embodiment. In FIG. 54, a port 5405 and a port 5407 can be coupled to the antenna AN. The transmission signal ST1 can be transmitted to the antenna AN through the port 5405 and the feed zone FZ1. The reception signal SR1 can be transmitted from the antenna AN to the reception circuit 120 through the feed zone FZ2 and the port 5407. In FIG. 54, the reception circuit 120 can include a conductive wire and/or an amplifier (e.g. low noise amplifier). In FIG. 54, the transceiver 5400 can include a matching network 5410 coupled between the antenna AN and the sensing element 150. The transceiver 5400 can further include a matching network 5420 coupled between the sensing element 150 and the transmission circuit 110. The transceiver 5400 can further include a matching network 5430 coupled between the antenna AN and the processing unit PU.

The matching networks 5410 can provide a suitable antenna matching impedance, the matching network 5420 can provide a suitable transmission matching impedance, and the matching network 5430 can provide a suitable reception matching impedance. In FIG. 54, the transceiver 5400 can include all of the matching networks 5410, 5420 and 5430. However, FIG. 54 is an example. In other examples, each of the matching networks 5410, 5420 and 5430 can be selectively omitted according to requirements.

Figure 55:
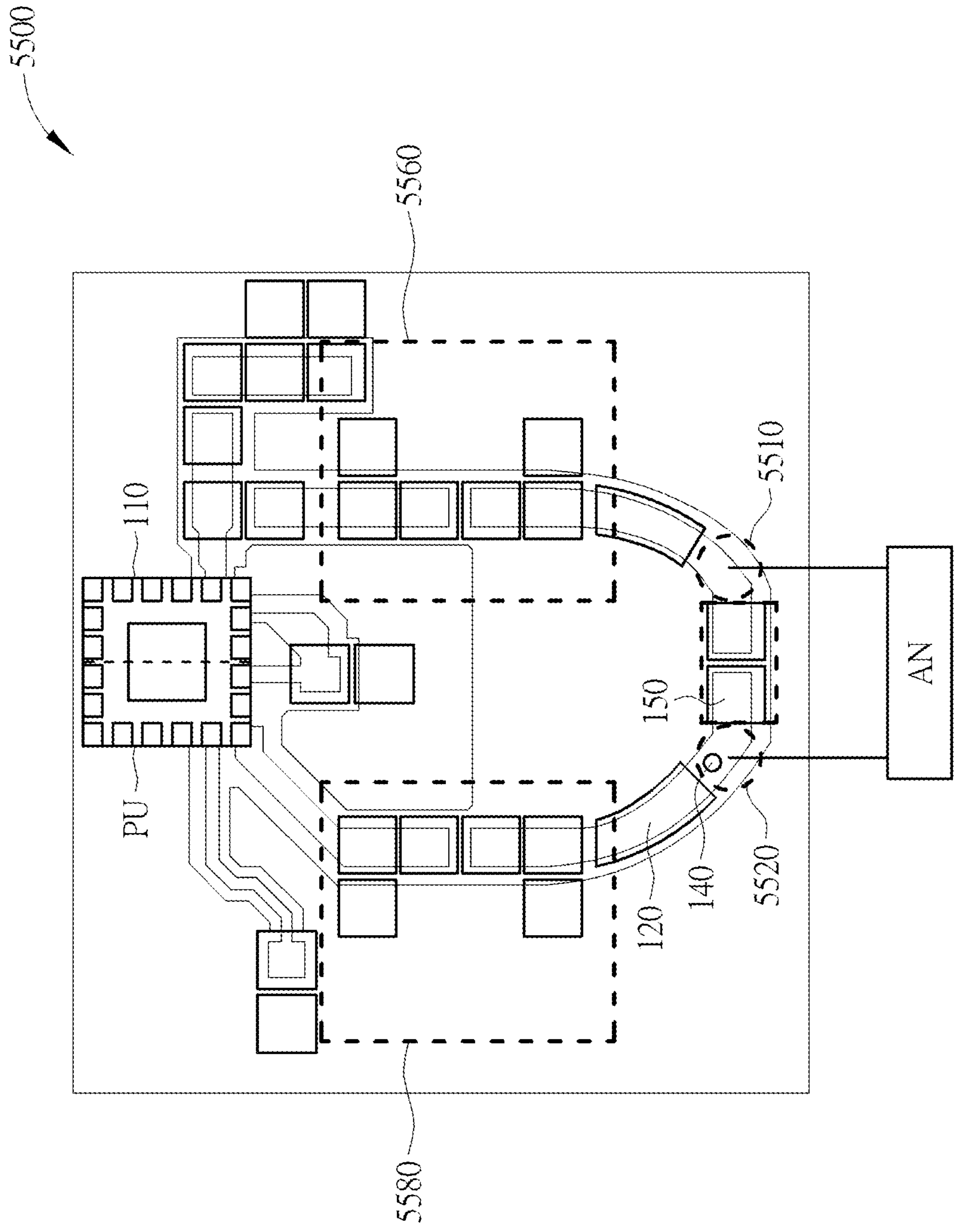

FIG. 55 illustrates a layout diagram of a transceiver 5500 according to another embodiment. In FIG. 55, the sensing element 150 can be coupled between a port 5510 and a port 5520 for providing a matching impedance of the antenna AN. In one embodiment, the sensing element 150 can further be disposed and/or connected between ports 5510 and 5520. The ports 5510 and 5520 can be coupled to the antenna AN. The transmission signal ST1 can be transmitted to the antenna AN through the port 5510. The reception signal SR1 can be sent to the reception circuit 120 through the port 5520. In FIG. 55, the sensing element 150 can include a conductive wire, a resistor, a capacitor and/or an inductor for providing a matching impedance. The reception circuit 120 can be a conductive wire. The transceiver 5500 can include a matching network 5560 coupled between the port 5510 and the transmission circuit 110, and a matching network 5580 coupled between the reception circuit 120 and the processing unit PU. The matching network 5560 can be transmission matching network, and the matching network 5580 can be reception matching network. The sensing element 150 can provide a suitable antenna matching impedance, the matching network 5560 can provide a suitable transmission matching impedance, and the matching network 5580 can provide a suitable reception matching impedance. Comparing with the transceiver 5400, the sensing element 150 of the transceiver 5500 can also act as the matching networks 5410 so that area occupied by the matching networks can be reduced. FIG. 55 is an example, and each of the matching network 5560 and the matching network 5580 can be selectively omitted.

In one embodiment, the antenna AN of the transceiver 5400 and 5500 shown in FIG. 54 and FIG. 55 may be formed on a first metal layer of a circuit board such as (but not limited to) a printed circuit board (PCB), and other portions of the transceiver 5400 and 5500, such as the transmission circuit 110, the reception circuit 120, the combining node 140, the sensing element 150, the matching networks 5410, 5420, 5430, 5560 and 5580, the ports 5405, 5407, 5510 and 5520, and the processing unit PU, may be formed on a second metal layer of the circuit board different from the first metal layer.

In another embodiment, other portions of the transceiver 5400 and 5500, such as at least one of the transmission circuit 110, the reception circuit 120, the combining node 140, the sensing element 150, the matching networks 5410, 5420, 5430, 5560 and 5580, the ports 5405, 5407, 5510 and 5520, and the processing unit PU, may be formed on the second metal layer or a third metal layer of the circuit board different from the first metal layer.

Figure 56:
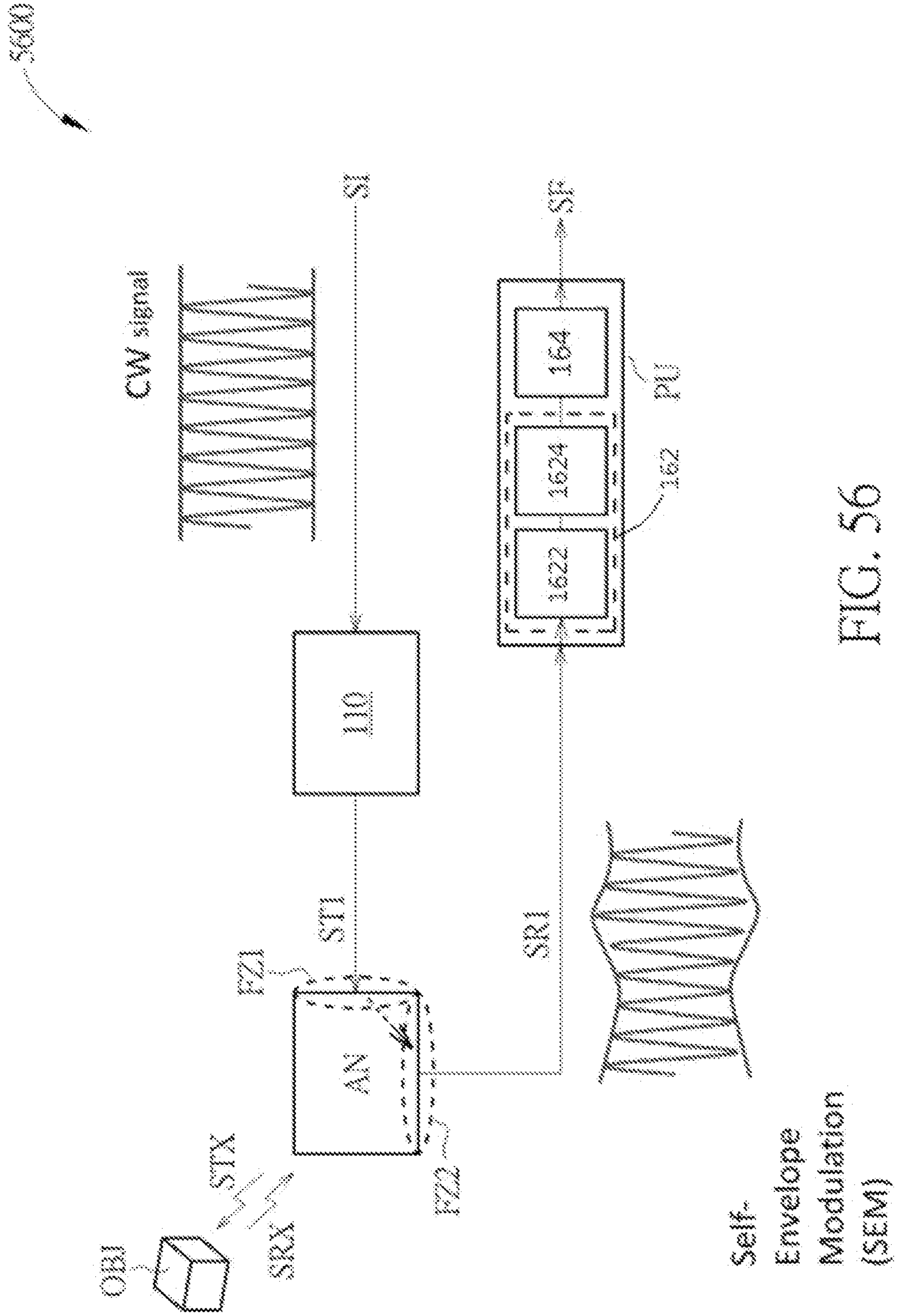

FIG. 56 illustrates a transceiver 5600 according to another embodiment. The transceiver 5600 can include an antenna AN, a transmission circuit 110 and a processing unit PU. The transmission circuit 110 can include a first terminal coupled to the feed zone FZ1 of the antenna AN, and a second terminal to receive an input signal SI. The processing unit PU can include a first terminal coupled to the feed zone FZ2 of the antenna AN, and a second terminal transmitting a spatial information SF of the object OBJ.

Similar to FIG. 52, FIG. 53A and FIG. 53B, in FIG. 56, the antenna AN can be used to transmit a first wireless signal STX based on a transmission signal ST1, and receive a second wireless signal SRX. The second wireless signal SRX can include a reflected first wireless signal STX from an object OBJ. The antenna can transmit the first wireless signal STX and receive the second wireless signal SRX at the same time. The transmission circuit 110 can generate the transmission signal ST1 based on the input signal SI. Comparing with FIG. 52, FIG. 53A and FIG. 53B, in FIG. 56, the antenna can output the reception signal SR1 based on the second wireless signal SRX and the transmission signal ST1. An isolation between the transmission signal ST1 and the reception signal SR1 is not less than 7 decibels (dB). For example, the isolation may be greater than 8 dB as shown in FIG. 14 and FIG. 15. In one embodiment, the isolation between the transmission signal ST1 and the reception signal SR1 can be not greater than 60 dB which is more suitable for SEM signal.

By adjusting the locations of the portions (such as feed zones) of the antenna AN transmitting the transmission signal ST1 and receiving the reception signals SR1, the isolation could be tuned to a suitable value such that the transmission signal ST1 could leak from the feed zone FZ1 to the feed zone FZ2 via the antenna AN. That is, the reception signal SR1 can be generated with an impact of the transmission signal ST1 so that the reception signal SR1 can be a combination of the second wireless signal SRX and the leakage part of the transmission signal ST1. Hence, the reception signal SR1 can be generated based on the second wireless signal SRX and the transmission signal ST1, and the processing unit PU can generate spatial information SF of the object OBJ uncomplicatedly by solely using the reception signal SR1 and by omitting the input signal SI. That is, the reception signal SR1 in FIG. 56 can act as the processing signal SA in FIG. 52, FIG. 53A and FIG. 53B. In other embodiment, by adjusting the locations of the portions (such as feed zones) of the antenna AN transmitting the transmission signal ST1 and receiving the reception signals SR1, the suitable antenna matching impedance can also be provided, such that the matching networks 5410 or the sensing element 150 can also be omitted for further reducing the occupied area of the circuit.

For example, the isolation between the transmission signal ST1 and the reception signal SR1 can be between 10 and 15 dB. As shown in FIG. 14 and FIG. 15, the acute angle θ formed between the first direction DR1 and the second direction DR2 can be between 55° and 70° which is more suitable for SEM signal.

The processing unit PU can be used to generate the spatial information SF of the object OBJ based on the reception signal SR1 in FIG. 56 from the antenna AN instead of the processing signal SA in FIG. 52, FIG. 53A and FIG. 53B. For example, the processing unit PU can generate the spatial information SF of the object OBJ according to an envelope signal generated based on the reception signal SR1 directly from the antenna AN.

In one embodiment, a filtering operation (such a low-pass filtering operation and/or a square root filtering operation) could be performed to the reception signal SR1 for generating the envelope signal. The envelope signal varies due to presence of the Doppler shift caused by the motion of the object OBJ, so that the processing unit PU can generate the spatial information SF of the object OBJ according to the variation of the envelope signal.

Similar to FIG. 52, FIG. 53A and FIG. 53B, in FIG. 56, the spatial information SF, such as the motion of the object OBJ, can be generated by the processing unit PU. The processing unit PU can include the envelope extraction circuit 162 and the motion detector 164 as shown in FIG. 53A and FIG. 53B. The input signal SI can be a continuous wave (CW) signal generated by an oscillator, and the reception signals SR1 can be a self-envelope modulation (SEM) signal. The transmission circuit 110 including an amplifier is configured to amplify the input signal SI (CW signal) and output the transmission signal ST1 to the antenna AN. When the object OBJ is moving, an envelope of the reception signals SR1 (SEM signal) varies due to presence of the Doppler shift caused by the motion of the object OBJ. In other words, the Doppler shift due to the motion of the object OBJ can be modulated onto the envelope of the reception signals SR1 (SEM signal). The envelope extraction circuit 162 can be configured to extract the signal envelope of the reception signal SR1 (SEM signal), and the motion detector 164 can be configured to determine whether the motion of the object OBJ is detected in accordance with the variation of the extracted signal envelope.

In one embodiment, the processing unit PU can determine whether a motion of the object OBJ is detected based on at least one threshold for detecting variation of the envelope of the reception signal SR1 (SEM signal).

For example, the envelope extraction circuit 162 can include a rectifier 1622 and a low pass filter (LPF) 1624. The rectifier 1622 can be a rectifier circuit or a processor configured to execute instructions stored in memory to rectify the processing signal SA (SEM signal). The LPF 1624 can be an LPF circuit or the processor configured to execute the instructions stored in the memory to filter rectified the processing signal SA (SEM signal) for low frequency.

For example, as shown in FIG. 56, the first terminal of the transmission circuit 110 can be coupled to a feed zone FZ1 of the antenna AN, and the first terminal of the processing unit PU can be coupled to a feed zone FZ2 of the antenna AN. The transmission circuit 110 can be used to output the transmission signal ST1 to the feed zone FZ1 of the antenna AN, and the processing unit PU can be used to receive the reception signal SR1 from the feed zone FZ2 of the antenna AN. The locations of the feed zone FZ1 and the feed zone FZ2 can be adjusted so that the transmission signal ST can impact the reception signal SR1 for generating the reception signal SR1 based on the second wireless signal SRX and the transmission signal ST.

In FIG. 56, the transmission circuit 110 and the processing unit PU can be disposed in an integrated circuit (IC), i.e. a radar chip.

In one embodiment, the antenna AN shown in FIG. 52 to FIG. 56 can be implemented by of the dual-polarized antennas shown in FIG. 1 to FIG. 14 and FIG. 16 to FIG. 51.

In FIG. 52 to FIG. 56, the processing signal SA or the reception signal SR1 can be generated based on the wireless signal SRX and the transmission signal ST1, and the processing signal SA or the reception signal SR1 can be used to generate an envelope signal including the information of the motion of the object OBJ. Hence, transceivers with simpler structures and smaller sizes are provided according to embodiments.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transceiver, comprising:

an antenna configured to:

transmit a first wireless signal based on a transmission signal; and receive a second wireless signal, the second wireless signal comprising a reflected first wireless signal from an object;

the antenna transmitting the first wireless signal and receiving the second wireless signal at the same time;

a transmission circuit configured to generate the transmission signal; and a processing unit configured to receive a reception signal from the antenna, the antenna outputting the reception signal based on the second wireless signal and the transmission signal; and wherein the processing unit is configured to generate a spatial information of the object based on the reception signal.

2. The transceiver of claim 1, wherein the processing unit is configured to generate the spatial information of the object by solely using the reception signal.

3. The transceiver of claim 1, wherein the processing unit is configured to determine whether a motion of the object is detected according to an envelope signal generated based on a processing signal from a reception circuit.

4. The transceiver of claim 3, wherein the transmission circuit is configured to generate the transmission signal based on a continuous wave signal.

5. The transceiver of claim 3, wherein the processing unit further comprises an envelope extraction circuit and a motion detector.

6. The transceiver of claim 5, wherein the envelope extraction circuit further comprises a rectifier and a low pass filter.

7. The transceiver of claim 1, wherein an isolation between the transmission signal and the reception signal is not less than 7 decibels.

8. The transceiver of claim 7, wherein the isolation between the transmission signal and the reception signal is between 10 and 15 decibels.

9. The transceiver of claim 1, wherein the transmission circuit is configured to output the transmission signal to a first feed zone of the antenna, and the processing unit is configured to receive the reception signal from a second feed zone of the antenna.

10. A transceiver, comprising:

an antenna configured to:

transmit a first wireless signal based on a transmission signal; and receive a second wireless signal, the second wireless signal comprising a reflected first wireless signal from an object, the antenna transmitting the first wireless signal and receiving the second wireless signal at the same time;

a transmission circuit configured to generate the transmission signal;

a sensing circuit configured to receive the transmission signal and a reception signal from the antenna, the sensing circuit comprising a reception circuit configured to receive the reception signal, and the antenna outputting the reception signal based on the second wireless signal; and a processing unit configured to generate a spatial information of the object based on a processing signal from the sensing circuit.

11. The transceiver of claim 10, wherein the sensing circuit further comprises a combining node configured to receive the transmission signal and generate the processing signal.

12. The transceiver of claim 11, wherein the reception circuit is a conductive wire comprising:

a first terminal coupled to the antenna; and a second terminal coupled to the combining node;

wherein the combining node generates the processing signal by combining the transmission signal and the reception signal.

13. The transceiver of claim 11, wherein the reception circuit comprises an amplifier comprising:

an input terminal coupled to the antenna and configured to receive the reception signal; and an output terminal coupled to the combining node and configured to output an amplified reception signal;

wherein the combining node generates the processing signal by combining the transmission signal and the amplified reception signal.

14. The transceiver of claim 11, further comprising a sensing element coupled between the transmission circuit and the combining node.

15. The transceiver of claim 14, wherein the combining node comprises a conductive node coupled among the sensing element, the reception circuit and the processing unit.

16. The transceiver of claim 14, further comprising:
a first matching network coupled between the antenna and the sensing element.

17. The transceiver of claim 14, further comprising:
a second matching network coupled between the sensing element and the transmission circuit.

18. The transceiver of claim 14, further comprising:
a third matching network coupled between the antenna and the processing unit.

19. The transceiver of claim 14, wherein the sensing element comprises a conductive wire, a resistor, an inductor and/or a capacitor.

20. The transceiver of claim 14, wherein:
the transmission signal is configured to be transmitted to the antenna through a first port and a feed zone of the antenna, and the reception signal is configured to be transmitted from the antenna through a second feed zone of the antenna and a second port; and
the sensing element is further connected between the first port and the second port.

* * * * *